United States Patent
Henry et al.

(10) Patent No.: US 10,052,706 B2
(45) Date of Patent: Aug. 21, 2018

(54) METHOD AND SYSTEM TO USE AC WELDING WAVEFORM AND ENHANCED CONSUMABLE TO IMPROVE WELDING OF GALVANIZED WORKPIECE

(71) Applicant: LINCOLN GLOBAL, INC., City of Industry, CA (US)

(72) Inventors: Judah Henry, Geneva, OH (US); Steven R Peters, Huntsburg, OH (US); Badri Narayanan, Highland Heights, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 415 days.

(21) Appl. No.: 14/621,515

(22) Filed: Feb. 13, 2015

(65) Prior Publication Data
US 2015/0283638 A1  Oct. 8, 2015

Related U.S. Application Data

(60) Provisional application No. 61/975,227, filed on Apr. 4, 2014.

(51) Int. Cl.
*B23K 9/09* (2006.01)
*B23K 9/23* (2006.01)
(Continued)

(52) U.S. Cl.
CPC ........... *B23K 9/092* (2013.01); *B23K 9/09* (2013.01); *B23K 9/173* (2013.01); *B23K 9/23* (2013.01);
(Continued)

(58) Field of Classification Search
CPC .... B23K 9/095; B23K 9/092; B23K 35/3093; B23K 35/306; B23K 9/23
(Continued)

(56) References Cited

U.S. PATENT DOCUMENTS

| | | | |
|---|---|---|---|
| 4,273,988 A | * | 6/1981 | Iceland .................. B23K 9/092 219/130.51 |
| 4,866,247 A | | 9/1989 | Parks |

(Continued)

FOREIGN PATENT DOCUMENTS

| | | |
|---|---|---|
| EP | 1847348 A2 | 10/2007 |
| EP | 2202024 A1 | 6/2010 |

(Continued)

OTHER PUBLICATIONS

International Application No. PCT/IB2015/000436, International Search Report, 10 pages, dated Sep. 17, 2015.
(Continued)

*Primary Examiner* — David Angwin
*Assistant Examiner* — Jimmy Chou
(74) *Attorney, Agent, or Firm* — Perkins Coie LLP

(57) ABSTRACT

Embodiments of the present invention comprise a system and method to weld or join coated materials using an arc welding system alone, or in combination with a hot wire system, where the arc welding system uses a welding current having an AC current portion to build a droplet for transfer to the workpiece. In further embodiments, the workpiece is coated with a material, such as zinc, and the arc welding system uses an AC welding waveform which is capable of welding coated workpieces with little or no porosity or spatter and can achieve enhanced performance. Additional embodiments use an enhanced electrode to provide optimum porosity performance. Such embodiments allow for the welding of coated material with little or no porosity and spatter, and at a high welding rate.

11 Claims, 28 Drawing Sheets

(51) Int. Cl.
  *B23K 35/30* (2006.01)
  *B23K 9/173* (2006.01)
  *B23K 35/02* (2006.01)
  *C23C 2/06* (2006.01)

(52) U.S. Cl.
  CPC ...... *B23K 35/0255* (2013.01); *B23K 35/0261* (2013.01); *B23K 35/0266* (2013.01); *B23K 35/0294* (2013.01); *B23K 35/306* (2013.01); *B23K 35/3053* (2013.01); *B23K 35/3093* (2013.01); *C23C 2/06* (2013.01)

(58) Field of Classification Search
  USPC ...... 219/60 R, 60 A, 61.5, 61.6, 61.9, 76.14, 219/130.51, 137 R, 137 PS, 60.2, 61, 219/130.5, 137.71
  See application file for complete search history.

(56) References Cited

U.S. PATENT DOCUMENTS

| | | | |
|---|---|---|---|
| 4,877,941 A * | 10/1989 | Honma | B23K 9/1075 219/130.21 |
| 5,148,001 A | 9/1992 | Stava | |
| 5,225,660 A * | 7/1993 | Mita | B23K 9/091 219/130.51 |
| 5,283,419 A * | 2/1994 | Hagiwara | B23K 9/095 219/130.51 |
| 5,365,035 A * | 11/1994 | Poulsen | B23K 9/091 219/130.21 |
| 5,464,958 A * | 11/1995 | Flowers | B23K 10/006 219/121.54 |
| 5,466,905 A * | 11/1995 | Flowers | B23K 10/006 219/121.44 |
| 5,990,445 A * | 11/1999 | Ogasawara | B23K 9/124 219/130.5 |
| 6,051,810 A * | 4/2000 | Stava | B23K 9/092 219/130.33 |
| 6,111,218 A * | 8/2000 | Matile | B23K 9/093 219/130.51 |
| 6,365,874 B1 * | 4/2002 | Stava | B23K 9/1062 219/130.33 |
| 6,376,802 B1 * | 4/2002 | Tong | B23K 9/08 219/130.21 |
| 6,441,342 B1 * | 8/2002 | Hsu | B23K 9/091 219/130.01 |
| 6,723,956 B2 * | 4/2004 | Briand | B23K 9/09 219/130.51 |
| 6,833,529 B2 * | 12/2004 | Ueyama | B23K 9/092 219/130.21 |
| 7,105,773 B2 * | 9/2006 | Myers | B23K 9/093 219/130.51 |
| 7,109,439 B2 | 9/2006 | Stava | |
| 7,842,903 B2 * | 11/2010 | Myers | B23K 9/1062 219/130.21 |
| 7,989,732 B2 * | 8/2011 | Karogal | B23K 9/1735 219/130.1 |
| 8,067,714 B2 * | 11/2011 | Era | B23K 9/092 219/130.21 |
| 8,203,099 B2 * | 6/2012 | Peters | B23K 9/04 219/130.1 |
| 8,519,302 B2 * | 8/2013 | Myers | B23K 9/093 219/130.51 |
| 8,791,383 B2 * | 7/2014 | Wilhelm | B23K 9/073 219/130.51 |
| 9,061,365 B2 * | 6/2015 | Ueda | B23K 9/092 |
| 9,333,582 B2 * | 5/2016 | Daniel | B23K 9/095 |
| 2002/0030043 A1 * | 3/2002 | Tong | B23K 9/09 219/137 PS |
| 2004/0016737 A1 * | 1/2004 | Huismann | B23K 9/091 219/137 PS |
| 2004/0040945 A1 * | 3/2004 | Morimoto | B23K 9/073 219/130.51 |
| 2004/0140302 A1 * | 7/2004 | Myers | B23K 9/0253 219/130.51 |
| 2004/0232129 A1 * | 11/2004 | Houston | B23K 9/1043 219/130.51 |
| 2005/0127054 A1 * | 6/2005 | Houston | B23K 9/091 219/130.51 |
| 2005/0284854 A1 * | 12/2005 | Tong | B23K 9/092 219/130.51 |
| 2006/0037952 A1 * | 2/2006 | Myers | B23K 9/093 219/130.51 |
| 2006/0070983 A1 * | 4/2006 | Narayanan | B23K 9/092 219/130.51 |
| 2007/0102408 A1 * | 5/2007 | Peters | B23K 9/1062 219/130.51 |
| 2007/0108174 A1 * | 5/2007 | Narayanan | B23K 9/0282 219/137 PS |
| 2007/0170163 A1 * | 7/2007 | Narayanan | B23K 9/093 219/130.51 |
| 2007/0210048 A1 * | 9/2007 | Koshiishi | B23K 9/092 219/130.51 |
| 2007/0246448 A1 * | 10/2007 | Nishisaka | B23K 9/092 219/130.51 |
| 2008/0006612 A1 * | 1/2008 | Peters | B23K 9/04 219/76.14 |
| 2008/0156781 A1 * | 7/2008 | Artelsmair | B23K 9/091 219/130.5 |
| 2009/0026188 A1 * | 1/2009 | Schorghuber | B23K 9/124 219/137 PS |
| 2009/0230108 A1 * | 9/2009 | Nakahara | B23K 9/091 219/137 PS |
| 2009/0321401 A1 * | 12/2009 | Peters | B23K 9/092 219/137 PS |
| 2010/0096373 A1 * | 4/2010 | Hillen | B23K 26/1429 219/130.01 |
| 2010/0155383 A1 * | 6/2010 | Shiozaki | B23K 9/09 219/130.51 |
| 2010/0181296 A1 * | 7/2010 | Ueda | B23K 9/173 219/130.51 |
| 2010/0288742 A1 * | 11/2010 | Nishikawa | B23K 9/067 219/130.51 |
| 2011/0297658 A1 * | 12/2011 | Peters | B23K 9/02 219/162 |
| 2012/0074115 A1 * | 3/2012 | Kazmaier | B23K 9/09 219/130.51 |
| 2012/0097656 A1 * | 4/2012 | Peters | B23K 9/091 219/130.51 |
| 2012/0118866 A1 * | 5/2012 | Tanaka | B23K 9/0673 219/130.33 |
| 2013/0015170 A1 * | 1/2013 | Peters | B23K 9/092 219/130.21 |
| 2013/0020289 A1 * | 1/2013 | Peters | B23K 9/04 219/121.6 |
| 2013/0043219 A1 * | 2/2013 | Peters | B23K 35/0261 219/72 |
| 2013/0068744 A1 * | 3/2013 | Matsui | B23K 9/092 219/137 R |
| 2013/0092674 A1 * | 4/2013 | Gerth | B23K 35/0205 219/145.21 |
| 2013/0256288 A1 * | 10/2013 | Matthews | B23K 9/0737 219/123 |
| 2014/0076858 A1 | 3/2014 | Peters | |
| 2014/0083987 A1 * | 3/2014 | Dodge | B23K 9/1043 219/130.1 |
| 2014/0124491 A1 * | 5/2014 | Daniel | B23K 9/1006 219/130.51 |
| 2014/0124492 A1 * | 5/2014 | Daniel | B23K 9/095 219/130.51 |
| 2014/0131322 A1 * | 5/2014 | Hearn | B23K 9/1043 219/74 |
| 2014/0131325 A1 * | 5/2014 | Zhang | B23K 9/092 219/121.46 |
| 2014/0131332 A1 * | 5/2014 | Henry | B23K 9/0671 219/130.21 |
| 2014/0251968 A1 * | 9/2014 | Peters | B23K 9/0673 219/130.21 |

(56) References Cited

U.S. PATENT DOCUMENTS

| | | | | |
|---|---|---|---|---|
| 2014/0251971 A1* | 9/2014 | Hearn | .................... | B23K 9/092 |
| | | | | 219/130.51 |
| 2014/0263234 A1* | 9/2014 | Peters | .................. | B23K 9/0216 |
| | | | | 219/130.1 |
| 2014/0263241 A1* | 9/2014 | Henry | ................... | B23K 9/092 |
| | | | | 219/130.31 |
| 2014/0263242 A1* | 9/2014 | Peters | .................... | B23K 9/093 |
| | | | | 219/130.51 |
| 2014/0263259 A1 | 9/2014 | Narayanan et al. | | |
| 2015/0028011 A1* | 1/2015 | Peters | ..................... | B23K 9/09 |
| | | | | 219/130.51 |

FOREIGN PATENT DOCUMENTS

| | | |
|---|---|---|
| GB | 970866 A | 9/1964 |
| GB | 1183461 A | 3/1970 |
| WO | 2009150340 A2 | 12/2009 |

OTHER PUBLICATIONS

International Application No. PCT/IB2015/000428, International Search Report, 18 pages, dated Dec. 3, 2015.

\* cited by examiner

METHOD AND SYSTEM TO USE AC WELDING WAVEFORM AND ENHANCED CONSUMABLE TO IMPROVE WELDING OF GALVANIZED WORKPIECE

PRIORITY

The present application claims priority to Provisional Application No. 61/975,227 filed on Apr. 4, 2014, which is incorporated herein by reference in its entirety.

TECHNICAL FIELD

Certain embodiments relate to welding and joining applications. More particularly, certain embodiments relate to a system and method to use an enhanced AC welding waveform, with or without an enhanced consumable, to weld or join galvanized workpieces at a high rate with little or no porosity.

BACKGROUND

Many different welding methods and systems are used to join workpieces which have a corrosion resistance coating, such as galvanized workpieces. However, because of the presence of the corrosion resistance coating, these methods and systems are limited in their use. Specifically, these systems and methods typically are slow, to ensure that the coating does not overly contaminate the weld. However, because these processes are slow they tend to increase the heat input into the weld joint. This is undesirable, particularly in applications where the workpieces are relatively thin.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method to weld or join coated materials using an arc welding system alone, or in combination with a hot wire system, where the arc welding system uses a welding current having an AC current portion to build a droplet for transfer to the workpiece. In further embodiments, the workpiece is coated with a material, such as zinc, and the arc welding system uses an AC welding waveform which is capable of welding coated workpieces with little or no porosity or spatter and can achieve enhanced performance. Such embodiments allow for the welding of coated material with little or no porosity and spatter, and at a high welding rate.

These and other features of the claimed invention, as well as details of illustrated embodiments thereof, will be more fully understood from the following description and drawings.

DETAILED DESCRIPTION

The term "overlaying" is used herein in a broad manner and may refer to any applications including brazing, cladding, building up, filling, and hard-facing. For example, in a "brazing" application, a filler metal is distributed between closely fitting surfaces of a joint via capillary action. Whereas, in a "braze welding" application the filler metal is made to flow into a gap. As used herein, however, both techniques are broadly referred to as overlaying applications.

Figure 1:
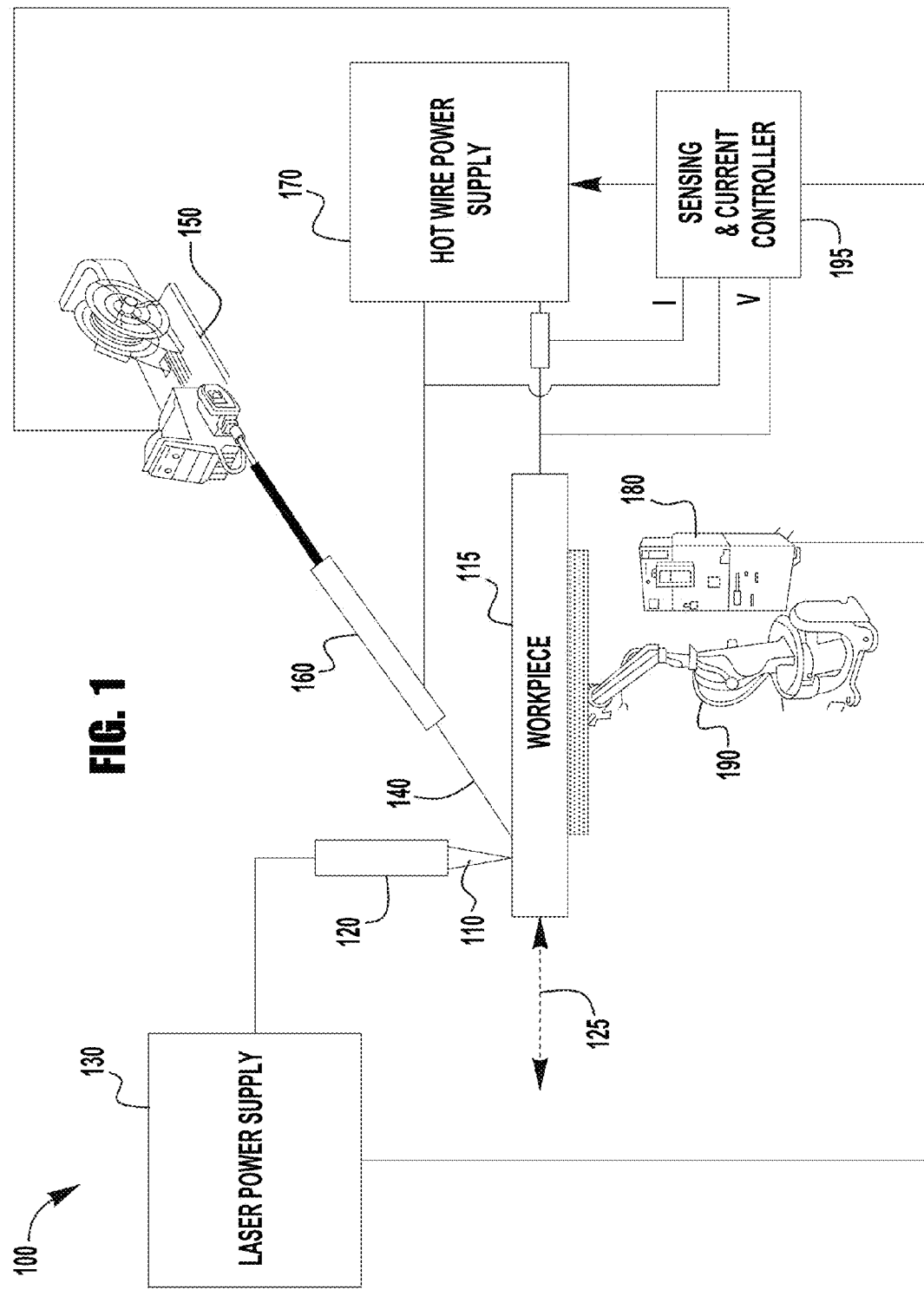
FIG. 1 illustrates a functional schematic block diagram of an exemplary embodiment of a combination filler wire feeder and energy source system for any of brazing, cladding, building up, filling, and hard-facing overlaying applications.

FIG. 1 illustrates a functional schematic block diagram of an exemplary embodiment of a combination filler wire feeder and energy source system 100 for performing any of brazing, cladding, building up, filling, hard-facing overlaying, and joining/welding applications. The system 100 includes a laser subsystem capable of focusing a laser beam 110 onto a workpiece 115 to heat the workpiece 115. The laser subsystem is a high intensity energy source. The laser subsystem can be any type of high energy laser source, including but not limited to carbon dioxide, Nd:YAG, Yb-disk, YB-fiber, fiber delivered or direct diode laser systems. Further, even white light or quartz laser type systems can be used if they have sufficient energy. Other embodiments of the system may include at least one of an electron beam, a plasma arc welding subsystem, a gas tungsten arc welding subsystem, a gas metal arc welding subsystem, a flux cored arc welding subsystem, and a submerged arc welding subsystem serving as the high intensity energy source. The following specification will repeatedly refer to the laser system, beam and power supply, however, it should be understood that this reference is exemplary as any high intensity energy source may be used. For example, a high intensity energy source can provide at least 500 W/cm$^2$. The laser subsystem includes a laser device 120 and a laser power supply 130 operatively connected to each other. The laser power supply 130 provides power to operate the laser device 120.

The system 100 also includes a hot filler wire feeder subsystem capable of providing at least one resistive filler wire 140 to make contact with the workpiece 115 in the vicinity of the laser beam 110. Of course, it is understood that by reference to the workpiece 115 herein, the molten puddle is considered part of the workpiece 115, thus reference to contact with the workpiece 115 includes contact with the puddle. The hot filler wire feeder subsystem includes a filler wire feeder 150, a contact tube 160, and a hot wire power supply 170. During operation, the filler wire 140, which leads the laser beam 110, is resistance-heated by electrical current from the hot wire welding power supply 170 which is operatively connected between the contact tube 160 and the workpiece 115. In accordance with an embodiment of the present invention, the hot wire welding power supply 170 is a pulsed direct current (DC) power supply, although alternating current (AC) or other types of power supplies are possible as well. The wire 140 is fed from the filler wire feeder 150 through the contact tube 160 toward the workpiece 115 and extends beyond the tube 160. The extension portion of the wire 140 is resistance-heated such that the extension portion approaches or reaches the melting point before contacting a weld puddle on the workpiece. The laser beam 110 serves to melt some of the base metal of the workpiece 115 to form a weld puddle and also to melt the wire 140 onto the workpiece 115. The power supply 170 provides a large portion of the energy needed to resistance-melt the filler wire 140. The feeder subsystem may be capable of simultaneously providing one or more wires, in accordance with certain other embodiments of the present invention. For example, a first wire may be used for hard-facing and/or providing corrosion resistance to the workpiece, and a second wire may be used to add structure to the workpiece.

The system 100 further includes a motion control subsystem capable of moving the laser beam 110 (energy source) and the resistive filler wire 140 in a same direction 125 along the workpiece 115 (at least in a relative sense) such that the laser beam 110 and the resistive filler wire 140 remain in a fixed relation to each other. According to various embodiments, the relative motion between the workpiece 115 and the laser/wire combination may be achieved by actually moving the workpiece 115 or by moving the laser device 120 and the hot wire feeder subsystem. In FIG. 1, the motion control subsystem includes a motion controller 180 operatively connected to a robot 190. The motion controller 180 controls the motion of the robot 190. The robot 190 is operatively connected (e.g., mechanically secured) to the workpiece 115 to move the workpiece 115 in the direction 125 such that the laser beam 110 and the wire 140 effectively travel along the workpiece 115. In accordance with an alternative embodiment of the present invention, the laser device 110 and the contact tube 160 may be integrated into a single head. The head may be moved along the workpiece 115 via a motion control subsystem operatively connected to the head.

In general, there are several methods that a high intensity energy source/hot wire may be moved relative to a workpiece. If the workpiece is round, for example, the high intensity energy source/hot wire may be stationary and the workpiece may be rotated under the high intensity energy source/hot wire. Alternatively, a robot arm or linear tractor may move parallel to the round workpiece and, as the workpiece is rotated, the high intensity energy source/hot wire may move continuously or index once per revolution to, for example, overlay the surface of the round workpiece. If the workpiece is flat or at least not round, the workpiece may be moved under the high intensity energy source/hot wire as shown if FIG. 1. However, a robot arm or linear tractor or even a beam-mounted carriage may be used to move a high intensity energy source/hot wire head relative to the workpiece.

The system 100 further includes a sensing and current control subsystem 195 which is operatively connected to the workpiece 115 and the contact tube 160 (i.e., effectively connected to the output of the hot wire power supply 170) and is capable of measuring a potential difference (i.e., a voltage V) between and a current (I) through the workpiece 115 and the hot wire 140. The sensing and current control subsystem 195 may further be capable of calculating a resistance value (R=V/I) and/or a power value (P=V*I) from the measured voltage and current. In general, when the hot wire 140 is in contact with the workpiece 115, the potential difference between the hot wire 140 and the workpiece 115 is zero volts or very nearly zero volts. As a result, the sensing and current control subsystem 195 is capable of sensing when the resistive filler wire 140 is in contact with the workpiece 115 and is operatively connected to the hot wire power supply 170 to be further capable of controlling the flow of current through the resistive filler wire 140 in response to the sensing, as is described in more detail later herein. In accordance with another embodiment of the present invention, the sensing and current controller 195 may be an integral part of the hot wire power supply 170.

In accordance with an embodiment of the present invention, the motion controller 180 may further be operatively connected to the laser power supply 130 and/or the sensing and current controller 195. In this manner, the motion controller 180 and the laser power supply 130 may communicate with each other such that the laser power supply 130 knows when the workpiece 115 is moving and such that the motion controller 180 knows if the laser device 120 is active. Similarly, in this manner, the motion controller 180 and the sensing and current controller 195 may communicate with each other such that the sensing and current controller 195 knows when the workpiece 115 is moving and such that the motion controller 180 knows if the hot filler wire feeder subsystem is active. Such communications may be used to coordinate activities between the various subsystems of the system 100.

Figure 2:
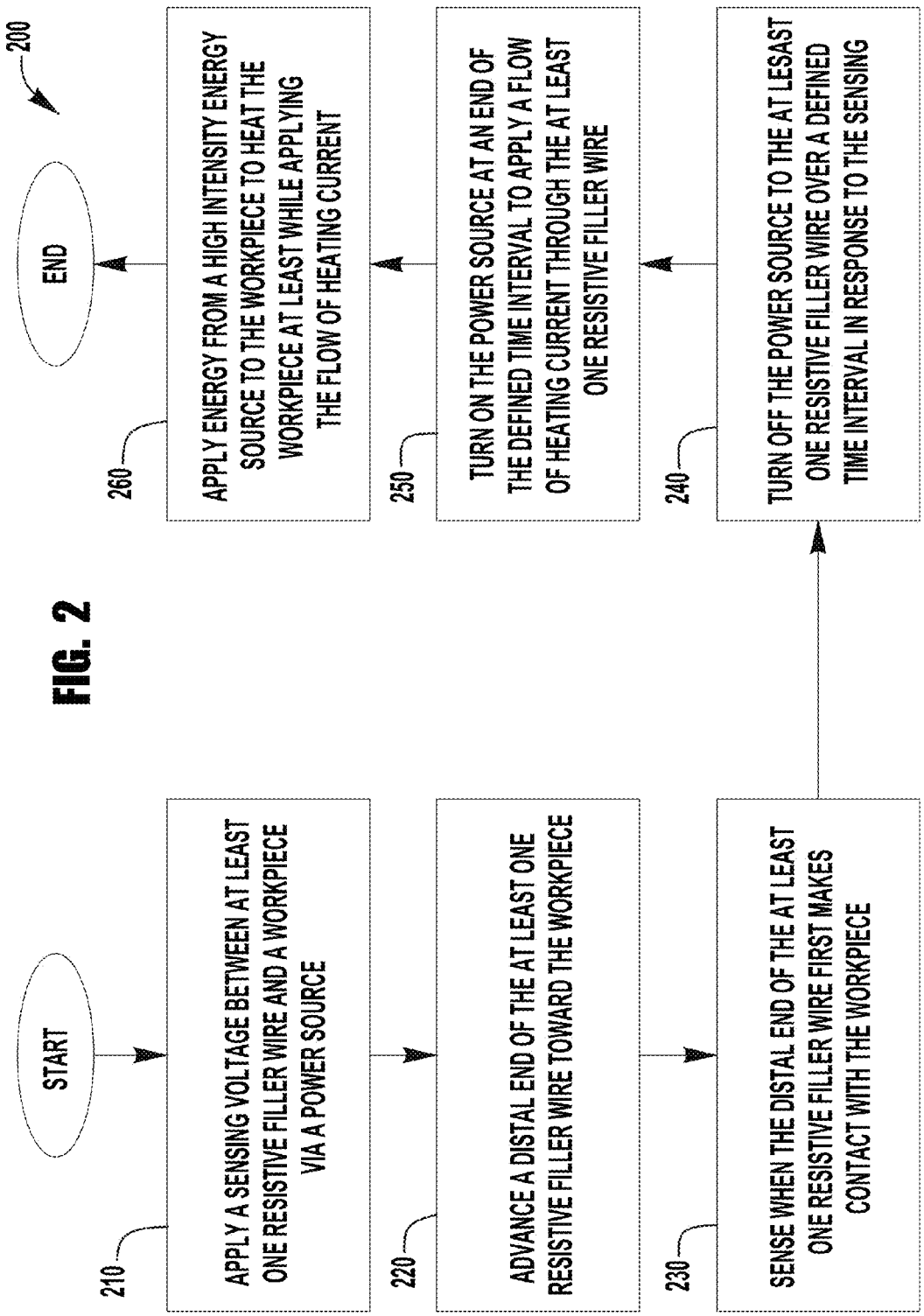
FIG. 2 illustrates a flow chart of an embodiment of a start-up method used by the system of FIG. 1.

FIG. 2 illustrates a flow chart of an embodiment of a start-up method 200 used by the system 100 of FIG. 1. In step 210, apply a sensing voltage between at least one resistive filler wire 140 and a workpiece 115 via a power source 170. The sensing voltage may be applied by the hot wire power supply 170 under the command of the sensing and current controller 195. Furthermore, the applied sensing voltage does not provide enough energy to significantly heat the wire 140, in accordance with an embodiment of the present invention. In step 220, advance a distal end of the at least one resistive filler wire 140 toward the workpiece 115. The advancing is performed by the wire feeder 150. In step 230, sense when the distal end of the at least one resistive filler wire 140 first makes contact with the workpiece 115. For example, the sensing and current controller 195 may command the hot wire power supply 170 to provide a very low level of current (e.g., 3 to 5 amps) through the hot wire 140. Such sensing may be accomplished by the sensing and current controller 195 measuring a potential difference of about zero volts (e.g., 0.4V) between the filler wire 140 (e.g., via the contact tube 160) and the workpiece 115. When the distal end of the filler wire 140 is shorted to the workpiece 115 (i.e., makes contact with the workpiece), a significant voltage level (above zero volts) may not exist between the filler wire 140 and the workpiece 115.

In step 240, turn off the power source 170 to the at least one resistive filler wire 140 over a defined time interval (e.g., several milliseconds) in response to the sensing. The sensing and current controller 195 may command the power source 170 to turn off. In step 250, turn on the power source 170 at an end of the defined time interval to apply a flow of heating current through the at least one resistive filler wire 140. The sensing and current controller 195 may command the power source 170 to turn on. In step 260, apply energy from a high intensity energy source 110 to the workpiece 115 to heat the workpiece 115 at least while applying the flow of heating current.

As an option, the method 200 may include stopping the advancing of the wire 140 in response to the sensing, restarting the advancing (i.e., re-advancing) of the wire 140 at the end of the defined time interval, and verifying that the distal end of the filler wire 140 is still in contact with the workpiece 115 before applying the flow of heating current.

The sensing and current controller 195 may command the wire feeder 150 to stop feeding and command the system 100 to wait (e.g., several milliseconds). In such an embodiment, the sensing and current controller 195 is operatively connected to the wire feeder 150 in order to command the wire feeder 150 to start and stop. The sensing and current controller 195 may command the hot wire power supply 170 to apply the heating current to heat the wire 140 and to again feed the wire 140 toward the workpiece 115.

Figure 3:
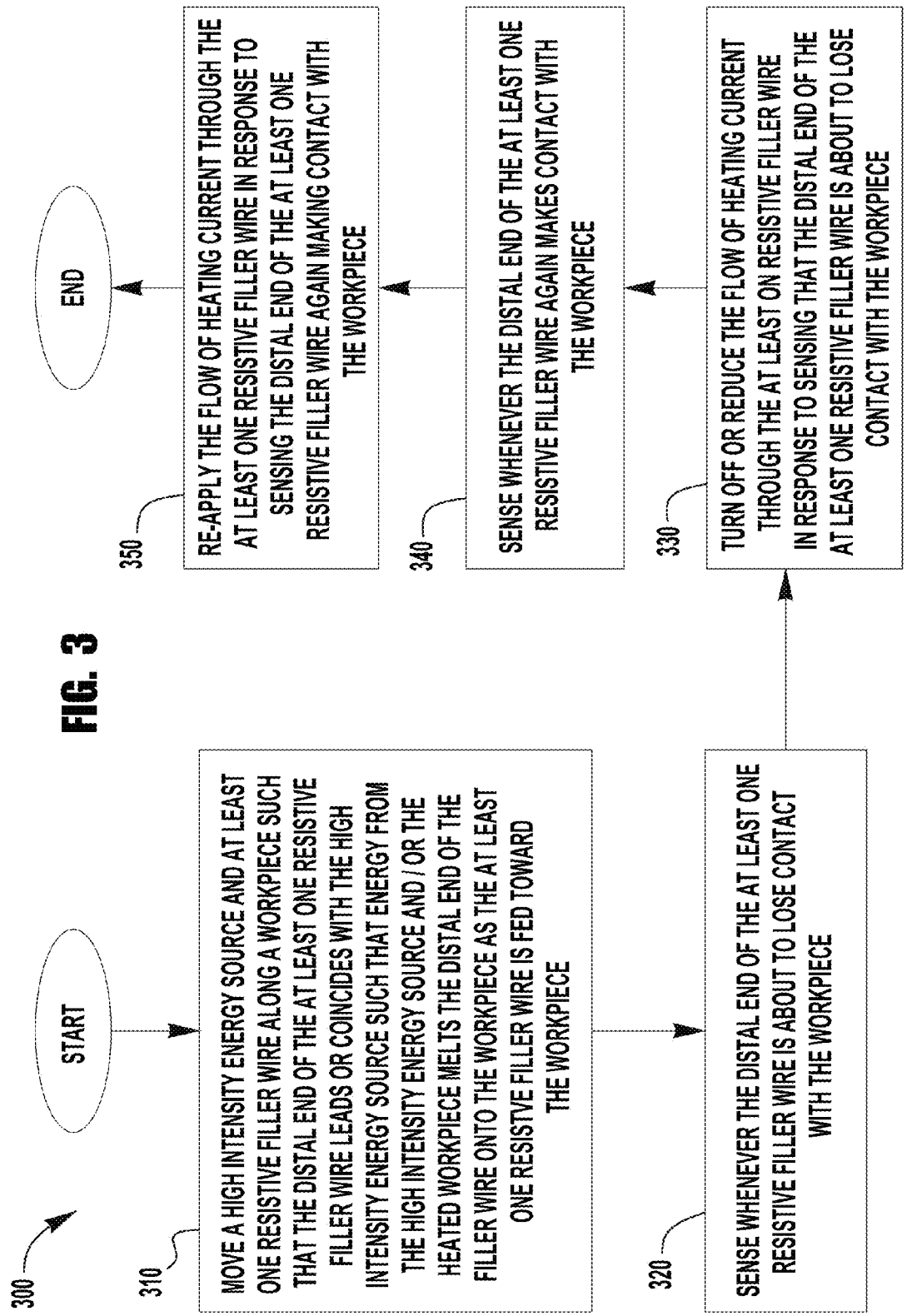
FIG. 3 illustrates a flow chart of an embodiment of a post start-up method used by the system of FIG. 1.

Once the start up method is completed, the system 100 may enter a post start-up mode of operation where the laser beam 110 and hot wire 140 are moved in relation to the workpiece 115 to perform one of a brazing application, a cladding application, a build-up application, a hard-facing application, or a welding/joining operation. FIG. 3 illustrates a flow chart of an embodiment of a post start-up method 300 used by the system 100 of FIG. 1. In step 310, move a high intensity energy source (e.g., laser device 120) and at least one resistive filler wire 140 along a workpiece 115 such that the distal end of the at least one resistive filler wire 140 leads or coincides with the high intensity energy source (e.g., laser device 120) such that energy (e.g., laser beam 110) from the high intensity energy source (e.g., laser device 120) and/or the heated workpiece 115 (i.e., the workpiece 115 is heated by the laser beam 110) melts the distal end of the filler wire 140 onto the workpiece 115 as the at least one resistive filler wire 140 is fed toward the workpiece 115. The motion controller 180 commands the robot 190 to move the workpiece 115 in relation to the laser beam 110 and the hot wire 140. The laser power supply 130 provides the power to operate the laser device 120 to form the laser beam 110. The hot wire power supply 170 provides electric current to the hot wire 140 as commanded by the sensing and current controller 195.

In step 320, sense whenever the distal end of the at least one resistive filler wire 140 is about to lose contact with the workpiece 115 (i.e., provide a premonition capability). Such sensing may be accomplished by a premonition circuit within the sensing and current controller 195 measuring a rate of change of one of a potential difference between (dv/dt), a current through (di/dt), a resistance between (dr/dt), or a power through (dp/dt) the filler wire 140 and the workpiece 115. When the rate of change exceeds a pre-defined value, the sensing and current controller 195 formally predicts that loss of contact is about to occur. Such premonition circuits are well known in the art for arc welding.

When the distal end of the wire 140 becomes highly molten due to heating, the distal end may begin to pinch off from the wire 140 onto the workpiece 115. For example, at that time, the potential difference or voltage increases because the cross section of the distal end of the wire decreases rapidly as it is pinching off. Therefore, by measuring such a rate of change, the system 100 may anticipate when the distal end is about to pinch off and lose contact with the workpiece 115. Also, if contact is fully lost, a potential difference (i.e., a voltage level) which is significantly greater than zero volts may be measured by the sensing and current controller 195. This potential difference could cause an arc to form (which is undesirable) between the new distal end of the wire 140 and the workpiece 115 if the action in step 330 is not taken. Of course, in other embodiments the wire 140 may not show any appreciable pinching but will rather flow into the puddle in a continuous fashion while maintaining a nearly constant cross-section into the puddle.

In step 330, turn off (or at least greatly reduce, for example, by 95%) the flow of heating current through the at least one resistive filler wire 140 in response to sensing that the distal end of the at least one resistive filler wire 140 is about to lose contact with the workpiece 115. When the sensing and current controller 195 determines that contact is about to be lost, the controller 195 commands the hot wire power supply 170 to shut off (or at least greatly reduce) the current supplied to the hot wire 140. In this way, the formation of an unwanted arc is avoided, preventing any undesired effects such as splatter or burnthrough from occurring.

In step 340, sense whenever the distal end of the at least one resistive filler wire 140 again makes contact with the workpiece 115 due to the wire 140 continuing to advance toward the workpiece 115. Such sensing may be accomplished by the sensing and current controller 195 measuring a potential difference of about zero volts between the filler wire 140 (e.g., via the contact tube 160) and the workpiece 115. When the distal end of the filler wire 140 is shorted to the workpiece 115 (i.e., makes contact with the workpiece), a significant voltage level above zero volts may not exist between the filler wire 140 and the workpiece 115. The phrase "again makes contact" is used herein to refer to the situation where the wire 140 advances toward the workpiece 115 and the measured voltage between the wire 140 (e.g., via the contact tube 160) and the workpiece 115 is about zero volts, whether or not the distal end of the wire 140 actually fully pinches off from the workpiece 115 or not. In step 350, re-apply the flow of heating current through the at least one resistive filler wire in response to sensing that the distal end of the at least one resistive filler wire again makes contact with the workpiece. The sensing and current controller 195 may command the hot wire power supply 170 to re-apply the heating current to continue to heat the wire 140. This process may continue for the duration of the overlaying application.

Figure 4:
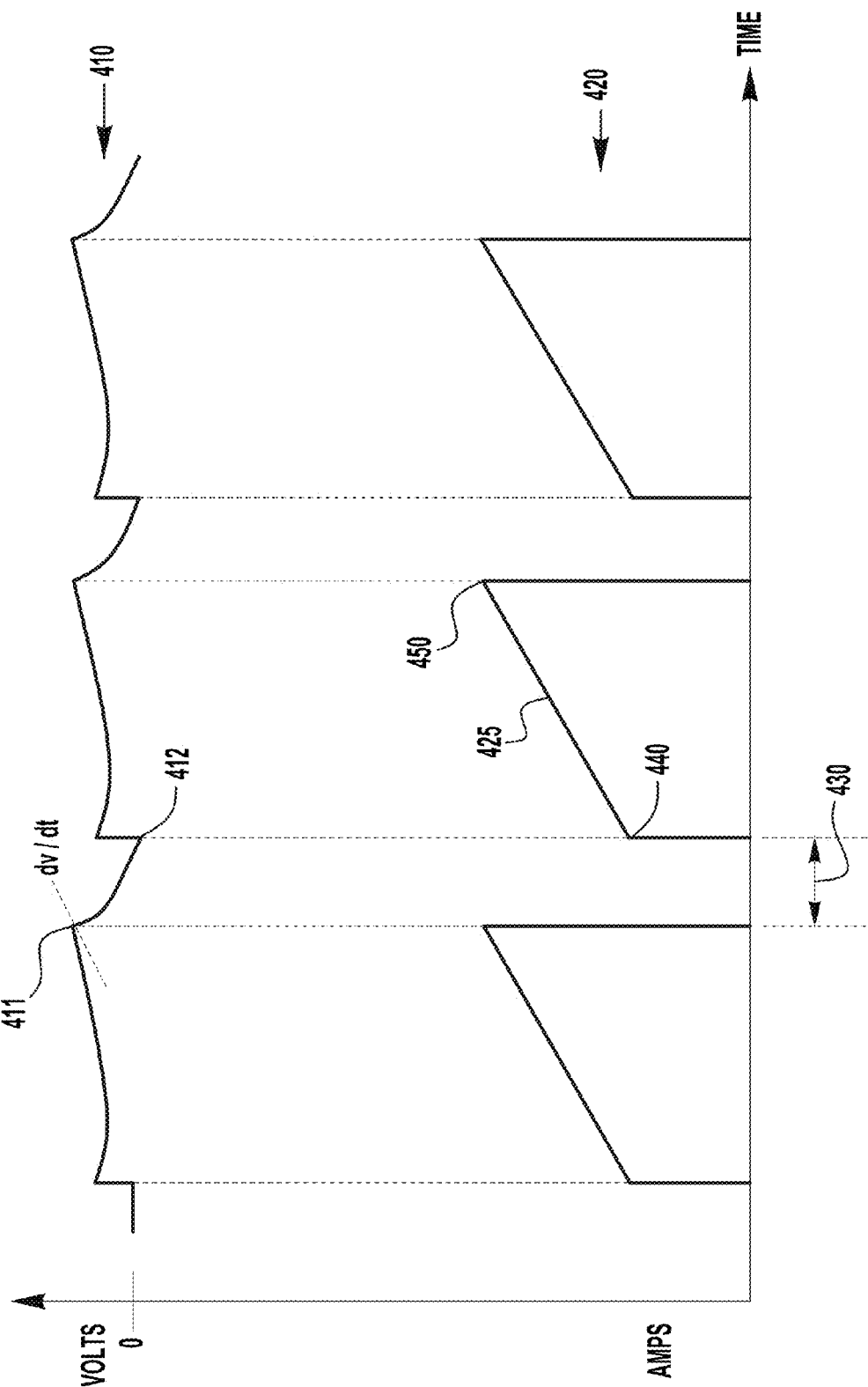
FIG. 4 illustrates a first exemplary embodiment of a pair of voltage and current waveforms associated with the post start-up method of FIG. 3.

For example, FIG. 4 illustrates a first exemplary embodiment of a pair of voltage and current waveforms 410 and 420, respectively, associated with the post start-up method 300 of FIG. 3. The voltage waveform 410 is measured by the sensing and current controller 195 between the contact tube 160 and the workpiece 115. The current waveform 420 is measured by the sensing and current controller 195 through the wire 140 and workpiece 115.

Whenever the distal end of the resistive filler wire 140 is about to lose contact with the workpiece 115, the rate of change of the voltage waveform 410 (i.e., dv/dt) will exceed a predetermined threshold value, indicating that pinch off is about to occur (see the slope at point 411 of the waveform 410). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will command the hot wire power supply 170 to turn off (or at least greatly reduce) the flow of current through the wire 140.

When the sensing and current controller 195 senses that the distal end of the filler wire 140 again makes good contact with the workpiece 115 after some time interval 430 (e.g., the voltage level drops back to about zero volts at point 412), the sensing and current controller 195 commands the hot wire power supply 170 to ramp up the flow of current (see ramp 425) through the resistive filler wire 140 toward a predetermined output current level 450. In accordance with an embodiment of the present invention, the ramping up starts from a set point value 440. This process repeats as the energy source 120 and wire 140 move relative to the workpiece 115 and as the wire 140 advances towards the workpiece 115 due to the wire feeder 150. In this manner, contact between the distal end of the wire 140 and the workpiece 115 is largely maintained and an arc is prevented from forming between the distal end of the wire 140 and the workpiece 115. Ramping of the heating current helps to prevent inadvertently interpreting a rate of change of voltage as a pinch off condition or an arcing condition when no such condition exists. Any large change of current may cause a faulty voltage reading to be taken due to the inductance in the heating circuit. When the current is ramped up gradually, the effect of inductance is reduced.

Figure 5:
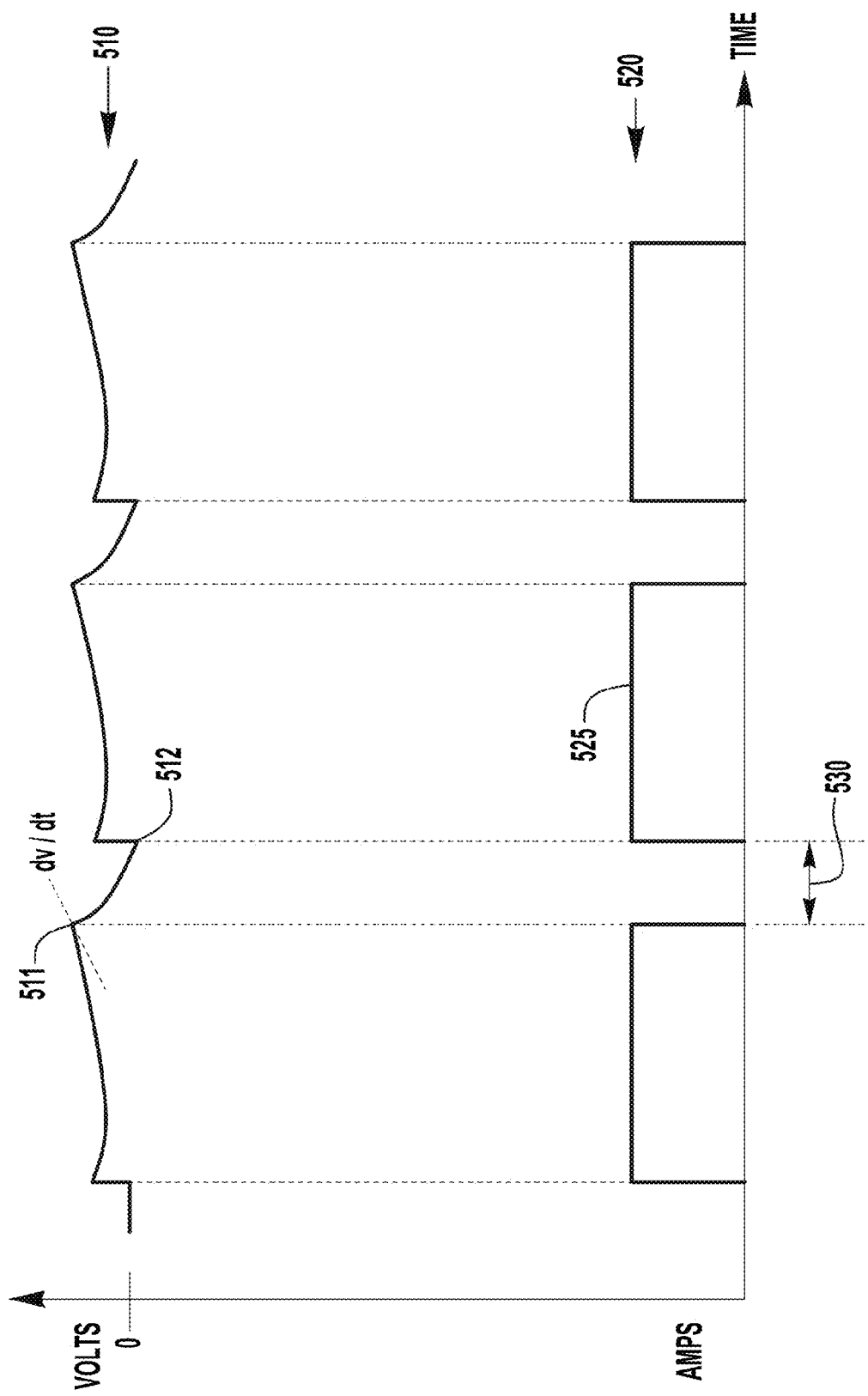
FIG. 5 illustrates a second exemplary embodiment of a pair of voltage and current waveforms associated with the post start-up method of FIG. 3.

FIG. 5 illustrates a second exemplary embodiment of a pair of voltage and current waveforms 510 and 520, respectively, associated with the post start-up method of FIG. 3. The voltage waveform 510 is measured by the sensing and current controller 195 between the contact tube 160 and the workpiece 115. The current waveform 520 is measured by the sensing and current controller 195 through the wire 140 and workpiece 115.

Whenever the distal end of the resistive filler wire 140 is about to lose contact with the workpiece 115, the rate of change of the voltage waveform 510 (i.e., dv/dt) will exceed a predetermined threshold value, indicating that pinch off is about to occur (see the slope at point 511 of the waveform 510). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will command the hot wire power supply 170 to turn off (or at least greatly reduce) the flow of current through the wire 140.

When the sensing and current controller 195 senses that the distal end of the filler wire 140 again makes good contact with the workpiece 115 after some time interval 530 (e.g., the voltage level drops back to about zero volts at point 512), the sensing and current controller 195 commands the hot wire power supply 170 to apply the flow of heating current (see heating current level 525) through the resistive filler wire 140. This process repeats as the energy source 120 and wire 140 move relative to the workpiece 115 and as the wire 140 advances towards the workpiece 115 due to the wire feeder 150. In this manner, contact between the distal end of the wire 140 and the workpiece 115 is largely maintained and an arc is prevented from forming between the distal end of the wire 140 and the workpiece 115. Since the heating current is not being gradually ramped in this case, certain voltage readings may be ignored as being inadvertent or faulty due to the inductance in the heating circuit.

In summary, a method and system to start and use a combination wire feed and energy source system for any of brazing, cladding, building up, filling, and hard-facing overlaying applications are disclosed. High intensity energy is applied onto a workpiece to heat the workpiece. One or more resistive filler wires are fed toward the workpiece at or just in front of the applied high intensity energy. Sensing of when a distal end of the one or more resistive filler wires makes contact with the workpiece at or near the applied high intensity energy is accomplished. Electric heating current to the one or more resistive filler wires is controlled based on whether or not the distal end of the one or more resistive filler wires is in contact with the workpiece. The applied high intensity energy and the one or more resistive filler wires are moved in a same direction along the workpiece in a fixed relation to each other.

In further exemplary embodiments, systems and methods of the present invention are employed for welding or joining operations. The embodiments discussed above have focused on the use of filler metals in overlaying operations. However, aspects of the present invention can be used in welding and joining applications in which workpieces are joined using welding operations and the use of a filler metal. Although directed to overlaying a filler metal, the above described embodiments, systems and methods are similar to that employed in welding operations, described more fully below. Therefore, in the following discussions it is understood that the discussions above generally apply, unless otherwise stated. Further, the following discussion may include reference to FIGS. 1 through 5.

It is known that welding/joining operations typically join multiple workpieces together in a welding operation where a filler metal is combined with at least some of the workpiece metal to form a joint. Because of the desire to increase production throughput in welding operations, there is a constant need for faster welding operations, which do not result in welds which have a substandard quality. Furthermore, there is a need to provide systems which can weld quickly under adverse environmental conditions, such as in remote work sites. As described below, exemplary embodiments of the present invention provide significant advantages over existing welding technologies. Such advantages include, but are not limited to, reduced total heat input resulting in low distortion of the workpiece, very high welding travel speeds, very low spatter rates, welding with the absence of shielding, welding plated or coated materials at high speeds with little or no spatter and welding complex materials at high speeds.

In exemplary embodiments of the present invention, very high welding speeds, as compared to arc welding, can be obtained using coated workpieces, which typically require significant prep work and are much slower welding processes using arc welding methods. As an example, the following discussion will focus on welding galvanized workpieces. Galvanization of metal is used in increase the corrosion resistance of the metal and is desirable in many industrial applications. However, conventional welding of galvanized workpieces can be problematic. Specifically, during welding the zinc in the galvanization vaporizes and this zinc vapor can become trapped in the weld puddle as the puddle solidifies, causing porosity. This porosity adversely affects the strength of the weld joint. Because of this, existing welding techniques require a first step of removing the galvanization or welding through the galvanization at lower processing speeds and with some level of defects—which is inefficient and causes delay, or requires the welding process to proceed slowly. By slowing the process the weld puddle remains molten for a longer period of time allowing the vaporized zinc to escape. However, because of the slow speed production rates are slow and the overall heat input into the weld can be high. Other coatings which can cause similar issues include, but are not limited to: paint, stamping lubricants, glass linings, aluminized coatings, surface heat treatment, nitriding or carbonizing treatments, cladding treatments, or other vaporizing coatings or materials. Exemplary embodiments of the present invention eliminate these issues, as explained below.

Figure 6:
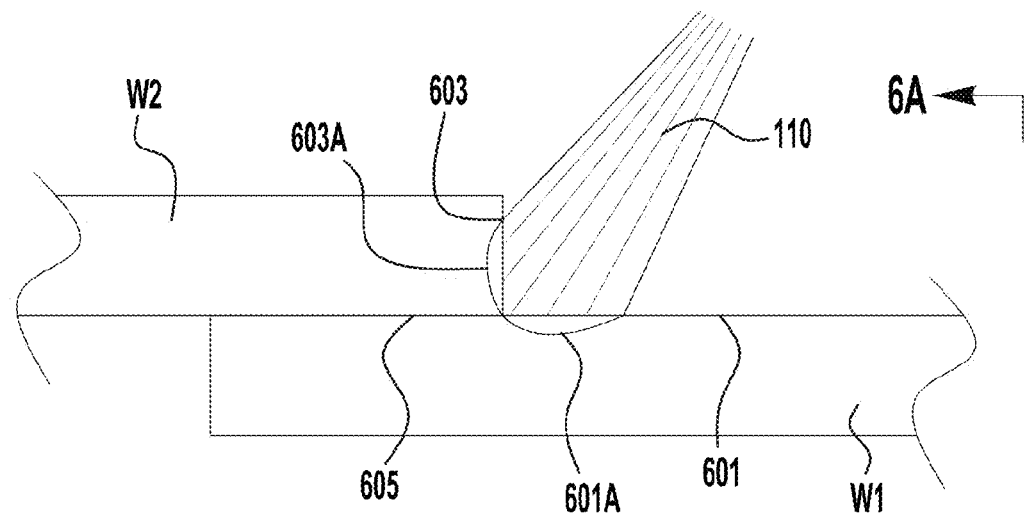
FIGS. 6 and 6A illustrate a further exemplary embodiment of the present invention used to perform a welding operation.
Figure 6A:
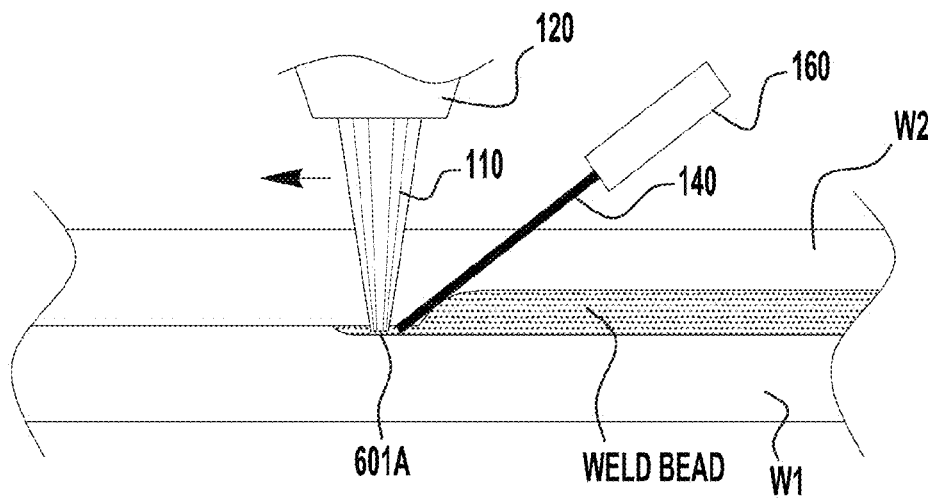

Turning to FIGS. 6 and 6A (cross-section and side view, respectively) a representative welding lap joint is shown. In this figure two coated (e.g., galvanized) workpieces W1/W2 are to be joined with a lap weld. The lap joint surfaces 601 and 603 are initially covered with the coating as well as the surface 605 of workpiece W1. In a typical welding operation (for example GMAW) portions of the covered surface 605 are made molten. This is because of the typical depth of penetration of a standard welding operation. Because the surface 605 is melted the coating on the surface 605 is vaporized, but because of the distance of the surface 605 from the surface of the weld pool is large, the gases can be trapped as the weld pool solidifies. With embodiments of the present invention this does not occur.

As shown in FIGS. 6 and 6A a laser beam 110 is directed from the laser device 120 to the weld joint, specifically the surfaces 601 and 603. The laser beam 110 is of an energy density to melt portions of the weld surfaces creating molten puddles 601A and 603A, which creates a general weld puddle. Further, a filler wire 140—which is resistance heated as described previously—is directed to the weld puddle to provide the needed filler material for the weld bead. Unlike most welding processes the filler wire 140 makes contact and is plunged into the weld puddle during the welding process. This is because this process does not use a welding arc to transfer the filler wire 140 but rather simply melts the filler wire into the weld puddle.

Because the filler wire 140 is preheated to at or near its melting point its presence in the weld puddle will not appreciably cool or solidify the puddle and is quickly consumed into the weld puddle. The general operation and control of the filler wire 140 is as described previously with respect to the overlaying embodiments.

Because the laser beam 110 can be precisely focused and directed to the surfaces 601/603, the depth of penetration for the pools 601A/603A can be precisely controlled. By controlling this depth carefully, embodiments of the present invention prevent any unnecessary penetration or melting of the surface 605. Because of the surface 605 is not overly melted any coating on the surface 605 is not vaporized and does not become trapped in the weld puddle. Further, any coating on the surface of the weld joint 601 and 603 are easily vaporized by the laser beam 110 and that gas is allowed to escape the weld zone before the weld puddle solidifies. It is contemplated that a gas extraction system can be utilized to aid in the removal of any vaporized coating materials.

Because the depth of weld puddle penetration can be precisely controlled the speed of welding coated workpieces can be greatly increased, while significantly minimizing or eliminating porosity. Some arc welding system can achieve good travel speeds for welding, but at the higher speeds problems can occur such as porosity and spatter. In exemplary embodiments of the present invention, very high travel speeds can be achieved with little or no porosity or spatter (as discussed herein) and in fact travel speeds of over 50 inches/min can be easily achieved for many different types of welding operations. Embodiments of the present invention can achieve welding travel speeds over 80 inches/minute. Further, other embodiments can achieve travel speeds in the range of 100 to 150 inches/min with minimal or no porosity or spatter, as discussed herein. Of course, the speeds achieved will be a function of the workpiece properties (thickness and composition) and the wire properties (e.g., dia.), but these speeds are readily achievable in many different welding and joining applications when using embodiments of the present invention. Further, these speeds can be achieved with either a 100% carbon dioxide shielding gas, or can be achieved with no shielding at all. Additionally, these travel speeds can be achieved without removing any surface coating prior to the creation of the weld puddle and welding. Of course, it is contemplated that higher travel speeds can be achieved. Furthermore, because of the reduced heat input into the weld these high speeds can be achieved in thinner workpieces 115, which typically have a slower weld speed because heat input must be kept low to avoid distortion. Not only can embodiments of the present invention achieve the above described high travel speeds with little or no porosity or spatter, but they can also achieve very high deposition rates, with low admixture. Specifically, embodiments of the present invention can achieve deposition rates of 10 lb/hr or higher with no shielding gas and little or no porosity or spatter. In some embodiments the deposition rate is in the range of 10 to 20 lb/hr.

In the exemplary embodiments of the present invention, these extremely high travel speeds are achieved with little or no porosity and little or no spatter. Porosity of a weld can be determined by examining a cross-section and/or a length of the weld bead to identify porosity ratios. The cross-section porosity ratio is the total area of porosity in a given cross-section over the total cross-sectional area of the weld joint at that point. The length porosity ratio is the total accumulated length of pores in a given unit length of weld joint. Embodiments of the present invention can achieve the above described travel speeds with a cross-sectional porosity between 0 and 20%. Thus, a weld bead with no bubbles or cavities will have a 0% porosity. In other exemplary embodiments, the cross-sectional porosity can be in the range of 0 to 10%, and in another exemplary embodiment can be in the range of 2 to 5%. It is understood that in some welding applications some level of porosity is acceptable. Further, in exemplary embodiments of the invention the length porosity of the weld is in the range of 0 to 20%, and can be 0 to 10%. In further exemplary embodiments the length porosity ratio is in the range of 1 to 5%. Thus, for example, welds can be produced that have a cross-sectional porosity in the range of 2 to 5% and a length porosity ratio of 1 to 5%.

Furthermore, embodiments of the present invention can weld at the above identified travel speeds with little or no spatter. Spatter occurs when droplets of the weld puddle are caused to spatter outside of the weld zone. When weld spatter occurs it can compromise the quality of the weld and can cause production delays as it must be typically cleaned off of the workpieces after the welding process. Moreover, when a workpiece is coated, for example is galvanized, the spatter tends to stick to the galvanization and creates an entry point for corrosion. Thus, there is great benefit to welding at high speed with no spatter. Embodiments of the present invention are capable of welding at the above high travel speeds with a spatter factor in the range of 0 to 0.5, where the spatter factor is the weight of the spatter over a given travel distance X (in mg) over the weight of the consumed filler wire 140 over the same distance X (in Kg). That is:

Spatter Factor=(spatter weight (mg)/consumed filler wire weight (Kg))

The distance X should be a distance allowing for a representative sampling of the weld joint. That is, if the distance X is too short, e.g., 0.5 inch, it may not be representative of the weld. Thus, a weld joint with a spatter factor of 0 would have no spatter for the consumed filler wire over the distance X, and a weld with a spatter of factor of 2.5 had 5 mg of spatter for 2 Kg of consumed filler wire. In an exemplary embodiment of the present invention, the spatter factor is in the range of 0 to 1. In a further exemplary embodiment, the spatter factor is in the range of 0 to 0.5. In another exemplary embodiment of the present invention the spatter factor is in the range of 0 to 0.3. It should be noted that embodiments of the present invention can achieve the above described spatter factor ranges with or without the use of any external shielding—which includes either shielding gas or flux shielding. Furthermore, the above spatter factor ranges can be achieved when welding uncoated or coated workpieces, including workpieces which are galvanized—without having the galvanization removed prior to the welding operation.

There are a number of methods to measure spatter for a weld joint. One method can include the use of a "spatter boat." For such a method a representative weld sample is placed in a container with a sufficient size to capture all, or almost all, of the spatter generated by a weld bead. The container or portions of the container—such as the top—can move with the weld process to ensure that the spatter is captured. Typically the boat is made from copper so the spatter does not stick to the surfaces. The representative weld is performed above the bottom of the container such that any spatter created during the weld will fall into the container. During the weld the amount of consumed filler wire is monitored. After the weld is completed the spatter boat is to be weighed by a device having sufficient accuracy to determine the difference, if any, between the pre-weld and post-weld weight of the container. This difference represents the weight of the spatter and is then divided by the amount, in Kg, of the consumed filler wire. Alternatively, if the spatter does not stick to the boat the spatter can be removed and weighed by itself.

As described previously, the use of the laser device 120 allows for precise control of the depth of the weld puddle. Furthermore, the use of the laser 120 permits easy adjustment of the size and depth of the weld puddle. This is because the laser beam 110 can be focused/de-focused easily or have its beam intensity changed very easily. Because of these abilities the heat distribution on the workpieces W1 and W2 can be precisely controlled. This control allows for the creation of very narrow weld puddles for precise welding as well as minimizing the size of the weld zone on the workpiece. This also provides advantages in minimizing the areas of the workpiece that are not affected by the weld bead. Specifically, the areas of the workpieces adjacent to the weld bead will have minimal affects from the welding operation, which is often not the case in arc welding operations.

In exemplary embodiments of the present invention, the shape and/or intensity of the beam 110 can be adjusted/changed during the welding process. For example, it may be necessary at certain places on a workpiece to change the depth of penetration or to change the size of the weld bead. In such embodiments the shape, intensity, and/or size of the beam 110 can be adjusted during the welding process to provide the needed change in the welding parameters.

As described above, the filler wire 140 impacts the same weld puddle as the laser beam 110. In an exemplary embodiment, the filler wire 140 impacts the weld puddle at the same location as the laser beam 110. However, in other exemplary embodiments the filler wire 140 can impact the same weld puddle remotely from the laser beam. In the embodiment shown in FIG. 6A the filler wire 140 trails the beam 110 during the welding operation. However, that is not necessary as the filler wire 140 can be positioned in the leading position. The present invention is not limited in this regard, as the filler wire 140 can be positioned at other positions relative to the beam 110 so long as the filler wire 140 impacts the same weld puddle as the beam 110.

The above described embodiment was described with respect to workpieces which have a coating, such as galvanization. However, embodiments of the present invention can also be used on workpieces that have no coating. Specifically, the same above described welding process can be utilized with non-coated workpieces. Such embodiments achieve the same performance attributes as described above regarding coated metals.

Further, exemplary embodiments of the present invention are not limited to welding steel workpieces, but can also be used for welding aluminum, or more complex metals—as will be described further below.

Another beneficial aspect of the present invention is related to shielding gas. In a typical arc welding operation a shielding gas or shielding flux is used to prevent the oxygen and nitrogen in the atmosphere, or other harmful elements, from interacting with the weld puddle and metal transfer. Such interference can be detrimental to the quality and appearance of the weld. Therefore, in almost all arc welding processes shielding is provided by the use of externally supplied shielding gas, shielding gas created by the consumption of an electrode having flux on it (e.g., stick electrode, flux cored electrode, etc.) or by an externally supplied granulated flux (e.g., sub-arc welding). Further, in some welding operations, such as welding specialized metals or welding galvanized work pieces, a special shielding gas mixture must be employed. Such mixtures can be extremely expensive. Further, when welding in extreme environments it is often difficult to transport large quantities of shielding gas to the work site (such as at pipelines), or wind tends to blow the shielding gas away from the arc. Further, the use of fume extraction systems has grown in recent years. While these systems tend to remove fumes they also tend to draw away shielding gas if placed to close to the welding operation.

Benefits of the present invention include being able to use minimal amounts or no shielding gas when welding. Alternatively, embodiments of the present invention allow the use of shielding gasses that would normally not be able to be used for a specific welding operation. This is discussed further below.

When welding typical workpieces (non-coated) with an arc welding process, shielding—regardless of its form—is required. It has been discovered that when welding with embodiments of the present invention, no shielding is required. That is no shielding gas, no granular flux and no self-shielding electrodes need be used. However, unlike in an arc welding process, the present invention produces a quality weld. That is, the above described weld speeds can be achieved without the use of any shielding. This could not have been accomplished with prior arc welding processes.

During a typical arc welding process a molten droplet of the filler wire is transferred from the filler wire to the weld puddle through the welding arc. Without shielding the entire surface of the droplet is exposed to the atmosphere during transfer and as such tends to pick up the nitrogen and oxygen in the atmosphere and deliver the nitrogen and oxygen to the weld puddle. This is not desirable.

Because the present invention delivers the filler wire to the weld without the use of droplets, or similar processes, the filler wire is not exposed to the atmosphere as much. Therefore, in many welding applications the use of shielding is not required. As such, not only can embodiments of the present invention achieve high welding speeds with little or no porosity or spatter, they can do so without the use of shielding gas.

Figure 19:
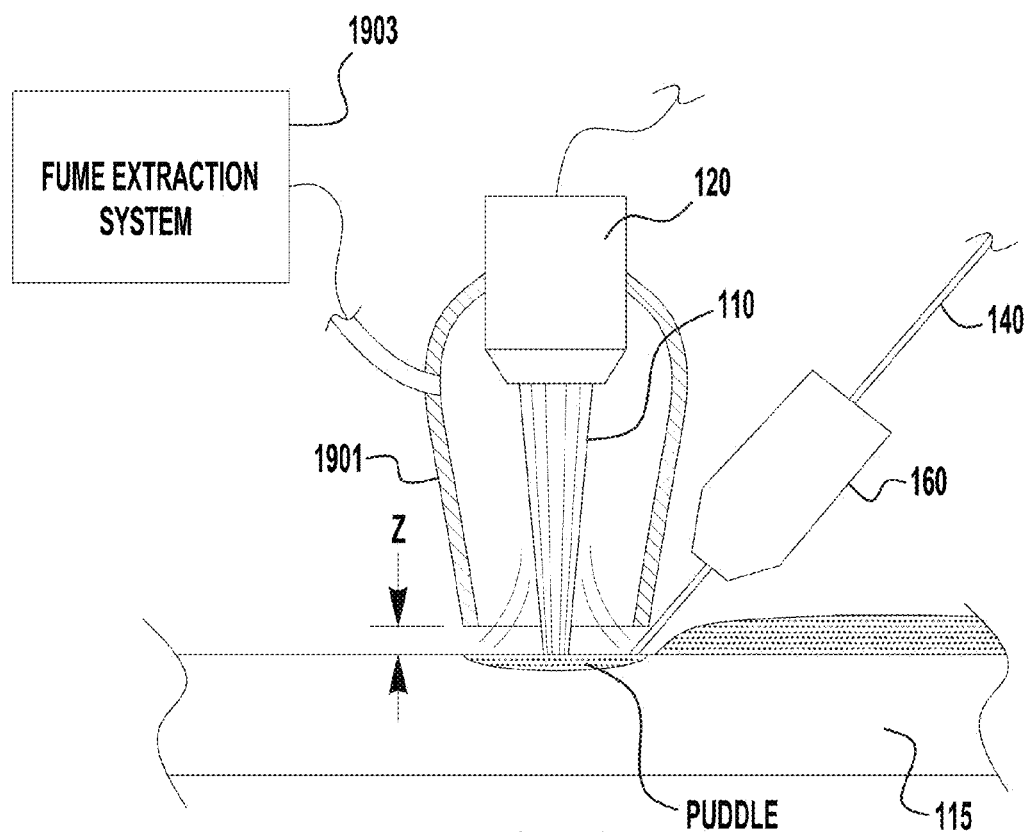
FIG. 19 illustrates an exemplary embodiment of a fume extraction nozzle in accordance with the present invention.

Without having to use shielding, it is possible to locate a fume extraction nozzle much closer to the weld joint during welding, thus providing more efficient and effective fume extraction. When a shielding gas is employed it is necessary to place the fume extraction nozzle at a location such that it does not interfere with the function of the shielding gas. Because of the advantages of the present invention, no such restriction exists and fume extraction can be optimized. For example, in an exemplary embodiment of the present invention the laser beam 110 is protected by a laser shroud assembly 1901 which shields the beam from the laser 120 to near the surface of the workpiece 115. A representation of this can be seen in FIG. 19. The shroud 1901 (shown in cross-section) protects the beam 110 from interference and provides additional safety during operation. Furthermore, the shroud can be coupled to a fume extraction system 1903 which draws any welding fumes away from the welding zone. Because embodiments can be utilized with no shielding gas the shroud 1901 can positioned very close to the weld to directly draw the fumes away from the welding zone. In fact the shroud 1901 can be positioned such that its distance Z above the weld is in the range of 0.125 to 0.5 inches. Of course, other distances can be used but care must be taken not to disturb the weld puddle or to significantly diminish the effectiveness of the shroud 1901. Because fume extraction systems 1903 are generally understood and known in the welding industry their construction and operation will not be discussed in detail herein. Although FIG. 19 shows the shroud 1901 only protecting the beam 110, it is of course possible that the shroud 1901 be constructed such that it encompasses at least a portion of the wire 140 and contact tip 160. For example, it is possible that the bottom opening of the shroud 1901 be large enough to cover nearly the entire weld puddle, or even be larger than the weld puddle, to increase fume extraction.

In exemplary embodiments of the present invention used to weld coated workpieces, such as galvanized work pieces, a much less expensive shielding gas may be employed. For example, a 100% $CO_2$ shielding gas can be used for welding many different materials, including mild steels. This is also true when welding more complex metals, such as stainless steel, duplex steel and super duplex steel, which can be welded with only a 100% nitrogen shielding gas. In typical arc welding operations, the welding of stainless steel, duplex steel or super-duplex steel requires more complex mixtures of shielding gas, which can be quite expensive. Embodiments of the present invention allow these steels to be welded with only a 100% nitrogen shielding gas. Further, other embodiments can have these steels welded with no shielding. In a typical welding process for galvanized materials, a special mix shielding gas must be utilized, such as an argon/$CO_2$ blend. This type of gas needs to be used, in part, because during normal arc welding a cathode and anode is present in the weld zone. However, as explained above and further explained below, there is no welding arc and, as such, there is no anode or cathode present in the weld zone. Therefore, the opportunity for the filler metal to pick up harmful elements from the atmosphere is greatly reduced, as there is no arc and no droplet transfer. It should be noted that even though many embodiments of the present invention permit welding without the use of shielding—like shielding gas—a gas flow can be utilized over the weld to remove vapor or contaminates from the weld zone. That is, during welding it is contemplated that air, nitrogen, $CO_2$, or other gases, can be blown over the weld so as to remove contaminates from the weld zone.

In addition to be able to weld coated materials at high speeds, embodiments of the present invention can also be utilized to weld dual-phase steels with a significantly reduced heat affected zone ("HAZ"). A dual-phase steel is a high strength steel having both a ferrite and martensitic microstructure, thus allowing the steel to have high strength and good formability. Because of the nature of dual-phase steels the strength of a dual phase steel weld is limited by the strength of the heat affected zone. The heat affected zone is the zone around the weld joint (not including the filler metal) which is significantly heated from the welding process such that its microstructure is adversely changed because of the arc welding process. In known arc welding processes the heat affected zone is quite large because of the size of the arc plasma and the high heat input into the weld zone. Because the heat affected zone is quite large the heat affected zone becomes the strength limiting portion of the weld. As such, arc welding processes typically use mild steel filler wires 140 to weld such joints (for example, ER70S-6, or -3 type electrodes) since the use of high strength electrodes is unnecessary. Furthermore, because of this designers must locate welding joints in dual-phase steels strategically out of high stress structures—such as in automobile frames, bumpers, engine cradles, etc.

As discussed above the use of the laser device 120 provides high levels of precision in the creation of the weld puddle. Because of this precision the heat affected zone surrounding the weld bead can be kept very small, or the overall effect of the heat affected zone to the workpiece can be minimized. In fact, in some embodiments the heat affected zone of the work piece can be nearly eliminated. This is done by maintaining the focus of the laser beam 110 only on the portions of the workpiece in which a puddle is to be created. By significantly reducing the size of the heat affected zone the strength of the base metal is not compromised as much as if an arc welding process is used. As such, the presence or location of the heat affected zone is no longer the limiting factor in the design of a welded structure. Embodiments of the present invention allow for the use of higher strength filler wires because the composition and strength of the workpiece and the strength of the filler wire can be the driving factors in a structural design, rather than the heat affected zone. For example, embodiments of the present invention now permit the use of electrodes having at least an 80 ksi yield strength, such as ER80S-D2, type electrodes. Of course, this electrode is intended to be exemplary. Furthermore, because there is less overall heat input then from arc welding the cooling rates of the puddle will be quicker, which means that the chemistry of the filler wires used can be leaner but give equal or greater performance over existing wire.

Additionally, exemplary embodiments of the present invention can be used to weld titanium with significantly reduced shielding requirements. It is known that when welding titanium with an arc welding process great care must be taken to ensure an acceptable weld is created. This is because during the welding process titanium has a strong affinity to react with oxygen. The reaction between titanium and oxygen creates titanium dioxide, which if present in the weld pool may significantly reduce the strength and/or ductility of the weld joint. Because of this, when arc welding titanium it is necessary to provide a significant amount of trailing shielding gas to shield not only the arc but the trailing molten puddle from the atmosphere as the puddle cools. Because of the heat generated from arc welding the weld puddle can be quite large and remain molten for long periods of time, thus requiring a significant amount of shielding gas. Embodiments of the present invention significantly reduce the time the material is molten and rapidly cools so the need for this extra shielding gas is reduced.

As explained above, the laser beam 110 can be focused very carefully to significantly reduce the overall heat input into the weld zone and thus significantly reduce the size of the weld puddle. Because the weld puddle is smaller the weld puddle cools much quicker. As such, there is no need for a trailing shielding gas, but only shielding at the weld. Further, for the similar reasons discussed above the spatter factor when welding titanium is greatly reduced while the rate of welding is increased.

Figure 7:
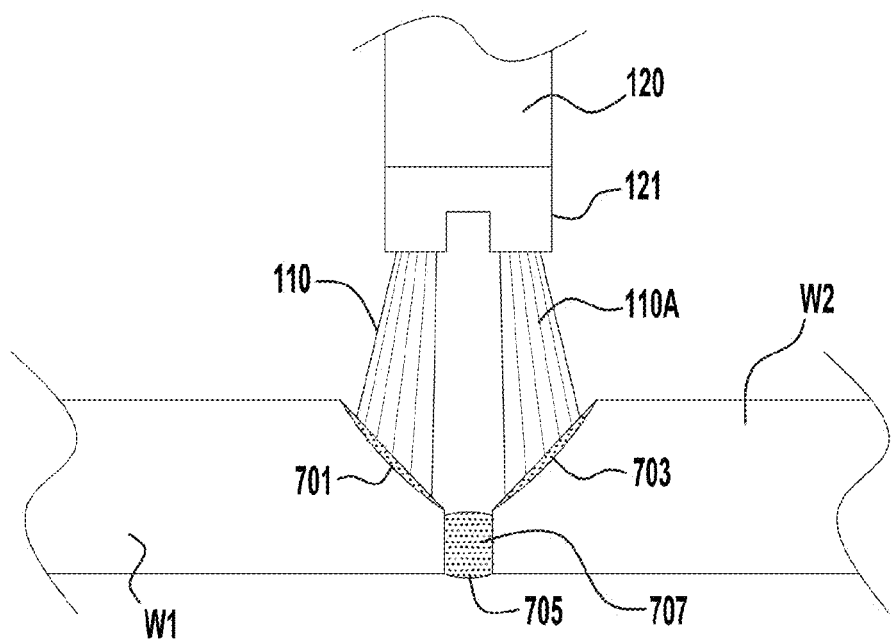
FIGS. 7, 7A, and 7B illustrate additional exemplary embodiments of welding with the present invention.
Figure 7A:
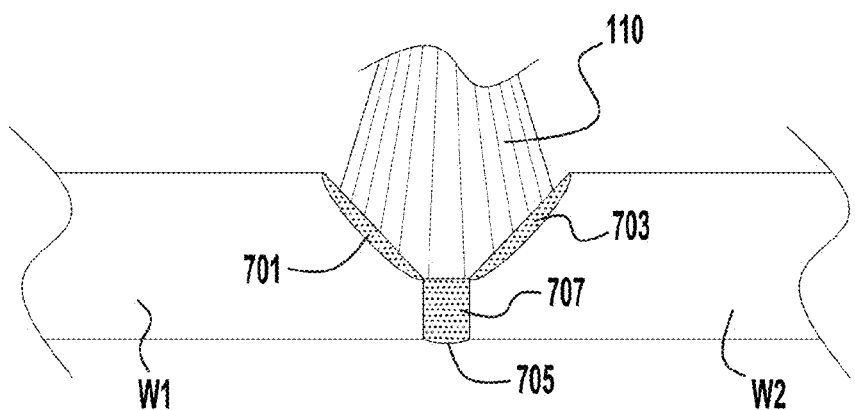

Turning now to FIGS. 7 and 7A, an open root type welding joint is shown. Open root joints are often used to weld thick plates and pipes and can often occur in remote and environmentally difficult locations. There are a number of known methods to weld open root joints, including shielded metal arc welding (SMAW), gas tungsten arc welding (GTAW), gas metal arc welding (GMAW), flux cored arc welding (FCAW), submerged arc welding (SAW), and flux cored arc welding, self shielded (FCAW-S). These welding processes have various disadvantages including the need for shielding, speed limitations, the creation of slag, etc.

Thus, embodiments of the present invention greatly improve the efficiencies and speeds at which these types of welds can be performed. Specifically, the use of shielding gas can be eliminated, or greatly reduced, and the generation of slag can be completely eliminated. Furthermore, welding at high speeds can be obtained with minimal spatter and porosity.

FIGS. 7 and 7A show representative open root welding joints being welded by exemplary embodiments of the present invention. Of course, embodiments of the present invention can be utilized to weld a wide variety of weld joints, not just lap or open root type joints. In FIG. 7 a gap 705 is shown between the workpieces W1/W2 and each respective workpiece has an angled surface 701/703, respectively. Just as discussed above, embodiments of the present invention use a laser device 120 to create a precise molten puddle on the surfaces 701/703 and a pre-heated filler wire (not shown) is deposited into the puddles, respectively, as described above.

In fact, exemplary embodiments of the present invention are not limited to directing a single filler wire to each respective weld puddle. Because no welding arc is generated in the welding process described herein, more than one filler wire can be directed to any one weld puddle. By increasing the number of filler wires to a given weld puddle the overall deposition rate of the weld process can be significantly increased without a significant increase in heat input. Thus, it is contemplated that open root weld joints (such as the type shown in FIGS. 7 and 7A) can be filled in a single weld pass.

Further, as shown in FIG. 7, in some exemplary embodiments of the present invention multiple laser beams 110 and 110A can be utilized to melt more than one location in the weld joint at the same time. This can be accomplished in a number of ways. In a first embodiment, shown in FIG. 7, a beam splitter 121 is utilized and coupled to the laser device 120. A beam splitter 121 is known to those knowledgeable of laser devices and need not be discussed in detail herein. The beam splitter 121 splits the beam from the laser device 120 into two (or more) separate beams 110/110A and can direct them to two different surfaces. In such an embodiment multiple surfaces can be irradiated at the same time, providing further precision and accuracy in welding. In another embodiment, each of the separate beams 110 and 110A can be created by a separate laser device, such that each beam is emitted from its own dedicated device.

In such an embodiment, using multiple laser devices, many aspects of the welding operation can be varied to adapt to different welding needs. For example, the beams generated by the separate laser devices can have different energy densities; can have different shapes, and/or different cross-sectional areas at the weld joint. With this flexibility, aspects of the welding process can be modified and customized to fulfill any specific weld parameters needed. Of course, this can also be accomplished with the utilization of a single laser device and a beam splitter 121, but some of the flexibility may be limited with the use of the single laser source. Further, the present invention is not limited to either a single or double laser configuration, as it is contemplated that any number of lasers can be used as desired.

In further exemplary embodiments, a beam scanning device can be used. Such devices are known in the laser or beam emitting arts and are used to scan the beam 110 in a pattern over a surface of the workpiece. With such devices the scan rates and patterns, as well as the dwell time, can be used to heat the workpiece 115 in the desired fashion. Further, the output power of the energy source (e.g., laser) can be regulated as desired to create the desired puddle formation. Additionally, the optics employed within the laser 120 can be optimized based on the desired operation and joint parameters. For example, line and integrator optics can be utilized to produce a focused line beam for a wide welding or cladding operation or an integrator can be used to produce a square/rectangular beam having a uniform power distribution.

FIG. 7A depicts another embodiment of the present invention, where a single beam 110 is directed to the open root joint to melt the surfaces 701/703.

Because of the precision of the laser beams 110 and 110A, the beams 110/110A can be focused only on the surfaces 701/703 and away from the gap 705. Because of this, the melt-through (which would normally fall through the gap 705) can be controlled which greatly improves the control of the back-side weld bead (the weld bead at the bottom surface of the gap 705).

In each of FIGS. 7 and 7A a gap 705 exists between the workpieces W1 and W2 which is filled with a weld bead 707. In an exemplary embodiment, this weld bead 705 is created by a laser device (not shown). Thus, for example, during a welding operation a first laser device (not shown) directs a first laser beam (not shown) to the gap 705 to weld the workpieces W1 and W2 together with the laser weld bead 707, while the second laser device 120 directs at least one laser beam 110/110A to the surfaces 701/703 to create weld puddles where a filler wires(s) (not shown) is deposited to complete the weld. The gap weld bead 707 can be created just by a laser, if the gap is small enough, or can be created by the use of a laser and a filler wire if the gap 705 so requires. Specifically, it may be necessary to add filler metal to properly fill the gap 705 and thus a filler wire should be used. The creation of this gap bead 705 is similar to that described above with regard to various exemplary embodiments of the present invention.

It should be noted that the high intensity energy sources, such as the laser devices 120 discussed herein, should be of a type having sufficient power to provide the necessary energy density for the desired welding operation. That is, the laser device 120 should have a power sufficient to create and maintain a stable weld puddle throughout the welding process, and also reach the desired weld penetration. For example, for some applications lasers should have the ability to "keyhole" the workpieces being welded. This means that the laser should have sufficient power to fully penetrate the workpiece, while maintaining that level of penetration as the laser travels along the workpiece. Exemplary lasers should have power capabilities in the range of 1 to 20 kW, and may have a power capability in the range of 5 to 20 kW. Higher power lasers can be utilized, but can become very costly. Of course, it is noted that the use of the beam splitter 121 or multiple lasers can be used in other types of weld joints as well, and can be used in lap joints such as those shown in FIGS. 6 and 6A.

Figure 7B:
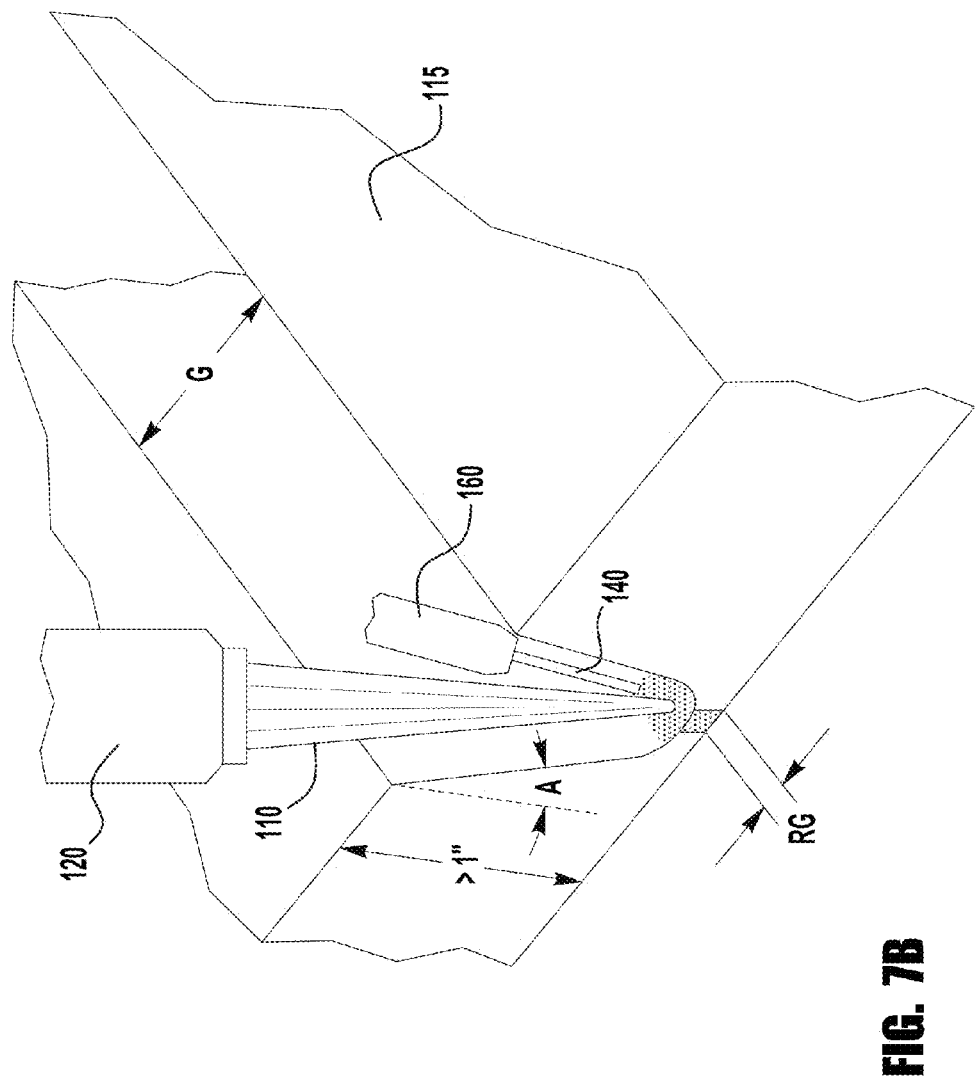

FIG. 7B depicts another exemplary embodiment of the present invention. In this embodiment a narrow groove, deep open root joint is shown. When arc welding deep joints (greater than 1 inch in depth) it can be difficult to weld the bottom of the joint when the gap G for the groove is narrow. This is because it is difficult to effectively deliver shielding gas into such a deep groove and the narrow walls of the groove can cause interference with the stability of a welding arc. Because the workpiece is typically a ferrous material the walls of the joint can interfere, magnetically, with the welding arc. Because of this, when using typical arc welding procedures the gap G of the groove needs to be sufficiently wide so that the arc remains stable. However, the wider the groove the more filler metal is needed to complete the weld. Because embodiments of the present invention do not require a shielding gas and do not use a welding arc these issues are minimized. This allows embodiments of the present invention to weld deep, narrow grooves efficiently and effectively. For example, in an exemplary embodiment of the present invention where the workpiece 115 has a thickness greater than 1 inch, the gap width G is in the range of 1.5 to 2 times the diameter of the filler wire 140 and the sidewall angle is in the range of 0.5 to 10 degrees. In an exemplary embodiment, the root pass preparation of such a weld joint can have a gap RG in the range of 1 to 3 mm with a land in the range of $\frac{1}{16}$ to $\frac{1}{4}$ inch. Thus, deep open root joints can be welded faster and with much less filler material then normal arc welding processes. Further, because aspects of the present invention introduce much less heat into the welding zone, the tip 160 can be designed to facilitate much closer delivery to the weld puddle to avoid contact with the side wall. That is, the tip 160 can be made smaller and constructed as an insulated guide with a narrow structure. In a further exemplary embodiment, a translation device or mechanism can be used to move the laser and wire across the width of the weld to weld both sides of the joint at the same time.

Figure 8:
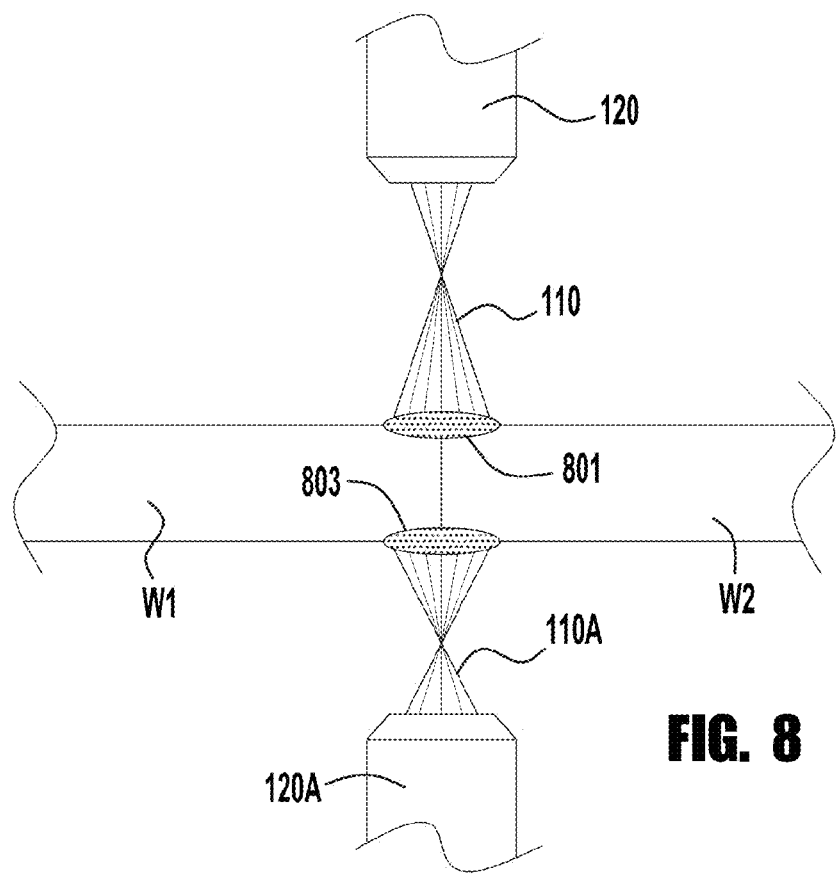
FIG. 8 illustrates a further exemplary embodiment of joining two sides of a joint at the same time.

As shown in FIG. 8 a butt-type joint can be welded with embodiments of the present invention. In FIG. 8 a flush butt-type joint is shown, however it is contemplated that butt-type joints with v-notch groves on the upper and bottom surfaces of the weld joint can be also welded. In the embodiment shown in FIG. 8, two laser devices 120 and 120A are shown on either side of the weld joint, each respectively creating their own weld puddle 801 and 803. Like FIGS. 7 and 7A the heated filler wires are not shown as they are trailing behind the laser beams 110/110A in the view shown.

When welding butt-type joints with known arc technology there can be significant problems with "arc blow", which occurs when the magnetic fields generated by welding arcs interfere with each other such that the arcs cause each other to move erratically. Further, when two or more arc welding systems are being used to weld on a the same weld joint there can be significant issues caused by the interference of the respective welding currents. Additionally, because of the depth of penetration of arc welding methods, due to—in part—the high heat input, the thicknesses of the workpieces that can be welded with arcs on either side of the weld joint are limited. That is, such welding cannot be done on thin workpieces.

When welding with embodiments of the present invention, these issues are eliminated. Because there is no welding arc being utilized there is no arc blow interference or welding current interference issues. Further, because of the precise control in heat input and depth of penetration which is capable through the use of lasers, much thinner workpieces can be welded on both sides of the weld joint at the same time.

Figure 9:
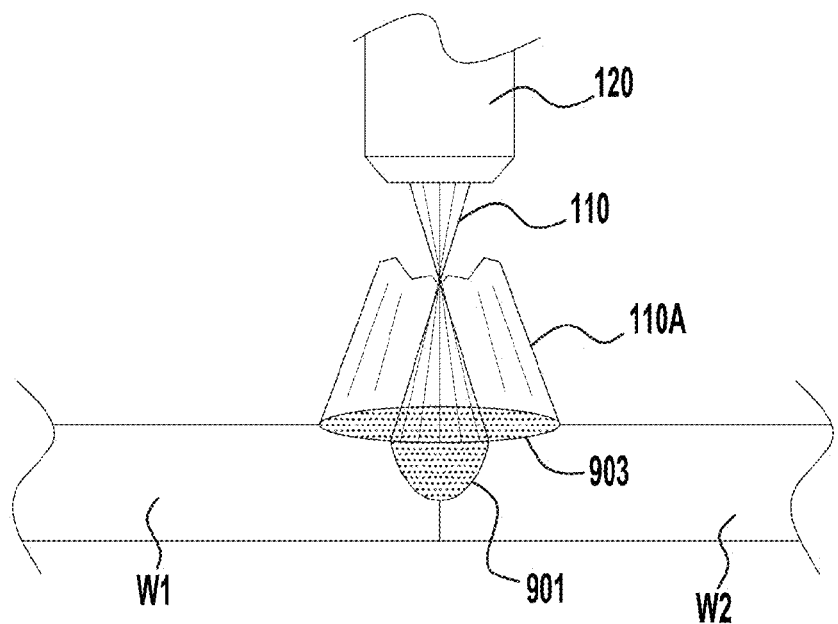
FIG. 9 illustrates another exemplary embodiment of welding with the present invention.

A further exemplary embodiment of the present invention is shown in FIG. 9. In this embodiment two laser beams 110 and 110A are utilized—in line with each other—to create a unique weld profile. In the embodiment shown a first beam 110 (emitted from a first laser device 120) is used to create first portion of a weld puddle 901 having a first cross-sectional area and depth, while the second beam 110A (emitted from a second laser device—not shown) is used to create a second portion of a weld puddle 903 having a second cross-sectional area and depth, which is different from the first. This embodiment can be used when it is desirable to have a portion of the weld bead having a deeper depth of penetration than the remainder of the weld bead. For example, as shown in FIG. 9 the puddle 901 is made deeper and narrower than the weld puddle 903 which is made wider and shallower. Such an embodiment can be used when a deep penetration level is needed where the work pieces meet but is not desired for the entire portion of the weld joint.

In a further exemplary embodiment of the present invention, the first puddle 903 can be the weld puddle which creates the weld for the joint. This first puddle/joint is created with a first laser 120 and a filler wire (not shown), and is made to appropriate depth of penetration. After this weld joint is made a second laser (not shown) emitting a second laser beam 110A passes over the joint to create a second puddle 903 with a different profile where this second puddle is used to deposit an overlay of some kind as discussed with the embodiments above. This overlay will be deposited using a second filler wire, having a different chemistry than the first filler wire. For example, embodiments of this invention can be used to place a corrosion resistant cladding layer over the weld joint shortly or immediately after the joint is welded. This welding operation can also be accomplished with a single laser device 120 where the beam 110 is oscillated between a first beam shape/density and a second beam shape/density to provide the desired weld puddle profile. Thus, it is not necessary for multiple laser devices to be employed.

As explained above, a corrosion resistant coating on the workpieces (such as galvanization), is removed during the welding process. However it may be desirable to have the weld joint coated again for corrosion resistance purposes and so the second beam 110A and laser can be used to add a corrosion resistant overlay 903, such as a cladding layer, on top of the joint 901.

Because of the various advantages of the present invention, it is also possible to easily join dissimilar metals via a welding operation. Joining dissimilar metals with an arc welding process is difficult using an arc welding process because the dissimilar materials and the required chemistries for a filler material can lead to cracking and inferior welds. This is particularly true when attempting to arc weld aluminum and steel together, which have very different melting temperatures, or when trying weld stainless steels to mild steel, because of their different chemistries. However, with embodiments of the present invention, such issues are mitigated.

Figure 10:
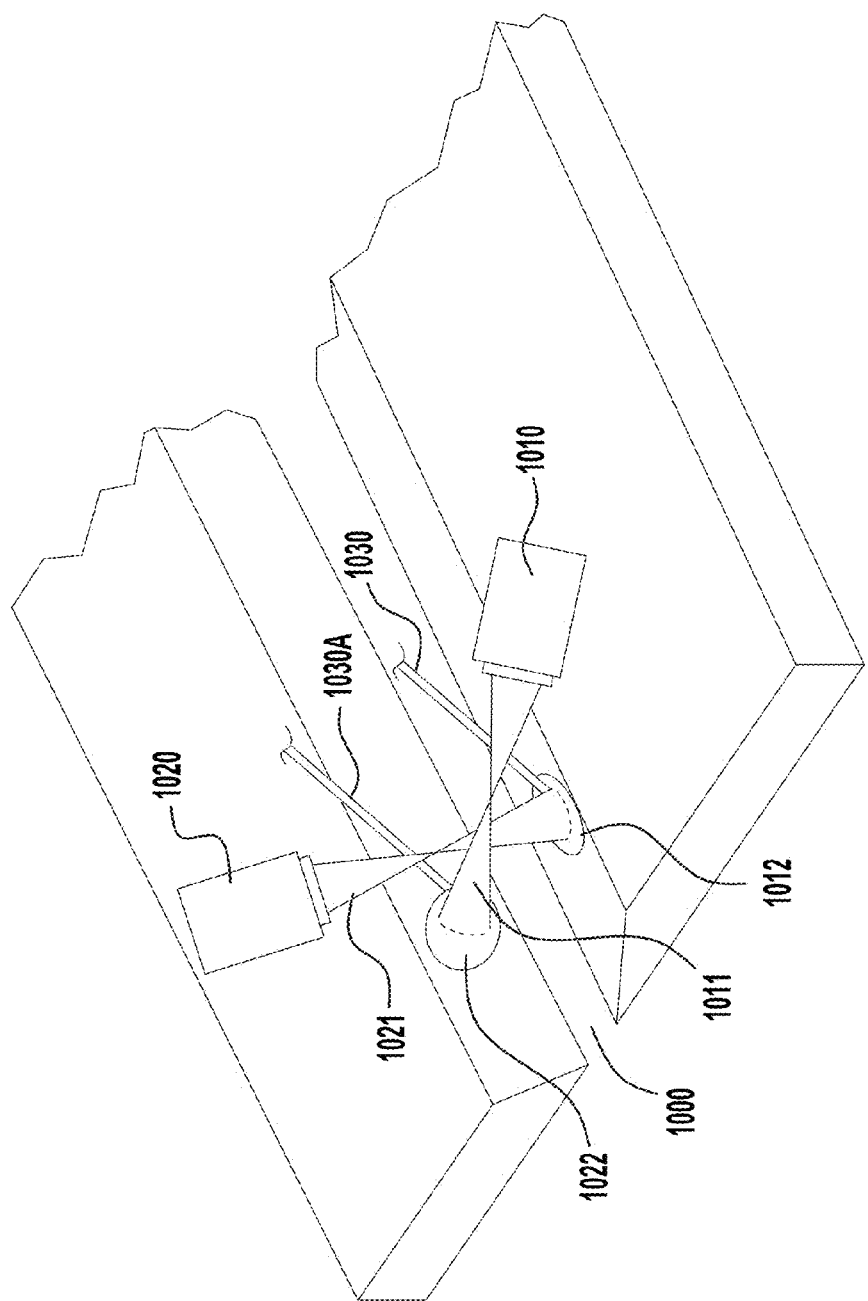
FIG. 10 illustrates another exemplary embodiment of the present invention in welding a joint with multiple lasers and wires.

FIG. 10 depicts an exemplary embodiment of this invention. Although a V-type joint is shown, the present invention is not limited in this regard. In FIG. 10 two dissimilar metals are shown being joined at a weld joint 1000. In this example, the two dissimilar metals are aluminum and steel. In this exemplary embodiment, two different laser sources 1010 and 1020 are employed. However, two laser devices are not required in all embodiments as a single device can be oscillated to provide the necessary energy to melt the two different materials—this will be discussed further below. Laser 1010 emits the beam 1011 which is directed at the steel workpiece and the laser 1020 emits the beam 1021 at the aluminum workpiece. Because each of the respective workpieces is made from different metals or alloys they have different melting temperatures. As such, each of the respective laser beams 1011/1021 has different energy densities at the weld puddles 1012 and 1022. Because of the differing energy densities each of the respective weld puddles 1012 and 1022 can be maintained at the proper size and depth. This also prevents excessive penetration and heat input in the workpiece with the lower melting temperature—for example, aluminum. In some embodiments, because of at least the weld joint, there is no need to have two separate, discrete weld puddles (as shown in FIG. 10), rather a single weld puddle can be formed with both work pieces, where the melted portions of each of the workpieces form a single weld puddle. Further, if the work pieces have different chemistries but have similar melting temperatures, it is possible to use a single beam to irradiate both work pieces at the same time, with the understanding that one work piece will melt more than the other. Further, as briefly described above, it is possible to use a single energy source (like laser device 120) to irradiate both work pieces. For example, a laser device 120 could use a first beam shape and/or energy density to melt the first work piece and then oscillate/change to a second beam shape and/or energy density to melt the second work piece. The oscillation and changing of the beam characteristics should be accomplished at a sufficient rate to ensure that proper melting of both work pieces is maintained so that the weld puddle(s) are kept stable and consistent during the welding process. Other single beam embodiments can utilize a beam 110 having a shape which provides more heat input into one workpiece over the other to ensure sufficient melting of each workpiece. In such embodiments the energy density of the beam can be uniform for the cross-section of the beam. For example, the beam 110 can have a trapezoidal or triangular shape so that the overall heat input into one workpiece will be less than other, because of the shape of the beam. Alternatively, some embodiments can use a beam 110 having a non-uniform energy distribution in its cross-section. For example, the beam 110 can have a rectangular shape (such that it impacts both workpieces) but a first region of the beam will have a first energy density and a second region of the beam 110 will have a second energy density which is different than the first region, so each of the regions can appropriately melt the respective workpieces. As an example, the beam 110 can have a first region with a high energy density to melt a steel workpiece while the second region will have a lower energy density to melt an aluminum workpiece.

In FIG. 10 two filler wires 1030 and 1030A are shown, each being directed to a weld puddle 1012 and 1022, respectively. Although the embodiment shown in FIG. 10 is employing two filler wires, the present invention is not limited in this regard. As discussed above with respect to other embodiments, it is contemplated that only one filler wire can be used, or more than two wires can be used, depending on the desired weld parameters, such as the desired bead shape and deposition rate. When a single wire is employed it can be directed to either a common puddle (formed from the melted portions of both of the workpieces), or the wire can be directed to only one of melted portions for integration into the weld joint. Thus, for example, in the embodiment shown in FIG. 10 a wire can be directed to the melted portion 1022 which will then be combined with the melted portion 1012 for formation of the weld joint. Of course, if a single wire is employed it should be heated to a temperature to allow the wire to melt in the portion 1022/1012 into which it is being immersed.

Because dissimilar metals are being joined the chemistry of the filler wires should be chosen to ensure that the wires can sufficiently bond with the metals being joined. Furthermore, the composition of the filler wire(s) should be chosen such that it has a suitable melt temperature, which allows it to melt and be consumed in the weld puddle of the lower temperature weld puddle. In fact, it is contemplated that the chemistries of the multiple filler wires can be different to attain the proper weld chemistry. This is particularly the case when the two different workpieces have material compositions where minimal admixture will occur between the materials. In FIG. 10, the lower temperature weld puddle is the aluminum weld puddle 1012, and as such the filler wire(s) 1030(A) are formulated so as to melt at a similar temperature so that they can be easily consumed in the puddle 1012. In the example above, using aluminum and steel work pieces, the filler wires can be silicon bronze, nickel aluminum bronze or aluminum bronze based wire having a melting temperature similar to that of the workpiece. Of course, it is contemplated that the filler wire compositions should be chosen to match the desired mechanical and welding performance properties, while at the same time providing melting characteristics which are similar to that of the at least one of the workpieces to be welded.

Figure 11A:
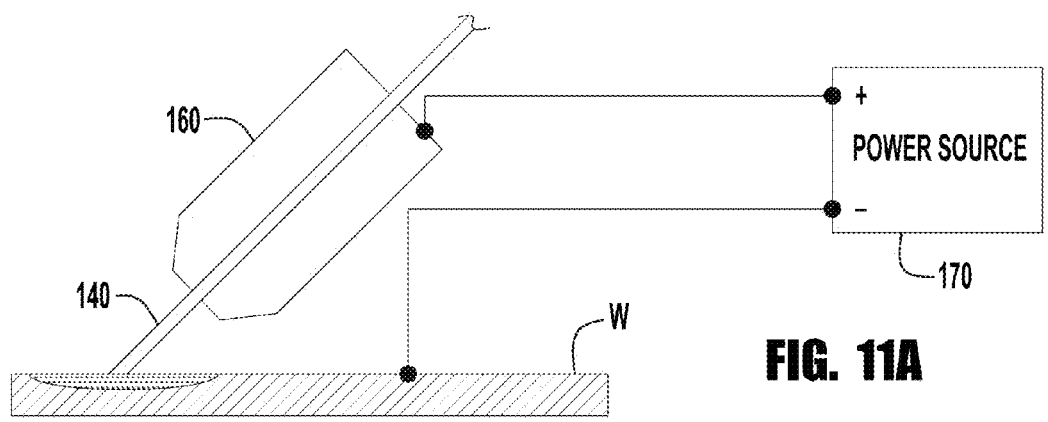
FIGS. 11A to 11C depict exemplary embodiments of contact tips used with embodiments of the present invention.
Figure 11B:
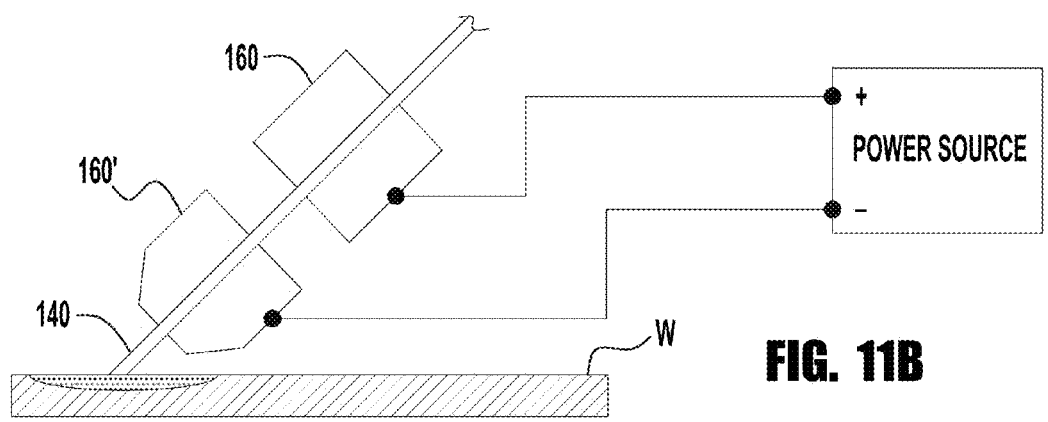
Figure 11C:
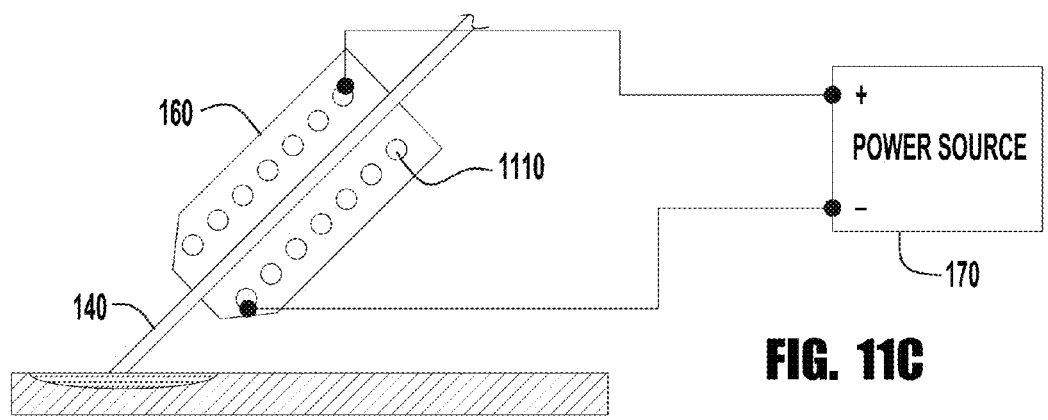

FIGS. 11A through 11C depict various embodiments of the tip 160 that can be employed. FIG. 11A depicts a tip 160 which is very similar in construction and operation to that of a normal arc welding contact tip. During hot wire welding as described herein the heating current is directed to the contact tip 160 from the power supply 170 and is passed from the tip 160 into the wire 140. The current is then directed through the wire to the workpiece via the contact of the wire 140 to the workpiece W. This flow of current heats the wire 140 as described herein. Of course, the power supply 170 may not be directly coupled to the contact tip as shown but may be coupled to a wire feeder 150 which directs the current to the tip 160. FIG. 11B shows another embodiment of the present invention, where the tip 160 is comprised of two components 160 and 160', such that the negative terminal of the power supply 170 is coupled to the second component 160'. In such an embodiment the heating current flows from the first tip component 160 to the wire 140 and then into the second tip components 160'. The flow of the current through the wire 140, between the components 160 and 160' causes the wire to heat as described herein. FIG. 11C depicts another exemplary embodiment where the tip 160 contains an induction coil 1110, which causes the tip 160 and the wire 140 to be heated via induction heating. In such an embodiment, the induction coil 1110 can be made integral with the contact tip 160 or can be coiled around a surface of the tip 160. Of course, other configurations can be used for the tip 160 so long as the tip deliveries the needed heating current/power to the wire 140 so that the wire can achieve the desired temperature for the welding operation.

The operation of exemplary embodiments of the present invention will be described. As discussed above, embodiments of the present invention employ both a high intensity energy source and a power supply which heats the filler wire. Each aspect of this process will be discussed in turn. It is noted that the following descriptions and discussions are not intended to supplant or replace any of the discussions provided previously with respect to the previously discussed overlaying embodiments, but are intended to supplement those discussions relative to welding or joining applications. The discussions previously regarding overlaying operations are incorporated also for purposes of joining and welding.

Exemplary embodiments for joining/welding can be similar to that shown in FIG. 1. As described above a hot wire power supply 170 is provided which provides a heating current to the filler wire 140. The current pass from the contact tip 160 (which can be of any known construction) to the wire 140 and then into the workpiece. This resistance heating current causes the wire 140 between the tip 160 and the workpiece to reach a temperature at or near the melting temperature of the filler wire 140 being employed. Of course, the melting temperature of the filler wire 140 will vary depending on the size and chemistry of the wire 140. Accordingly, the desired temperature of the filler wire during welding will vary depending on the wire 140. As will be further discussed below, the desired operating temperature for the filler wire can be a data input into the welding system so that the desired wire temperature is maintained during welding. In any event, the temperature of the wire should be such that the wire is consumed into the weld puddle during the welding operation. In exemplary embodiments, at least a portion of the filler wire 140 is solid as the wire enters the weld puddle. For example, at least 30% of the filler wire is solid as the filler wire enters the weld puddle.

In an exemplary embodiment of the present invention, the hot wire power supply 170 supplies a current which maintains at least a portion of the filler wire at a temperature at or above 75% of its melting temperature. For example, when using a mild steel filler wire 140 the temperature of the wire before it enters the puddle can be approximately 1,600° F., whereas the wire has a melting temperature of about 2,000° F. Of course, it is understood that the respective melting temperatures and desired operational temperatures will varying on at least the alloy, composition, diameter and feed rate of the filler wire. In another exemplary embodiment, the power supply 170 maintains a portion of the filler wire at a temperature at or above 90% of its melting temperature. In further exemplary embodiments, portions of the wire are maintained at a temperature of the wire which is at or above 95% of its melting temperature. In exemplary embodiments, the wire 140 will have a temperature gradient from the point at which the heating current is imparted to the wire 140 and the puddle, where the temperature at the puddle is higher than that at the input point of the heating current. It is desirable to have the hottest temperature of the wire 140 at or near the point at which the wire enters the puddle to facilitate efficient melting of the wire 140. Thus, the temperature percentages stated above are to be measured on the wire at or near the point at which the wires enters the puddle. By maintaining the filler wire 140 at a temperature close to or at its melting temperature the wire 140 is easily melted into or consumed into the weld puddle created by the heat source/laser 120. That is, the wire 140 is of a temperature which does not result in significantly quenching the weld puddle when the wire 140 makes contact with the puddle. Because of the high temperature of the wire 140 the wire melts quickly when it makes contact with the weld puddle. It is desirable to have the wire temperature such that the wire does not bottom out in the weld pool—make contact with the non-melted portion of the weld pool. Such contact can adversely affect the quality of the weld.

As described previously, in some exemplary embodiments, the complete melting of the wire 140 can be facilitated only by entry of the wire 140 into the puddle. However, in other exemplary embodiments the wire 140 can be completely melted by a combination of the puddle and the laser beam 110 impacting on a portion of the wire 140. In yet other embodiments of the present invention, the heating/melting of the wire 140 can be aided by the laser beam 110 such that the beam 110 contributes to the heating of the wire 140. However, because many filler wires 140 are made of materials which can be reflective, if a reflective laser type is used the wire 140 should be heated to a temperature such that its surface reflectivity is reduced, allowing the beam 110 to contribute to the heating/melting of the wire 140. In exemplary embodiments of this configuration, the wire 140 and beam 110 intersect at the point at which the wire 140 enters the puddle.

As also discussed previously with regard to FIG. 1, the power supply 170 and the controller 195 control the heating current to the wire 140 such that, during welding, the wire 140 maintains contact with the workpiece and no arc is generated. Contrary to arc welding technology, the presence of an arc when welding with embodiments of the present invention can result in significant weld deficiencies. Thus, in some embodiments (as those discussed above) the voltage between the wire 140 and the weld puddle should be maintained at or near 0 volts—which indicates that the wire is shorted to or in contact with the workpiece/weld puddle.

However, in other exemplary embodiments of the present invention it is possible to provide a current at such a level so that a voltage level above 0 volts is attained without an arc being created. By utilizing higher currents values it is possible to maintain the electrode 140 at temperatures at a higher level and closer to an electrode's melting temperature. This allows the welding process to proceed faster. In exemplary embodiments of the present invention, the power supply 170 monitors the voltage and as the voltage reaches or approaches a voltage value at some point above 0 volts the power supply 170 stops flowing current to the wire 140 to ensure that no arc is created. The voltage threshold level will typically vary, at least in part, due to the type of welding electrode 140 being used. For example, in some exemplary embodiments of the present invention the threshold voltage level is at or below 6 volts. In another exemplary embodiment, the threshold level is at or below 9 volts. In a further exemplary embodiment, the threshold level is at or below 14 volts, and in an additional exemplary embodiment; the threshold level is at or below 16 volts. For example, when using mild steel filler wires the threshold level for voltage will be of the lower type, while filler wires which are for stainless steel welding can handle the higher voltage before an arc is created.

In further exemplary embodiments, rather than maintaining a voltage level below a threshold, such as above, the voltage is maintained in an operational range. In such an embodiment, it is desirable to maintain the voltage above a minimum amount—ensuring a high enough current to maintain the filler wire at or near its melting temperature but below a voltage level such that no welding arc is created. For example, the voltage can be maintained in a range of 1 to 16 volts. In a further exemplary embodiment the voltage is maintained in a range of 6 to 9 volts. In another example, the voltage can be maintained between 12 and 16 volts. Of course, the desired operational range can be affected by the filler wire 140 used for the welding operation, such that a range (or threshold) used for a welding operation is selected, at least in part, based on the filler wire used or characteristics of the filler wire used. In utilizing such a range the bottom of the range is set to a voltage at which the filler wire can be sufficiently consumed in the weld puddle and the upper limit of the range is set to a voltage such that the creation of an arc is avoided.

As described previously, as the voltage exceeds a desired threshold voltage the heating current is shut off by the power supply 170 such that no arc is created. This aspect of the present invention will be discussed further below.

In the many embodiments described above the power supply 170 contains circuitry which is utilized to monitor and maintain the voltage as described above. The construction of such type of circuitry is known to those in the industry. However, traditionally such circuitry has been utilized to maintain voltage above a certain threshold for arc welding.

In further exemplary embodiments, the heating current can also be monitored and/or regulated by the power supply 170. This can be done in addition to monitoring voltage, power, or some level of a voltage/amperage characteristic as an alternative. That is, the current can be maintained at a desired level or levels to ensure that the wire 140 is maintained at an appropriate temperature—for proper consumption in the weld puddle, but yet below an arc generation current level. For example, in such an embodiment the voltage and/or the current are being monitored to ensure that either one or both are within a specified range or below a desired threshold. The power supply then regulates the current supplied to ensure that no arc is created but the desired operational parameters are maintained.

In yet a further exemplary embodiment of the present invention, the heating power (V×I) can also be monitored and regulated by the power supply 170. Specifically, in such embodiments the voltage and current for the heating power is monitored to be maintained at a desired level, or in a desired range. Thus, the power supply not only regulates the voltage or current to the wire, but can regulate both the current and the voltage. Such an embodiment may provide improved control over the welding system. In such embodiments the heating power to the wire can be set to an upper threshold level or an optimal operational range such that the power is to be maintained either below the threshold level or within the desired range (similar to that discussed above regarding the voltage). Again, the threshold or range settings will be based on characteristics of the filler wire and welding being performed, and can be based—at least in part—on the filler wire selected. For example, it may be determined that an optimal power setting for a mild steel electrode having a diameter of 0.045" is in the range of 1950 to 2,050 watts. The power supply will regulate the voltage and current such that the power remains in this operational range. Similarly, if the power threshold is set at 2,000 watts, the power supply will regulate the voltage and current so that the power level does not exceed but is close to this threshold.

In further exemplary embodiments of the present invention, the power supply 170 contains circuits which monitor the rate of change of the heating voltage (dv/dt), current (di/dt), and or power (dp/dt). Such circuits are often called premonition circuits and their general construction is known. In such embodiments, the rate of change of the voltage, current and/or power is monitored such that if the rate of change exceeds a certain threshold the heating current to the wire 140 is turned off.

In an exemplary embodiment of the present invention, the change of resistance (dr/dt) is also monitored. In such an embodiment, the resistance in the wire between the contact tip and the puddle is monitored. During welding, as the wire heats up it starts to neck down and has a tendency to form an arc, during which time the resistance in the wire increases exponentially. When this increase is detected the output of the power supply is turned off as described herein to ensure an arc is not created. Embodiments regulate the voltage, current, or both, to ensure that the resistance in the wire is maintained at a desired level.

In further exemplary embodiments of the present invention, rather than shutting off the heating current when the threshold level is detected, the power supply 170 reduces the heating current to a non-arc generation level. Such a level can be a background current level where no arc will be generated if the wire is separated from the weld puddle. For example, an exemplary embodiment of the present invention can have a non-arc generation current level of 50 amps, where once an arc generation is detected or predicted, or an upper threshold (discussed above) is reached, the power supply 170 drops the heating current from its operating level to the non-arc generation level for either a predetermined amount of time (for example, 1 to 10 ms) or until the detected voltage, current, power, and/or resistance drops below the upper threshold. This non-arc generation threshold can be a voltage level, current level, resistance level, and/or a power level. In such embodiments, by maintaining a current output during an arc generation event—albeit at a low level—it can cause a quicker recovery to the heating current operational level.

In another exemplary embodiment of the present invention, the output of the power supply 170 is controlled such that no substantial arc is created during the welding operation. In some exemplary welding operations the power supply can be controlled such that no substantial arc is created between the filler wire 140 and the puddle. It is generally known that an arc is created between a physical gap between the distal end of the filler wire 140 and the weld puddle. As described above, exemplary embodiments of the present invention prevent this arc from being created by keeping the filler wire 140 in contact with the puddle. However, in some exemplary embodiments the presence of an insubstantial arc will not compromise the quality of the weld. That is, in some exemplary welding operations the creation of an insubstantial arc of a short duration will not result in a level of heat input that will compromise the weld quality. In such embodiments, the welding system and power supply is controlled and operated as described herein with respect to avoiding an arc completely, but the power supply 170 is controlled such that to the extent an arc is created the arc is insubstantial. In some exemplary embodiments, the power supply 170 is operated such that a created arc has a duration of less than 10 ms. In other exemplary embodiments the arc has a duration of less than 1 ms, and in other exemplary embodiments the arc has a duration of less than 300 μs. In such embodiments, the existence of such arcs does not compromise the weld quality because the arc does not impart substantial heat input into the weld or cause significant spatter or porosity. Thus, in such embodiments the power supply 170 is controlled such that to the extent an arc is created it is kept insubstantial in duration so that the weld quality is not compromised. The same control logic and components as discussed herein with respect to other embodiments can be used in these exemplary embodiments. However, for the upper threshold limit the power supply 170 can use the detection of the creation of an arc, rather than a threshold point (of current, power, voltage, resistance) below a predetermined or predicted arc creation point. Such an embodiment can allow the welding operation to operate closer to its limits.

Because the filler wire 140 is desired to be in a constantly shorted state (in constant contact with the weld puddle) the current tends to decay at a slow rate. This is because of the inductance present in the power supply, welding cables and workpiece. In some applications, it may be necessary to force the current to decay at a faster rate such that the current in the wire is reduced at a high rate. Generally, the faster the current can be reduced the better control over the joining method will be achieved. In an exemplary embodiment of the present invention, the ramp down time for the current, after detection of a threshold being reached or exceeded, is 1 millisecond. In another exemplary embodiment of the present invention, the ramp down time for the current is 300 microseconds or less. In another exemplary embodiment, the ramp down time is in the range of 300 to 100 microseconds.

Figure 18:
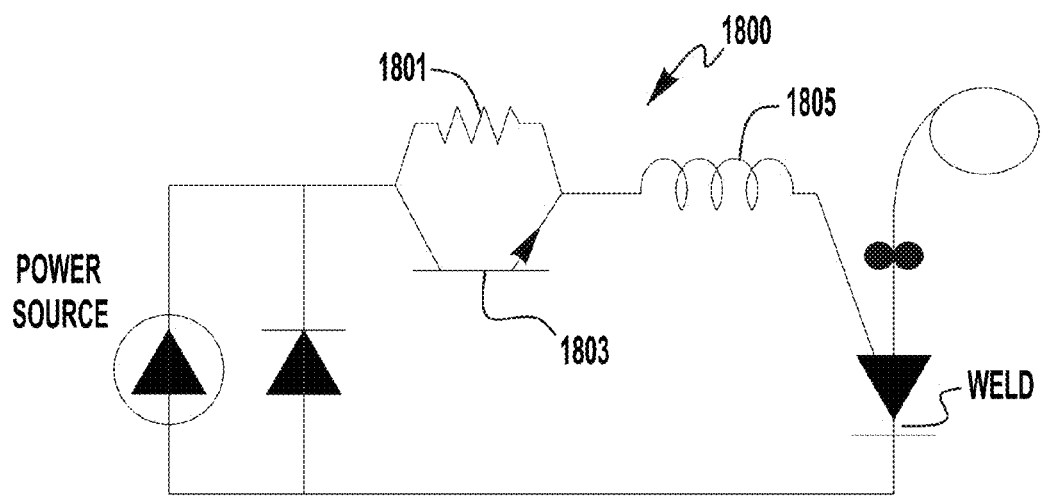
FIG. 18 illustrates an exemplary embodiment of a ramp down circuit which can be used in embodiments of the present invention.

In an exemplary embodiment, to achieve such ramp down times, a ramp down circuit is introduced into the power supply 170 which aids in reducing the ramp down time when an arc is predicted or detected. For example, when an arc is either detected or predicted a ramp down circuit opens up which introduces resistance into the circuit. For example, the resistance can be of a type which reduces the flow of current to below 50 amps in 50 microseconds. A simplified example of such a circuit is shown in FIG. 18. The circuit 1800 has a resistor 1801 and a switch 1803 placed into the welding circuit such that when the power supply is operating and providing current the switch 1803 is closed. However, when the power supply stops supplying power (to prevent the creation of an arc or when an arc is detected) the switch opens forcing the induced current through the resistor 1801. The resistor 1801 greatly increases the resistance of the circuit and reduces the current at a quicker pace. Such a circuit type is generally known in the welding industry can be found a Power Wave® welding power supply manufactured by The Lincoln Electric Company, of Cleveland, Ohio, which incorporates surface-tension-transfer technology ("STT"). STT technology is generally described in U.S. Pat. Nos. 4,866,247, 5,148,001, 6,051,810 and 7,109,439, which are incorporated herein by reference in their entirety. Of course, these patents generally discuss using the disclosed circuitry to ensure that an arc is created and maintained—those skilled in the industry can easily adapt such a system to ensure that no arc is created.

Figure 12:
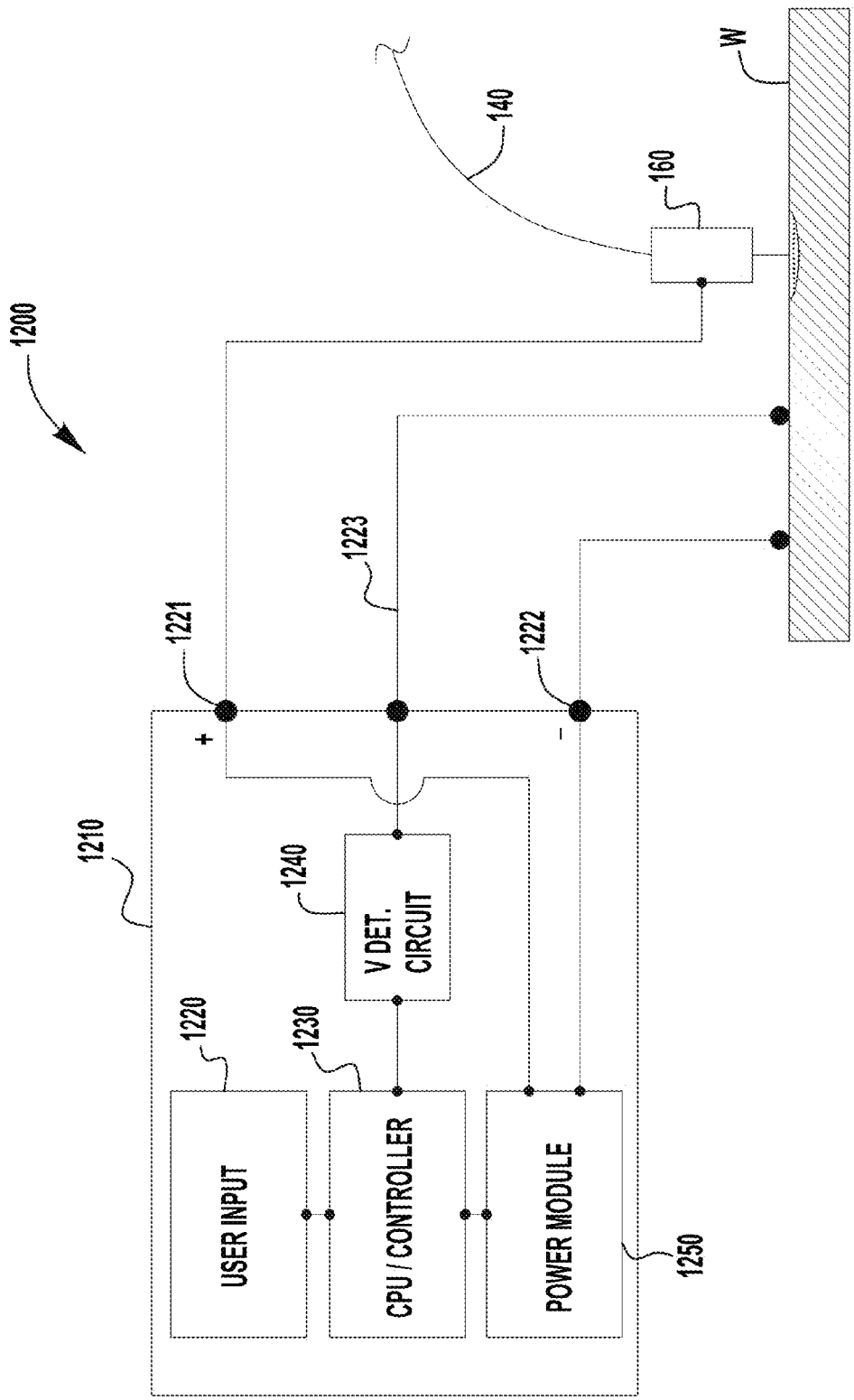
FIG. 12 illustrates a hot wire power supply system in accordance with an embodiment of the present invention.

The above discussion can be further understood with reference to FIG. 12, in which an exemplary welding system is depicted. (It should be noted that the laser system is not shown for clarity). The system 1200 is shown having a hot wire power supply 1210 (which can be of a type similar to that shown as 170 in FIG. 1). The power supply 1210 can be of a known welding power supply construction, such as an inverter-type power supply. Because the design, operation and construction of such power supplies are known they will not be discussed in detail herein. The power supply 1210 contains a user input 1220 which allows a user to input data including, but not limited to, wire feed speed, wire type, wire diameter, a desired power level, a desired wire temperature, voltage and/or current level. Of course, other input parameters can be utilized as needed. The user interface 1220 is coupled to a CPU/controller 1230 which receives the user input data and uses this information to create the needed operational set points or ranges for the power module 1250. The power module 1250 can be of any known type or construction, including an inverter or transformer type module.

The CPU/controller 1230 can determine the desired operational parameters in any number of ways, including using a lookup table, In such an embodiment, the CPU/controller 1230 utilizes the input data, for example, wire feed speed, wire diameter and wire type to determine the desired current level for the output (to appropriately heat the wire 140) and the threshold voltage or power level (or the acceptable operating range of voltage or power). This is because the needed current to heat the wire 140 to the appropriate temperature will be based on at least the input parameters. That is, an aluminum wire 140 may have a lower melting temperature than a mild steel electrode, and thus requires less current/power to melt the wire 140. Additionally, a smaller diameter wire 140 will require less current/power than a larger diameter electrode. Also, as the wire feed speed increases (and accordingly the deposition rate) the needed current/power level to melt the wire will be higher.

Similarly, the input data will be used by the CPU/controller 1230 to determine the voltage/power thresholds and/or ranges (e.g., power, current, and/or voltage) for operation such that the creation of an arc is avoided. For example, for a mild steel electrode having a diameter of 0.045 inches can have a voltage range setting of 6 to 9 volts, where the power module 1250 is driven to maintain the voltage between 6 to 9 volts. In such an embodiment, the current, voltage, and/or power are driven to maintain a minimum of 6 volts—which ensures that the current/power is sufficiently high to appropriately heat the electrode—and keep the voltage at or below 9 volts to ensure that no arc is created and that a melting temperature of the wire 140 is not exceeded. Of course, other set point parameters, such as voltage, current, power, or resistance rate changes can also be set by the CPU/controller 1230 as desired.

As shown, a positive terminal 1221 of the power supply 1210 is coupled to the contact tip 160 of the hot wire system and a negative terminal of the power supply is coupled to the workpiece W. Thus, a heating current is supplied through the positive terminal 1221 to the wire 140 and returned through the negative terminal 1222. Such a configuration is generally known.

Of course, in another exemplary embodiment the negative terminal 1222 can also be connected to the tip 160. Since resistance heating can be used to heat the wire 140, the tip can be of a construction (as shown in FIG. 11) where both the negative and positive terminals 1221/1222 can be coupled to the contact tip 140 to heat the wire 140. For example, the contact tip 160 can have a dual construction (as shown in FIG. 11B) or use an induction coil (as shown in FIG. 11C).

A feedback sense lead 1223 is also coupled to the power supply 1210. This feedback sense lead can monitor voltage and deliver the detected voltage to a voltage detection circuit 1240. The voltage detection circuit 1240 communicates the detected voltage and/or detected voltage rate of change to the CPU/controller 1230 which controls the operation of the module 1250 accordingly. For example, if the voltage detected is below a desired operational range, the CPU/controller 1230 instructs the module 1250 to increase its output (current, voltage, and/or power) until the detected voltage is within the desired operational range. Similarly, if the detected voltage is at or above a desired threshold the CPU/controller 1230 instructs the module 1250 to shut off the flow of current to the tip 160 so that an arc is not created. If the voltage drops below the desired threshold the CPU/controller 1230 instructs the module 1250 to supply a current or voltage, or both to continue the welding process. Of course, the CPU/controller 1230 can also instruct the module 1250 to maintain or supply a desired power level.

It is noted that the detection circuit 1240 and CPU/controller 1230 can have a similar construction and operation as the controller 195 shown in FIG. 1. In exemplary embodiments of the present invention, the sampling/detection rate is at least 10 KHz. In other exemplary embodiments, the detection/sampling rate is in the range of 100 to 200 KHz.

Figure 13A:
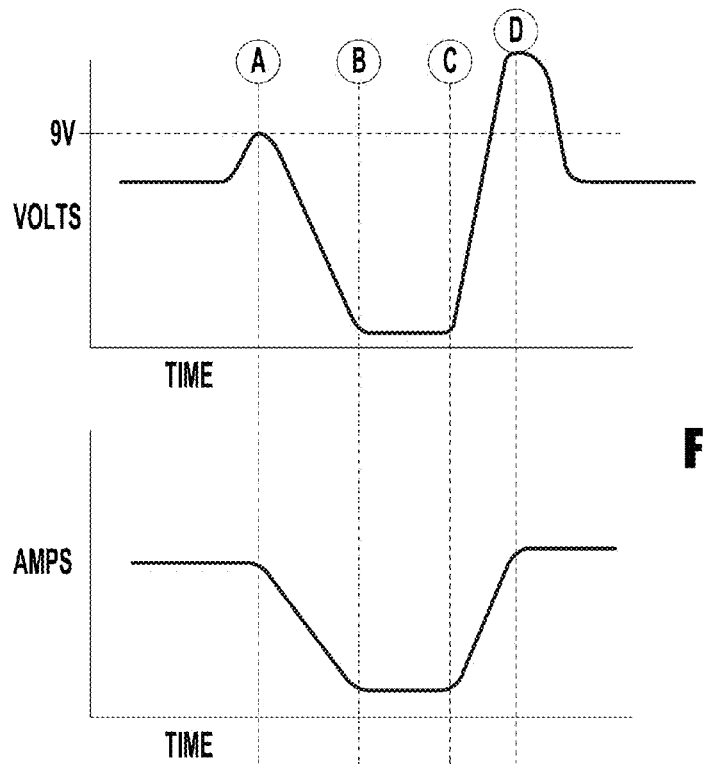
FIGS. 13A-C illustrate voltage and current waveforms created by exemplary embodiments of the present invention.
Figure 13B:
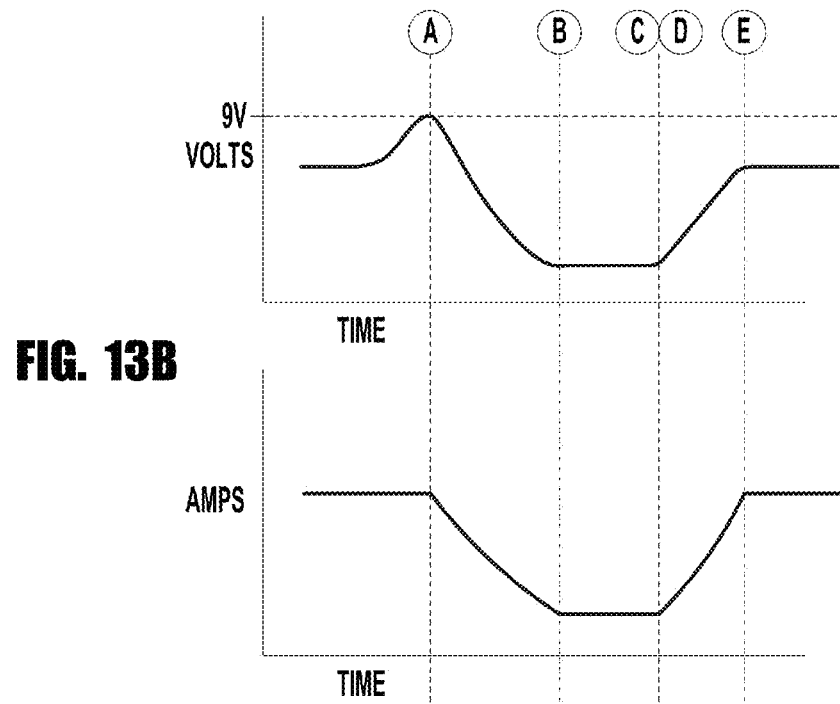
Figure 13C:
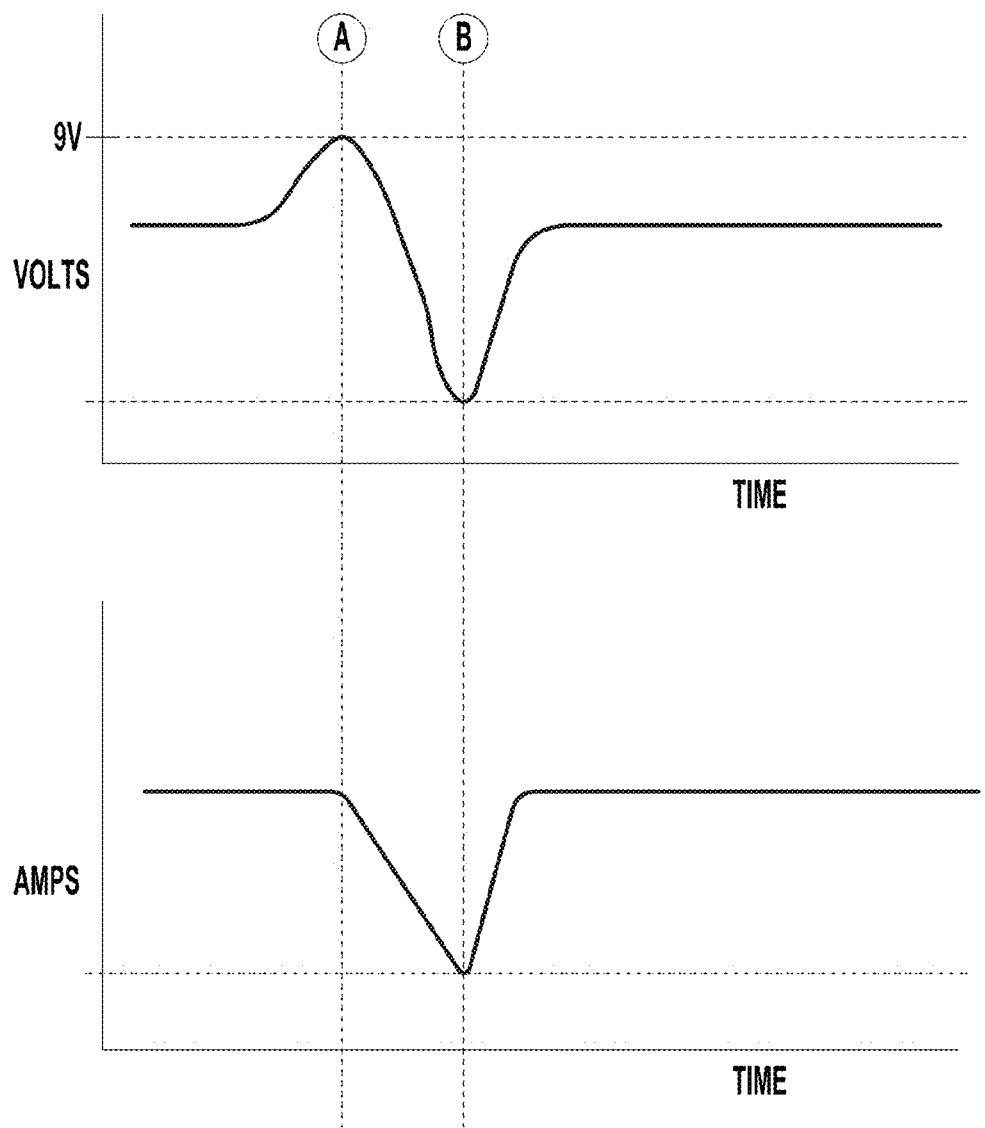

FIGS. 13A-C depict exemplary current and voltage waveforms utilized in embodiments of the present invention. Each of these waveforms will be discussed in turn. FIG. 13A shows the voltage and current waveforms for an embodiment where the filler wire 140 touches the weld puddle after the power supply output is turned back on—after an arc detection event. As shown, the output voltage of the power supply was at some operational level below a determined threshold (9 volts) and then increases to this threshold during welding. The operational level can be a determined level based on various input parameters (discussed previously) and can be a set operational voltage, current and/or power level. This operational level is the desired output of the power supply 170 for a given welding operation and is to provide the desired heating signal to the filler wire 140. During welding, an event may occur which can lead to the creation of an arc. In FIG. 13A the event causes an increase in the voltage, causing it to increase to point A. At point A the power supply/control circuitry hits the 9 volt threshold (which can be an arc detection point or simply a predetermined upper threshold, which can be below an arc creation point) and turns off the output of the power supply causing the current and voltage to drop to a reduced level at point B. The slope of the current drop can be controlled by the inclusion of a ramp down circuit (as discussed herein) which aids in rapidly reducing the current resultant from the system inductance. The current or voltage levels at point B can be predetermined or they can be reached after a predetermined duration in time. For example, in some embodiments, not only is an upper threshold for voltage (or current or power) set for welding, but also a lower non-arc generation level. This lower level can be either a lower voltage, current, or power level at which it is ensured that no arc can be created such that it is acceptable to turn back on the power supply and no arc will be created. Having such a lower level allows the power supply to turn back on quickly and ensure that no arc is created. For example, if a power supply set point for welding is set at 2,000 watts, with a voltage threshold of 11 volts, this lower power setting can be set at 500 watts. Thus, when the upper voltage threshold (which can also be a current or power threshold depending on the embodiment) is reached the output is reduced to 500 watts. (This lower threshold can also be a lower current or voltage setting, or both, as well). Alternatively, rather than setting a lower detection limit a timing circuit can be utilized to turn begin supplying current after a set duration of time. In exemplary embodiments of the present invention, such duration can be in the range of 500 to 1000 ms. In FIG. 13A, point C represents the time the output is again being supplied to the wire 140. It is noted that the delay shown between point B and C can be the result of an intentional delay or can simply be a result of system delay. At point C current is again being supplied to heat the filler wire. However, because the filler wire is not yet touching the weld puddle the voltage increases while the current does not. At point D the wire makes contact with the puddle and the voltage and current settle back to the desired operational levels. As shown, the voltage may exceed the upper threshold prior to contact at D, which can occur when the power source has an OCV level higher than that of the operating threshold. For example, this higher OCV level can be an upper limit set in the power supply as a result of its design or manufacture.

FIG. 13B is similar to that described above, except that the filler wire 140 is contacting the weld puddle when the output of the power supply is increased. In such a situation either the wire never left the weld puddle or the wire was contacted with the weld puddle prior to point C. FIG. 13B shows points C and D together because the wire is in contact with the puddle when the output is turned back on. Thus both the current and voltage increase to the desired operational setting at point E.

FIG. 13C is an embodiment where there is little or no delay between the output being turned off (point A) and being turned back on (point B), and the wire is in contact with the puddle some time prior to point B. The depicted waveforms can be utilized in embodiments described above where a lower threshold is set such that when the lower threshold is reached—whether it's current, power, or voltage—the output is turned back on with little or no delay. It is noted that this lower threshold setting can be set using the same or similar parameters as the operational upper thresholds or ranges as described herein. For example, this lower threshold can be set based on wire composition, diameter, feed speed, or various other parameters described herein. Such an embodiment can minimize delay in returning to the desired operational set points for welding and can minimize any necking that may occur in the wire. The minimization of necking aids in minimizing the chances of an arc being created.

Figure 14:
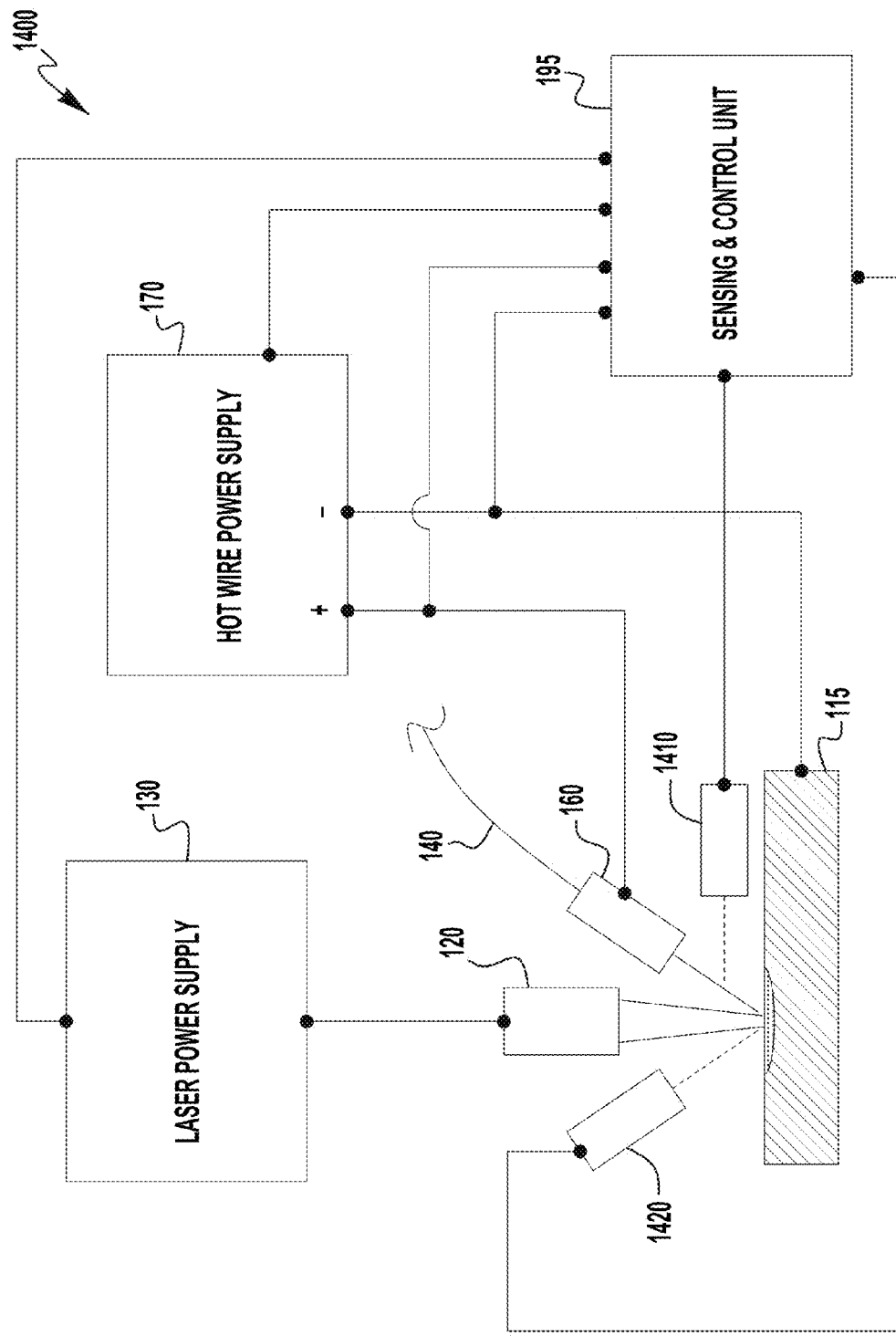
FIG. 14 illustrates another welding system in accordance an exemplary embodiment of the present invention.

FIG. 14 depicts yet another exemplary embodiment of the present invention. FIG. 14 shows an embodiment similar to that as shown in FIG. 1. However, certain components and connections are not depicted for clarity. FIG. 14 depicts a system 1400 in which a thermal sensor 1410 is utilized to monitor the temperature of the wire 140. The thermal sensor 1410 can be of any known type capable of detecting the temperature of the wire 140. The sensor 1410 can make contact with the wire 140 or can be coupled to the tip 160 so as to detect the temperature of the wire. In a further exemplary embodiment of the present invention, the sensor 1410 is a type which uses a laser or infrared beam which is capable of detecting the temperature of a small object—such as the diameter of a filler wire—without contacting the wire 140. In such an embodiment the sensor 1410 is positioned such that the temperature of the wire 140 can be detected at the stick out of the wire 140—that is at some point between the end of the tip 160 and the weld puddle. The sensor 1410 should also be positioned such that the sensor 1410 for the wire 140 does not sense the weld puddle temperature.

The sensor 1410 is coupled to the sensing and control unit 195 (discussed with regard to FIG. 1) such that temperature feed back information can be provided to the power supply 170 and/or the laser power supply 130 so that the control of the system 1400 can be optimized. For example, the power or current output of the power supply 170 can be adjusted based on at least the feedback from the sensor 1410. That is, in an embodiment of the present invention either the user can input a desired temperature setting (for a given weld and/or wire 140) or the sensing and control unit can set a desired temperature based on other user input data (wire feed speed, electrode type, etc.) and then the sensing and control unit 195 would control at least the power supply 170 to maintain that desired temperature.

In such an embodiment it is possible to account for heating of the wire 140 that may occur due to the laser beam 110 impacting on the wire 140 before the wire enters the weld puddle. In embodiments of the invention the temperature of the wire 140 can be controlled only via power supply 170 by controlling the current in the wire 140. However, in other embodiments at least some of the heating of the wire 140 can come from the laser beam 110 impinging on at least a part of the wire 140. As such, the current or power from the power supply 170 alone may not be representative of the temperature of the wire 140. As such, utilization of the sensor 1410 can aid in regulating the temperature of the wire 140 through control of the power supply 170 and/or the laser power supply 130.

In a further exemplary embodiment (also shown in FIG. 14) a temperature sensor 1420 is directed to sense the temperature of the weld puddle. In this embodiment the temperature of the weld puddle is also coupled to the sensing and control unit 195. However, in another exemplary embodiment, the sensor 1420 can be coupled directly to the laser power supply 130. Feedback from the sensor 1420 is used to control output from laser power supply 130/laser 120. That is, the energy density of the laser beam 110 can be modified to ensure that the desired weld puddle temperature is achieved.

In yet a further exemplary embodiment of the invention, rather than directing the sensor 1420 at the puddle, it can be directed at an area of the workpiece adjacent the weld puddle. Specifically, it may be desirable to ensure that the heat input to the workpiece adjacent the weld is minimized. The sensor 1420 can be positioned to monitor this temperature sensitive area such that a threshold temperature is not exceeded adjacent the weld. For example, the sensor 1420 can monitor the workpiece temperature and reduce the energy density of the beam 110 based on the sensed temperature. Such a configuration would ensure that the heat input adjacent the weld bead would not exceed a desired threshold. Such an embodiment can be utilized in precision welding operations where heat input into the workpiece is critical.

In another exemplary embodiment of the present invention, the sensing and control unit 195 can be coupled to a feed force detection unit (not shown) which is coupled to the wire feeding mechanism (not shown—but see 150 in FIG. 1). The feed force detection units are known and detect the feed force being applied to the wire 140 as it is being fed to the workpiece 115. For example, such a detection unit can monitor the torque being applied by a wire feeding motor in the wire feeder 150. If the wire 140 passes through the molten weld puddle without fully melting it will contact a solid portion of the workpiece and such contact will cause the feed force to increase as the motor is trying to maintain a set feed rate. This increase in force/torque can be detected and relayed to the control 195 which utilizes this information to adjust the voltage, current and/or power to the wire 140 to ensure proper melting of the wire 140 in the puddle.

It is noted that in some exemplary embodiments of the present invention, the wire is not constantly fed into the weld puddle, but can be done so intermittently based on a desired weld profile. Specifically, the versatility of various embodiments of the present invention allows either an operator or the control unit 195 to start and stop feeding the wire 140 into the puddle as desired. For example, there are many different types of complex weld profiles and geometry that may have some portions of the weld joint which require the use of a filler metal (the wire 140) and other portions of the same joint or on the same workpiece that do not require the use of filler metal. As such, during a first portion of a weld the control unit 195 can operate only the laser 120 to cause a laser weld of this first portion of the joint, but when the welding operation reaches a second portion of the welding joint—which requires the use of a filler metal—the controller 195 causes the power supply and 170 and the wire feeder 150 to begin depositing the wire 140 into the weld puddle. Then, as the welding operation reaches the end of the second portion the deposition of the wire 140 can be stopped. This allows for the creation of continuous welds having a profile which significantly varies from one portion to the next. Such capability allows a workpiece to be welded in a single welding operation as opposed to having many discrete welding operations. Of course, many variations can be implemented. For example, a weld can have three or more distinct portions requiring a weld profile with varying shape, depth and filler requirements such that the use of the laser and the wire 140 can be different in each weld portion. Furthermore, additional wires can be added or removed as needed as well. That is, a first weld portion may need only a laser weld while a second portion only requires the use of a single filler wire 140, and a final portion of the weld requires the use of two or more filler wires. The controller 195 can be made capable to control the various system components to achieve such a varying weld profile in a continuous welding operation, such that a continuous weld bead is created in a single weld pass.

Figure 15:
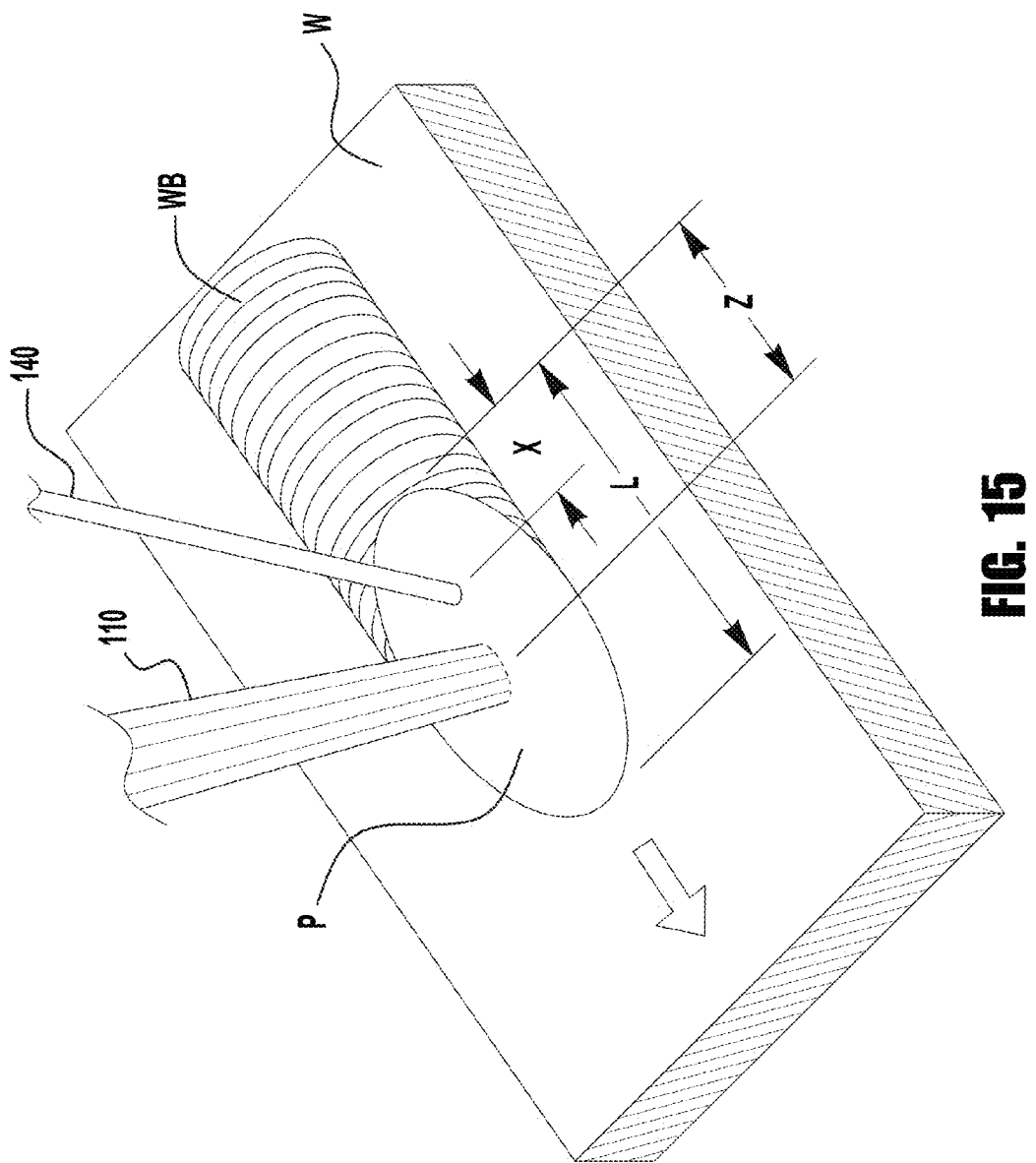
FIG. 15 illustrates an exemplary embodiment of a weld puddle created by an embodiment of the present invention.

FIG. 15 depicts a typical weld puddle P when welding in accordance with exemplary embodiments of the present invention. As described previously the laser beam 110 creates the puddle P in the surface of the workpiece W. The weld puddle has a length L which is a function of the energy density, shape and movement of the beam 110. In an exemplary embodiment of the present invention, the beam 110 is directed to the puddle P at a distance Z from the trailing edge of the weld puddle. In such embodiments, the high intensity energy source (e.g., the laser 120) does cause its energy to directly impinge on the filler wire 140 such that the energy source 120 does not melt the wire 140, rather the wire 140 completes its melting because of its contact with the weld puddle. The trailing edge of the puddle P can be generally defined as the point at which the molten puddle ends and the weld bead WB created begins its solidification. In an embodiment of the present invention the distance Z is 50% of the length L of the puddle P. In a further exemplary embodiment, the distance Z is in the range of 40 to 75% the length L of the puddle P.

The filler wire 140 impacts the puddle P behind the beam 110—in the travel direction of the weld—as shown in FIG. 15. As shown the wire 140 impacts the puddle P as distance X before the trailing edge of the puddle P. In an exemplary embodiment, the distance X is in the range of 20 to 60% of the length of the puddle P. In another exemplary embodiment, the distance X is in the range of 30 to 45% of the length L of the puddle P. In other exemplary embodiments, the wire 140 and the beam 110 intersect at the surface of or at a point above the puddle P such that at least some of the beam 110 impinges on the wire 140 during the welding process. In such an embodiment the laser beam 110 is utilized to aid in the melting of the wire 140 for deposition in the puddle P. Using the beam 110 to aid in the melting of the wire 140 aids in preventing the wire 140 from quenching the puddle P if the wire 140 is too cool to be quickly consumed in the puddle P. However, as stated previously in some exemplary embodiments (as shown in FIG. 15) the energy source 120 and beam 110 do not appreciably melt any portion of the filler wire 140 as the melting is completed by the heat of the weld puddle.

In the embodiment shown in FIG. 15 the wire 140 trails the beam 110 and is in line with the beam 110. However, the present invention is not limited to this configuration as the wire 140 can lead (in the travel direction). Further, it is not necessary to have the wire 140 in line with the beam in the travel direction, but the wire can impinge the puddle from any direction so long as suitable wire melting occurs in the puddle.

FIGS. 16A through 16F depict various puddles P with the footprint of the laser beam 110 depicted. As shown, in some exemplary embodiments the puddle P has a circular footprint. However, embodiments of the invention are not limited to this configuration. For example, it is contemplated that the puddle can have elliptical or other shapes as well.

Further, in FIGS. 16A-16F the beam 110 is shown having a circular cross-section. Again, other embodiments of the present invention are not limited in this regard as the beam 110 can have an elliptical, rectangular, or other shape so as to effectively create a weld puddle P.

Figure 16A:
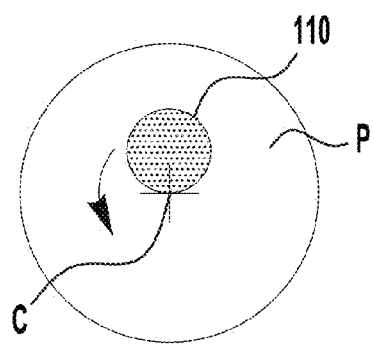
FIGS. 16A to 16F illustrate exemplary embodiments of weld puddles and laser beam utilization in accordance with embodiments of the present invention.
Figure 16B:
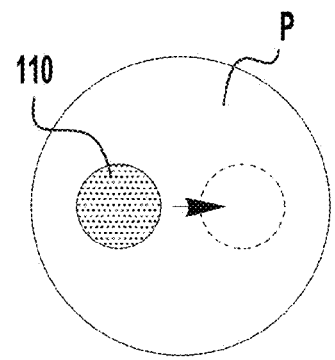
Figure 16C:
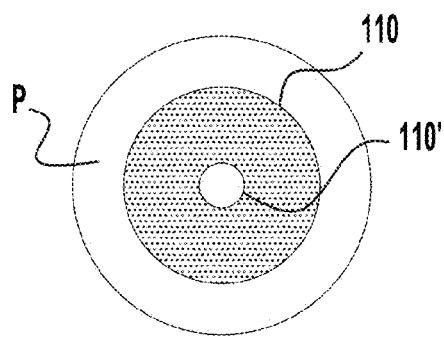
Figure 16D:
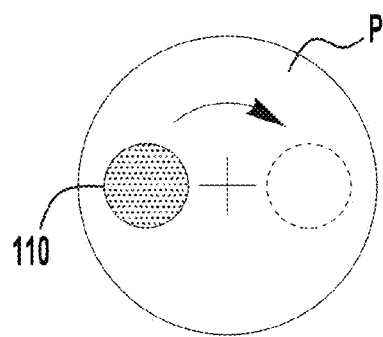

In some embodiments, the laser beam 110 can remain stationary with respect to the weld puddle P. That is, the beam 110 remains in a relatively consistent position with respect to the puddle P during welding. However, other embodiments are not limited in such a way, as exemplified in FIGS. 16A-16D. For example, FIG. 16A depicts an embodiment where the beam 110 is translated in a circular pattern around the weld puddle P. In this figure the beam 110 translates such that at least one point on the beam 110 overlaps the center C of the puddle at all times. In another embodiment, a circular pattern is used but the beam 110 does not contact the center C. FIG. 16B depicts an embodiment where the beam is translated back-and-forth along a single line. This embodiment can be used to either elongate or widen the puddle P depending on the desired puddle P shape. FIG. 16C depicts an embodiment where the two different beam cross-sections are used. The first beam cross-section 110 has a first geometry and the second beam cross-section 110' has a second cross-section. Such an embodiment can be used to increase penetration at a point in the puddle P while still maintaining a larger puddle size—if needed. This embodiment can be accomplished with a single laser 120 by changing the beam shape through the use of the laser lenses and optics, or can be accomplished through the use of multiple lasers 120. FIG. 16D depicts a beam 110 being translated in an elliptical pattern in the puddle P. Again, such a pattern can be used to either elongate or widen the weld puddle P as needed. Other beam 110 translations can be utilized to create the puddle P.

Figure 16E:
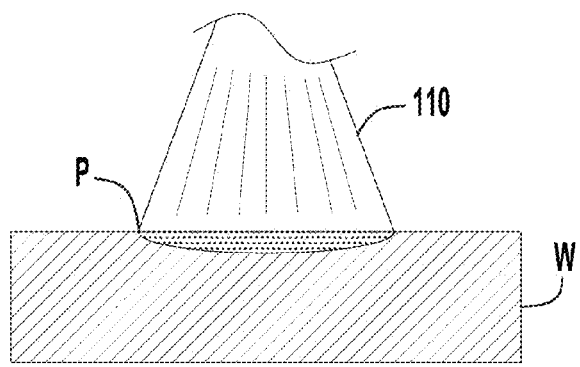
Figure 16F:
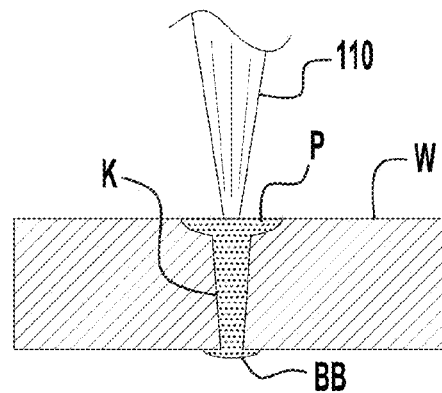

FIGS. 16E and 16F depict a cross-section of a workpiece W and puddle P using different beam intensities. FIG. 16E depicts a shallow wider puddle P which is created by a wider beam 110, while FIG. 16F depicts a deeper and narrow weld puddle P—typically referred to as a "keyhole". In this embodiment, the beam is focused such that its focal point is near the upper surface of the workpiece W. With such a focus the beam 110 is able to penetrate through the full depth of the workpiece and aid in creating a back bead BB on the bottom surface of the workpiece W. The beam intensity and shape are to be determined based on the desired properties of the weld puddle during welding.

Figure 17:
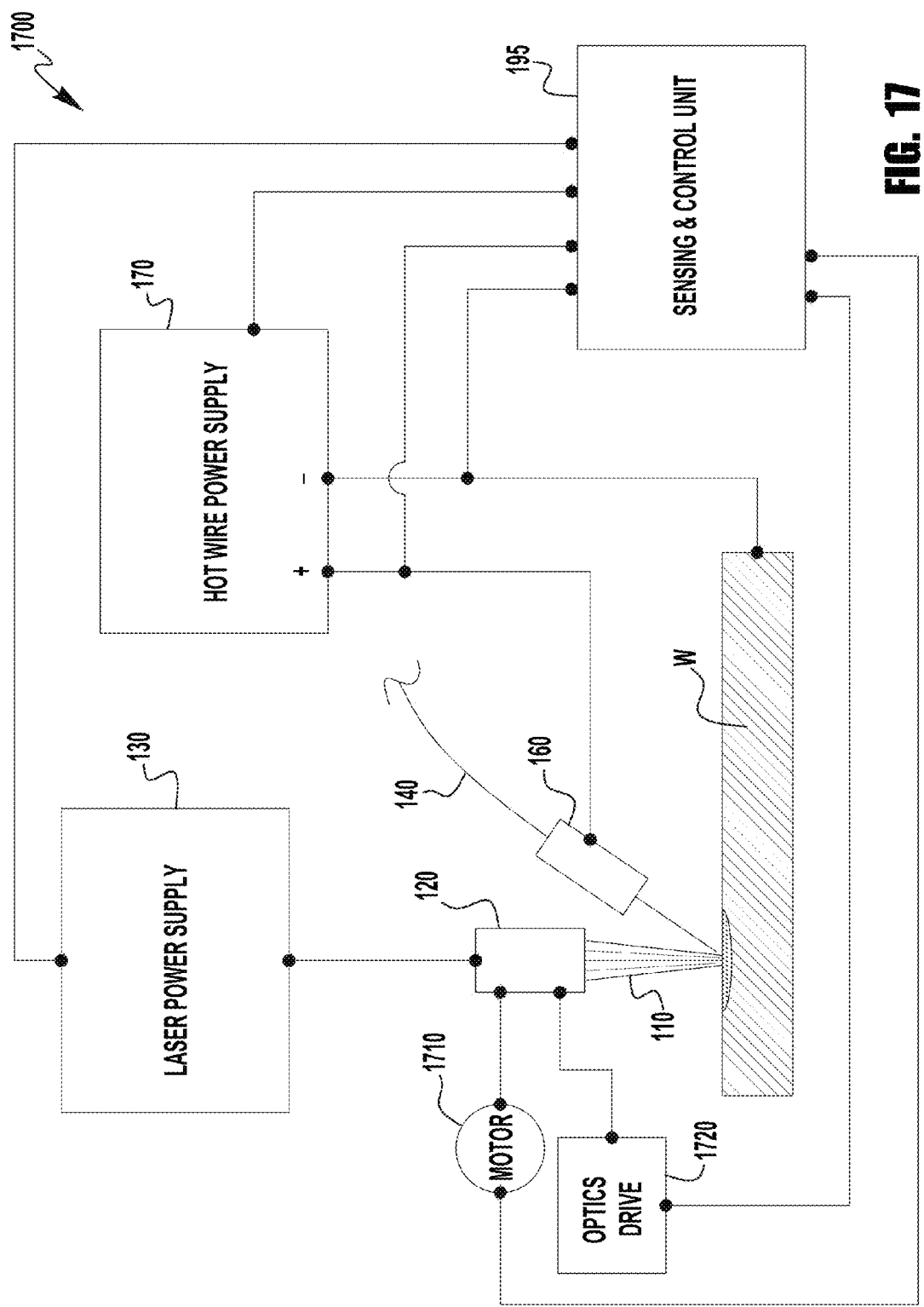
FIG. 17 illustrates a welding system in accordance with another exemplary embodiment of the present invention.

The laser 120 can be moved, translated or operated via any known methods and devices. Because the movement and optics of lasers are generally known, they will not be discussed in detail herein. FIG. 17 depicts a system 1700 in accordance with an exemplary embodiment of the present invention, where the laser 120 can be moved and have its optics (such as its lenses) changed or adjusted during operation. This system 1700 couples the sensing and control unit 195 to both a motor 1710 and an optics drive unit 1720. The motor 1710 moves or translates the laser 120 such that the position of the beam 110 relative to the weld puddle is moved during welding. For example, the motor 1710 can translate the beam 110 back and forth, move it in a circular pattern, etc. Similarly, the optics drive unit 1720 receives instructions from the sensing and control unit 195 to control the optics of the laser 120. For example, the optics drive unit 1720 can cause the focal point of the beam 110 to move or change relative to the surface of the workpiece, thus changing the penetration or depth of the weld puddle. Similarly, the optics drive unit 1720 can cause the optics of the laser 120 to change the shape of the beam 110. As such, during welding the sensing and control unit 195 control the laser 120 and beam 110 to maintain and/or modify the properties of the weld puddle during operation.

In each of FIGS. 1, 14 and 17 the laser power supply 130, hot wire power supply 170 and sensing and control unit 195 are shown separately for clarity. However, in embodiments of the invention these components can be made integral into a single welding system. Aspects of the present invention do not require the individually discussed components above to be maintained as separately physical units or stand alone structures.

Figure 20:
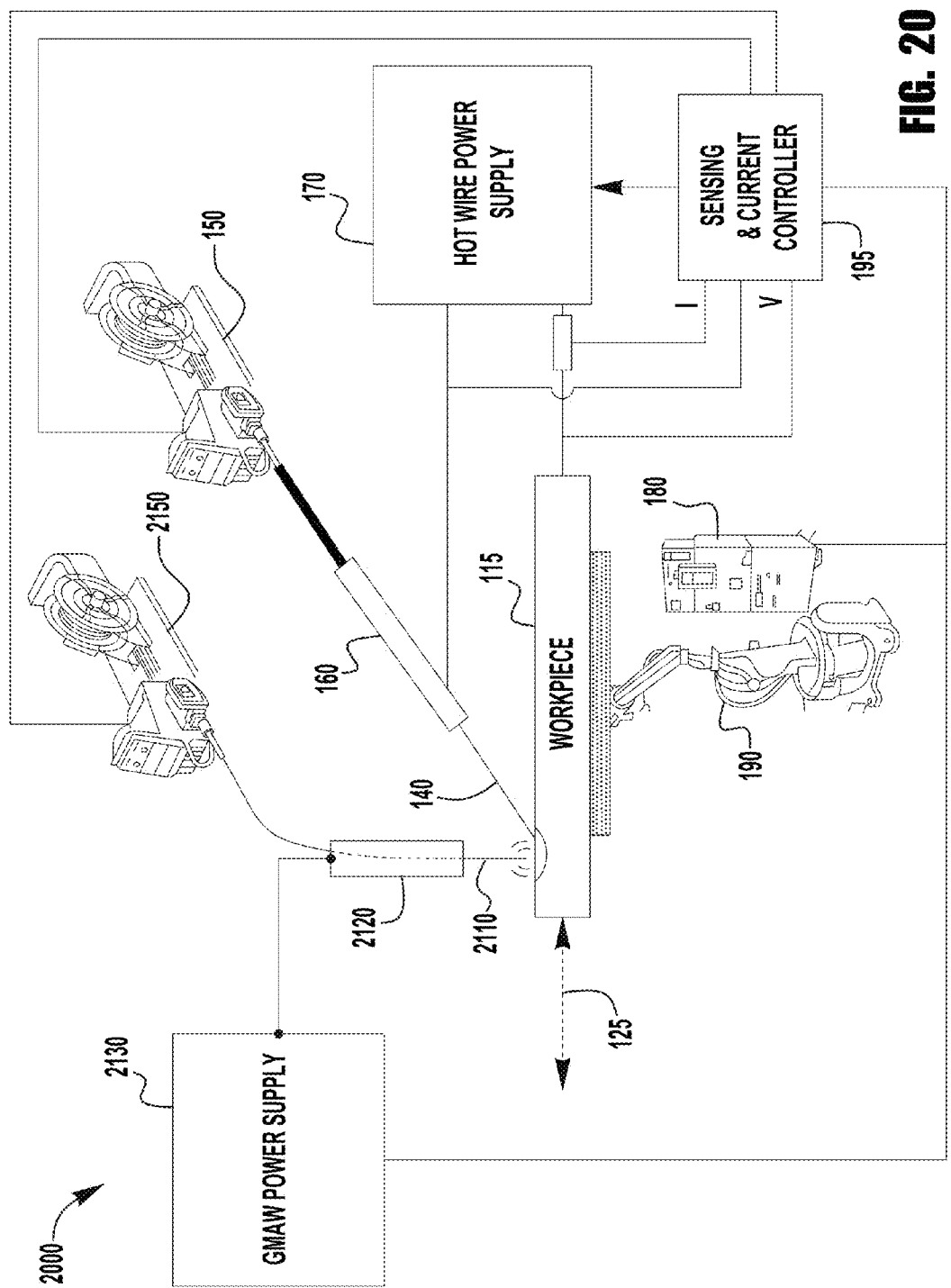
FIG. 20 illustrates an exemplary embodiment of a further welding system of the present invention.

As described above, the high intensity energy source can be any number of energy sources, including welding power sources. An exemplary embodiment of this is shown in FIG. 20, which shows a system 2000 similar to the system 100 shown in FIG. 1. Many of the components of the system 2000 are similar to the components in the system 100, and as such their operation and utilization will not be discussed again in detail. However, in the system 2000 the laser system is replaced with an arc welding system, such as a GMAW system. The GMAW system includes a power supply 2130, a wire feeder 2150 and a torch 2120. A welding electrode 2110 is delivered to a molten puddle via the wire feeder 2150 and the torch 2120. The operation of a GMAW welding system of the type described herein is well known and need not be described in detail herein. It should be noted that although a GMAW system is shown and discussed regarding depicted exemplary embodiments, exemplary embodiments of the present invention can also be used with GTAW, FCAW, MCAW, and SAW systems, cladding systems, brazing systems, and combinations of these systems, etc., including those systems that use an arc to aid in the transfer of a consumable to a molten puddle on a workpiece. Not shown in FIG. 20 is a shielding gas system or sub arc flux system which can be used in accordance with known methods.

Like the laser systems described above, the arc generation systems (that can be used as the high intensity energy source) are used to create the molten puddle to which the hot wire 140 is added using systems and embodiments as described in detail above. However, with the arc generation systems, as is known, an additional consumable 2110 is also added to the puddle. This additional consumable adds to the already increased deposition performance provided by the hot wire process described herein. This performance will be discussed in more detail below.

Further, as is generally known arc generation systems, such as GMAW use high levels of current to generate an arc between the advancing consumable and the molten puddle on the workpiece. Similarly, GTAW systems use high current levels to generate an arc between an electrode and the workpiece, into which a consumable is added. As is generally known, many different current waveforms can be utilized for a GTAW or GMAW welding operation, such as constant current, pulse current, etc. However, during operation of the system 2000 the current generated by the power supply 2130 can interfere with the current generated by the power supply 170 which is used to heat the wire 140. Because the wire 140 is proximate to the arc generated by the power supply 2130 (because they are each directed to the same molten puddle, similar to that described above) the respective currents can interfere with each other. Specifically, each of the currents generates a magnetic field and those fields can interfere with each other and adversely affect their operation. For example, the magnetic fields generated by the hot wire current can interfere with the stability of the arc generated by the power supply 2130. That is, without proper control and synchronization between the respective currents the competing magnetic fields can destabilize the arc and thus destabilize the process. Therefore, exemplary embodiments utilize current synchronization between the power supplies 2130 and 170 to ensure stable operation, which will be discussed further below.

Figure 21:
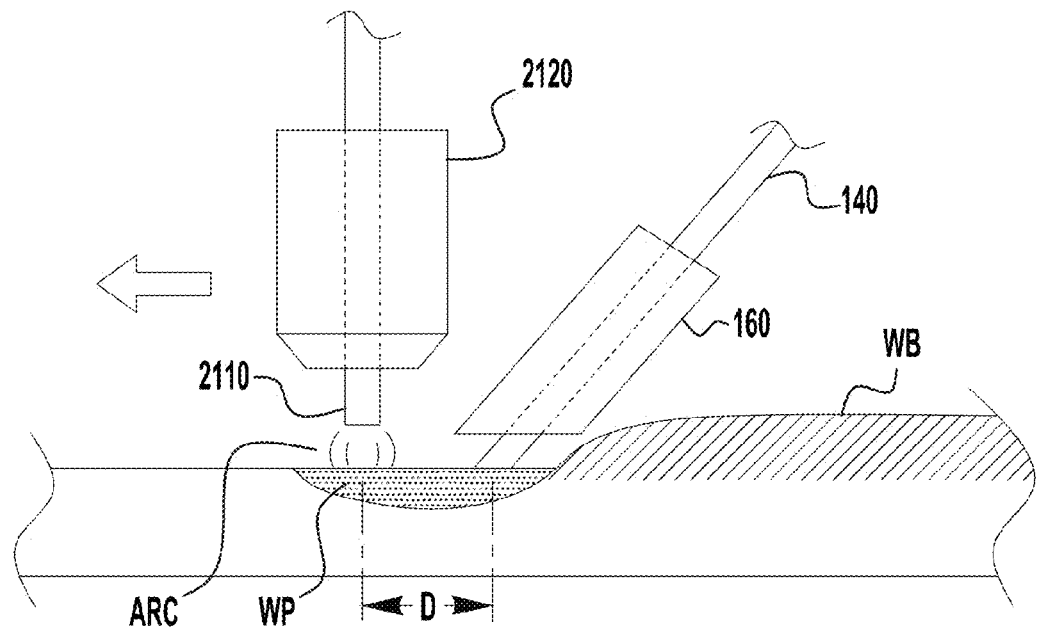
FIG. 21 illustrates an exemplary embodiment of a welding operation in accordance with an embodiment of the present invention.

FIG. 21 depicts a closer view of an exemplary welding operation of the present invention. As can be seen the torch 2120 (which can be an exemplary GMAW/MIG torch) delivers a consumable 2110 to a weld puddle WP through the use of an arc—as is generally known. Further, the hot wire consumable 140 is delivered to the weld puddle WP in accordance with any of the embodiments described above. It should be noted that although the torch 2120 and tip 160 are shown separately in this figure, these components can be made integrally into a single torch unit which delivers both consumables 2110 and 140 to the puddle. Of course, to the extent an integral construction is utilized, electrical isolation within the torch must be used so as to prevent current transfer between the consumables during the process. As stated above, magnetic fields induced by the respective currents can interfere with each other and thus embodiments of the present invention synchronize the respective currents. Synchronization can be achieved via various methods. For example, the sensing and current controller 195 can be used to control the operation of the power supplies 2130 and 170 to synchronize the currents. Alternatively a master-slave relationship can also be utilized where one of the power supplies is used to control the output of the other. The control of the relative currents can be accomplished by a number of methodologies including the use of state tables or algorithms that control the power supplies such that their output currents are synchronized for a stable operation. This will be discussed relative to FIGS. 22A-C. For example, a dual-state based system and devices similar to that described in US Patent Publication No. 2010/0096373 can be utilized. US Patent Publication No. 2010/0096373, published on Apr. 22, 2010, is incorporated herein by reference in its entirety.

Figure 22A:
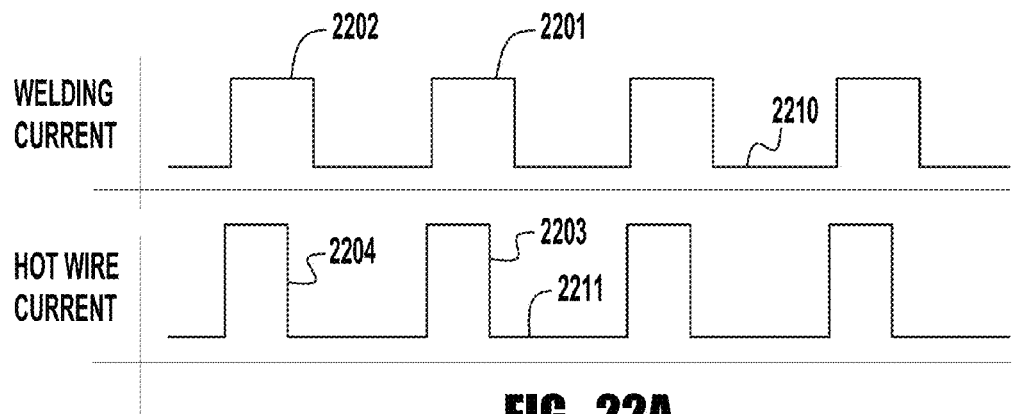
FIG. 22A-22C illustrate exemplary embodiments of current waveforms utilized by welding systems of the present invention.
Figure 22B:
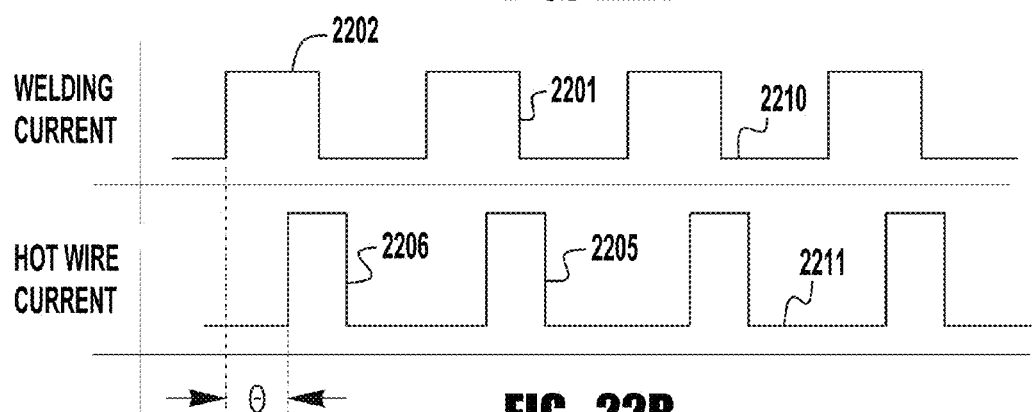
Figure 22C:
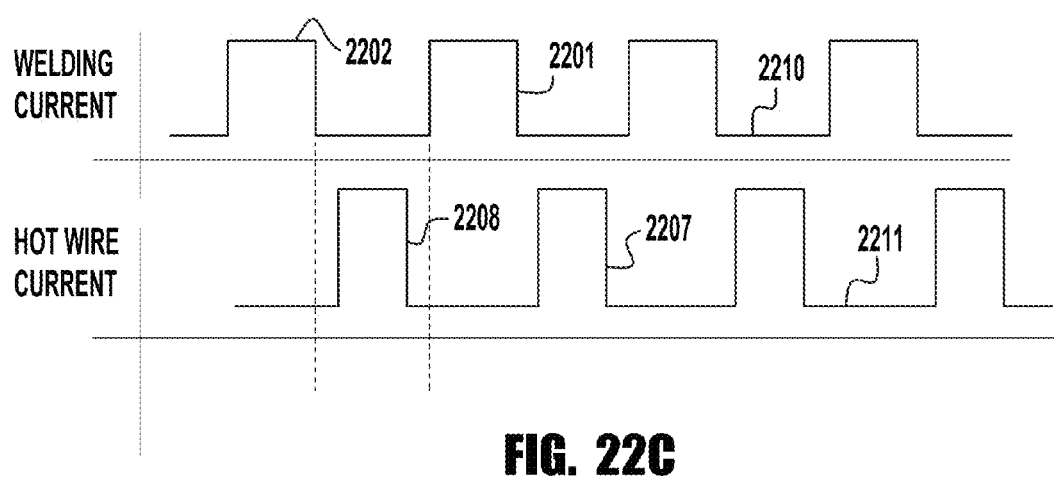

Each of FIGS. 22A-C depicts exemplary current waveforms. FIG. 22A depicts an exemplary welding waveform (either GMAW or GTAW) which uses current pulses 2202 to aid in the transfer of droplets from the wire 2110 to the puddle. Of course, the waveform shown is exemplary and representative and not intended to be limiting, for example the current waveforms can be that for pulsed spray transfer, pulse welding, surface tension transfer welding, etc. The hot wire power supply 170 outputs a current waveform 2203 which also has a series of pulses 2204 to heat the wire 140, through resistance heating as generally described above. The current pulses 2204 are separated by a background level of a lesser current level. As generally described previously, the waveform 2203 is used to heat the wire 140 to at or near its melting temperature and uses the pulses 2204 and background to heat the wire 140 through resistance heating. As shown in FIG. 22A the pulses 2202 and 2204 from the respective current waveforms are synchronized such that they are in phase with each other. In this exemplary embodiment, the current waveforms are controlled such that the current pulses 2202/2204 have a similar, or the same, frequency and are in phase with each other as shown. Surprisingly, it was discovered that having the waveforms in phase produces a stable and consistent operation, where the arc is not significantly interfered with by the heating current generated by the waveform 2203.

FIG. 22B depicts waveforms from another exemplary embodiment of the present invention. In this embodiment, the heating current waveform 2205 is controlled/synchronized such that the pulses 2206 are out-of-phase with the pulses 2202 by a constant phase angle Θ. In such an embodiment, the phase angle is chosen to ensure stable operation of the process and to ensure that the arc is maintained in a stable condition. In exemplary embodiments of the present invention, the phase angle Θ is in the range of 30 to 90 degrees. In other exemplary embodiments, the phase angle is 0 degrees. Of course, other phase angles can be utilized so as to obtain stable operation, and can be in the range of 0 to 360 degrees, while in other exemplary embodiments the phase angle is in the range of 0 and 180 degrees.

FIG. 22C depicts another exemplary embodiment of the present invention, where the hot wire current 2207 is synchronized with the welding waveform 2201 such that the hot wire pulses 2208 are out-of phase such that the phase angle θ is about 180 degrees with the welding pulses 2202, and occurring only during the background portion 2210 of the waveform 2201. In this embodiment the respective currents are not peaking at the same time. That is, the pulses 2208 of the waveform 2207 begin and end during the respective background portions 2210 of the waveform 2201.

In some exemplary embodiments of the present invention, the pulse width of the welding and hot-wire pulses is the same. However, in other embodiments, the respective pulse-widths can be different. For example, when using a GMAW pulse waveform with a hot wire pulse waveform, the GMAW pulse width is in the range of 1.5 to 2.5 milliseconds and the hot-wire pulse width is in the range of 1.8 to 3 milliseconds, and the hot wire pulse width is larger than that of the GMAW pulse width.

It should be noted that although the heating current is shown as a pulsed current, for some exemplary embodiments the heating current can be constant power as described previously. The hot-wire current can also be a pulsed heating power, constant voltage, a sloped output and/or a joules/time based output.

As explained herein, to the extent both currents are pulsed currents they are to be synchronized to ensure stable operation. There are many methods that can be used to accomplish this, including the use of synchronization signals. For example, the controller 195 (which can be integral to either or the power supplies 170/2130) can set a synchronization signal to start the pulsed arc peak and also set the desired start time for the hot wire pulse peak. As explained above, in some embodiments, the pulses will be synchronized to start at the same time, while in other embodiments the synchronization signal can set the start of the pulse peak for the hot wire current at some duration after the arc pulse peak—the duration would be sufficient to obtained the desired phase angle for the operation.

Figure 23:
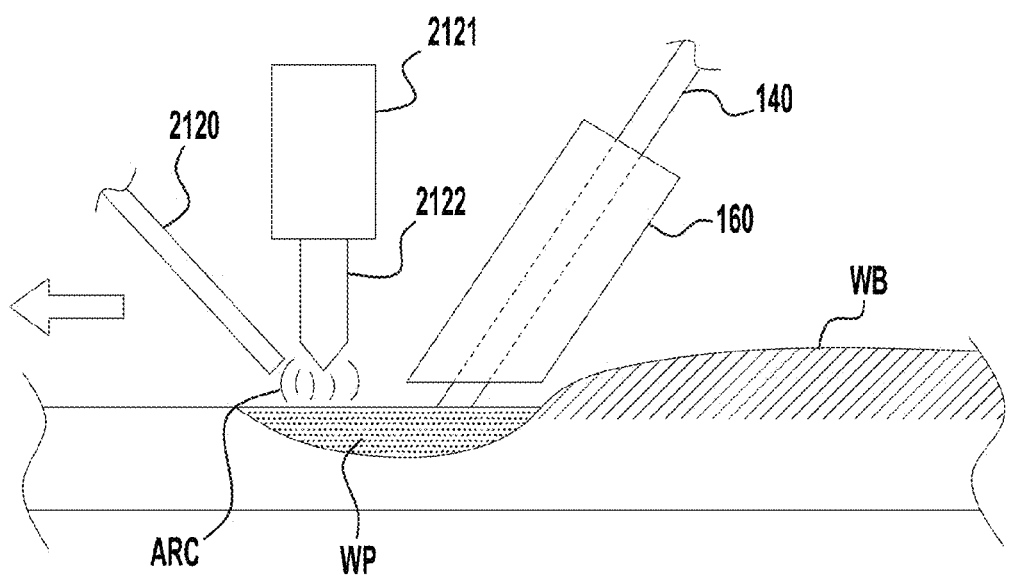
FIG. 23 illustrates an exemplary embodiment of another welding operation in accordance with an embodiment of the present invention.

FIG. 23 represents another exemplary embodiment of the present invention. In this embodiment a GTAW welding/coating operation is utilized where a GTAW torch 2121 and an electrode 2122 create an arc into which a consumable 2120 is delivered. Again the arc and the hot wire 140 are delivered to the same puddle WP to create a bead WB as shown. The operation of a GTAW embodiment is similar to that described above, in that the arc and the hot wire 140 are interacting with the same weld puddle WP. Again, as with the above described GMAW operation the current used to generate the arc in the GTAW operation is synchronized with the current for the hot wire operation. For example, the pulse relationship can be used as shown in FIGS. 22A to 22C. Further, the controller 195 can control the synchronization between the power supplies using a dual-state table, or other similar methods of control. It should be noted that the consumable 2120 can be delivered to the weld as a cold wire or can also be a hot-wire consumable. That is, both consumables 2110 and 140 can be heated as described herein. Alternatively, only one of the consumables 2120 and 140 can be the hot-wire as described herein.

In either of the GTAW or GMAW type embodiments discussed above (including the use of other arc type methods) the arc is positioned in the lead—relative to the travel direction. This is shown in each of FIGS. 21 and 23. This is because the arc is used to achieve the desired penetration in the workpiece(s). That is, the arc is used to create the molten puddle and achieve the desired penetration in the workpiece (s). Then, following behind the arc process is the hot wire process, which is described in detail herein. The addition of the hot wire process adds more consumable 140 to the puddle without the additional heat input of another welding arc, such as in a traditional tandem MIG process in which at least two arcs are used. Thus, embodiments of the present invention can achieve significant deposition rates at considerably less heat input than known tandem welding methods.

As shown in FIG. 21, the hot wire 140 is inserted in the same weld puddle WP as the arc, but trails behind the arc by a distance D. In some exemplary embodiments, this distance is in the range of 5 to 20 mm, and in other embodiments, this distance is in the range of 5 to 10 mm. Of course, other distances can be used so long as the wire 140 is fed into the same molten puddle as that created by the leading arc. However, the wires 2110 and 140 are to be deposited in the same molten puddle and the distance D is to be such that there is minimal magnetic interference with the arc by the heating current used to heat the wire 140. In general, the size of the puddle—into which the arc and the wire are collectively directed—will depend on the welding speed, arc parameters, total power to the wire 140, material type, etc., which will also be factors in determining a desired distance between wires 2110 and 140.

It should be noted that the operation of the hot wire current (e.g., 2203, 2203, or 2207) is similar to that described in detail herein when an arc event is detected or predicted by either the controller 195 or the power supply 170. That is, even though the current is pulsed the current can be shut off or minimized as described herein if an arc is created or detected. Furthermore, in some exemplary embodiments, the background portions 2211 have a current level below an arc generation level for the wire 140 (which can be determined by the controller 195 based on user input information), and rather than shutting the hot wire current off when an arc is detected the power supply 170 can drop the current to the background level 2211 for a duration or until it is determined that the arc is extinguished or will not occur (as generally described previously). For example, the power supply 170 can skip a predetermined number of pulses 2203/2205/2207 or just not pulse for a duration, such as 10 to 100 ms, after which time the power supply 170 can start the pulses again to heat the wire 140 to the appropriate temperature.

As stated above, because at least two consumables 140/2110 are used in the same puddle a very high deposition rate can be achieved, with a heat input which is similar to that of a single arc operation. This provides significant advantages over tandem MIG welding systems which have very high heat input into the workpiece. For example, embodiments of the present invention can easily achieve at least 23 lb/hr deposition rate with the heat input of a single arc. Other exemplary embodiments have a deposition rate of at least 35 lb/hr.

In exemplary embodiments of the present invention, each of the wires 140 and 2110 are the same, in that they have the same composition, diameter, etc. However, in other exemplary embodiments the wires can be different. For example, the wires can have different diameters, wire feed speeds and composition as desired for the particular operation. In an exemplary embodiment the wire feed speed for the lead wire 2110 is higher than that for the hot wire 140. For example, the lead wire 2110 can have a wire feed speed of 450 ipm, while the trail wire 140 has a wire feed speed of 400 ipm. Further, the wires can have different size and compositions. In fact, because the hot wire 140 does not have to travel through an arc to be deposited into the puddle the hot wire 140 can have materials/components which typically do not transfer well through an arc. For example, the wire 140 can have a tungsten carbide, or other similar hard facing material, which cannot be added to a typical welding electrode because of the arc. Additionally, the leading electrode 2110 can have a composition which is rich in wetting agents, which can help wetting the puddle to provide a desired bead shape. Further, the hot wire 140 can also contain slag elements which will aid in protecting the puddle. Therefore, embodiments of the present invention allow for great flexibility in the weld chemistry. It should be noted that because the wire 2110 is the lead wire, the arc welding operation, with the lead wire, provides the penetration for the weld joint, where the hot wire provides additional fill for the joint.

In some exemplary embodiments of the present invention, the combination of the arc and the hot-wire can be used to balance the heat input to the weld deposit, consistent with the requirements and limitations of the specific operation to be performed. For example, the heat from the lead arc can be increased for joining applications where the heat from the arc aids in obtaining the penetration needed to join the work pieces and the hot-wire is primarily used for fill of the joint. However, in cladding or build-up processes, the hot-wire wire feed speed can be increased to minimize dilution and increase build up.

Further, because different wire chemistries can be used a weld joint can be created having different layers, which is traditionally achieved by two separate passes. The lead wire 2110 can have the required chemistry needed for a traditional first pass, while the trail wire 140 can have the chemistry needed for a traditional second pass. Further, in some embodiments at least one of the wires 140/2110 can be a cored wire. For example the hot wire 140 can be a cored wire having a powder core which deposits a desired material into the weld puddle.

Figure 24:
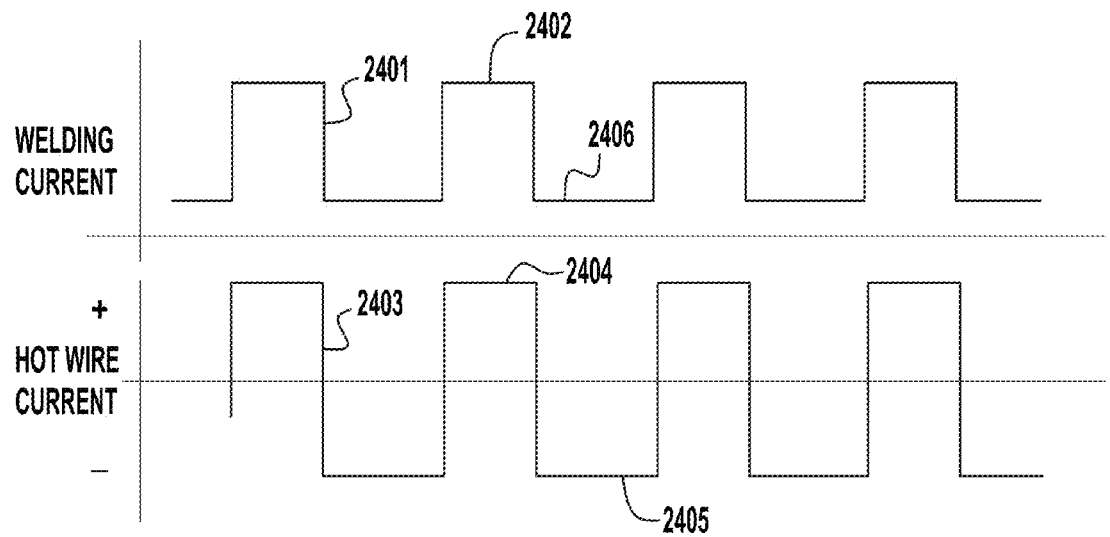
FIG. 24 illustrates an another exemplary embodiment of current waveforms that can be used with embodiments of the present invention.

FIG. 24 depicts another exemplary embodiment of current waveforms of the present invention. In this embodiment, the hot wire current 2403 is an AC current which is synchronized with the welding current 2401 (whether it be GMAW or GTAW). In this embodiment, the positive pulses 2404 of the heating current are synchronized with the pulses 2402 of the current 2401, while the negative pulses 2405 of the heating current 2403 are synchronized with the background portions 2406 of the welding current. Of course, in other embodiments the synchronization can be opposite, in that the positive pulses 2404 are synchronized with the background 2406 and the negative pulses 2405 are synchronized with the pulses 2402. In another embodiment, there is a phase angle between the pulsed welding current and the hot wire current. By utilizing an AC waveform 2403 the alternating current (and thus alternating magnetic field) can be used to aid in stabilizing the arc. Of course, other embodiments can be utilized without departing from the spirit or scope of the present invention. For example, in a system using a submerged arc welding (SAW) operation, the SAW current waveform can be an AC waveform and the hot wire current waveform is an AC or a pulsed DC power waveform, where each of the waveforms are synchronized with each other.

It is also noted that embodiments of the present invention can be used where the welding current is a constant or near constant current waveform. In such embodiments, an alternating heating current 2403 can be used to maintain the stability of the arc. The stability is achieved by the constantly changed magnetic field from the heating current 2403.

Figure 25:
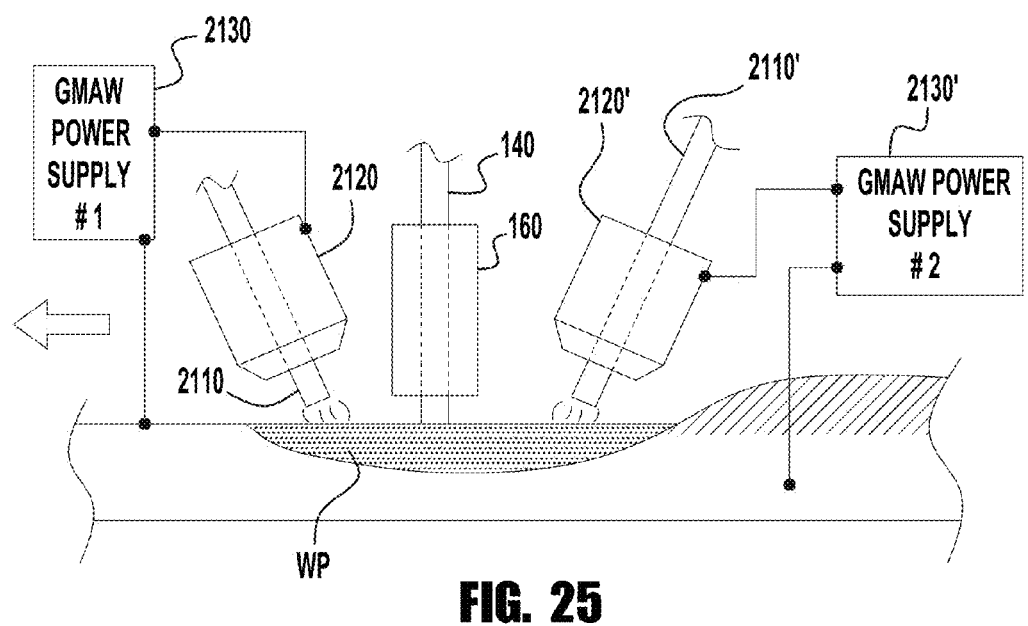
FIG. 25 illustrates an exemplary embodiment of another welding operation that can be used with embodiments of the invention.
Figure 25A:
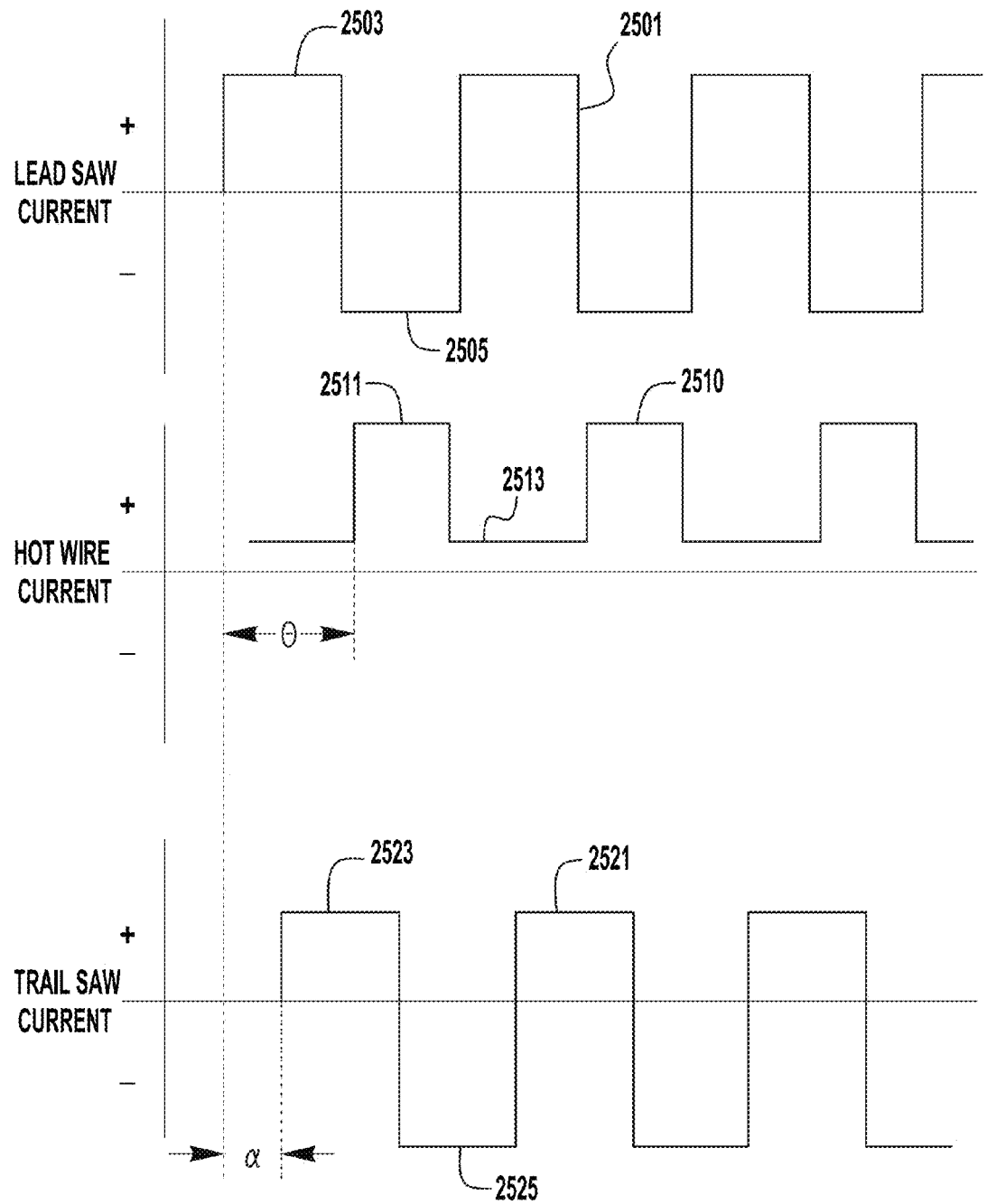
FIG. 25A illustrates an exemplary embodiment a current waveforms that can be used with the embodiment shown in FIG. 25.

FIG. 25 depicts another exemplary embodiment of the present invention, where the hot wire 140 is positioned between two tandem arc welding operations. In FIG. 25 the arc welding operations are depicted as GMAW type welding, but can also be GTAW, FCAW, MCAW or SAW type systems. In the figures, the lead torch 2120 is coupled to a first power supply 2130 and delivers a first electrode 2110 to the puddle via an arc welding operation. Trailing the lead arc is the hot wire 140 (which is deposited as discussed above). Trailing the hot wire 140 is a trailing arc welding operation using a second power supply 2130', a second torch 2120' and a second arc welding wire 2110'. Thus, the configuration is similar to that of a tandem GMAW welding system but has a hot-wire 140 deposited into the common puddle between the torches 2120 and 2120'. Such an embodiment further increases the deposition rate of materials into the puddle. It should be noted that embodiments of the present invention can use additional welding torches and/or hot wire consumables in a single operation, and are not limited to the embodiments shown in the Figures. For example, more than hot-wire can be used to deposit additional materials into the puddle during a single pass. As mentioned above, SAW processes can be used rather than the GMAW processes generally discussed herein. For example, the embodiment shown in FIG. 25 can utilize leading and trailing SAW processes with a similar configuration as to that shown in this figure. Of course, rather than a shielding gas, a granular flux would be used to shield the arcs. The overall method or operation and control, as discussed above, are similarly applicable when using other welding methodologies, such as SAW. For example, FIG. 25A depicts exemplary waveforms that can be used in an SAW system with a hot-wire as described herein. As depicted, the lead SAW current waveform 2501 is an AC waveform having a plurality of positive pulses 2503 and a plurality of negative pulses 2505, while the trailing SAW current 2521 is also an AC waveform having a plurality of positive pulses 2523 and a plurality of negative pulses 2525, where the trailing waveform 2521 is out-of-phase from the leading waveform 2501 by a phase angle α. In exemplary embodiments of the present invention, the phase angle α is in the range of 90 to 270 degrees. It is also noted that in the embodiment shown the +/−offset between the waveforms 2501 and 2521 is different in that the trailing waveform 2521 has a larger negative offset than the leading waveform 2501. In other exemplary embodiments, the offset can be the same, or can be reversed. The hot wire current 2510 shown in a pulse current having a plurality of positive pulses 2511 separated by a background level 2513 where the waveform 2510 has an offset phase angle θ, which is different than the phase angle α. In an exemplary embodiment, the hot wire phase angle θ is in the range of 45 to 315 degrees, but is different than the phase angle α.

It is noted that although the above discussion was directed to a SAW type operation, other exemplary embodiments using a similar synchronization methodology can be of a GMAW, FCAW, MCAW, or GTAW type operation, or a combination thereof.

As stated above, embodiments of the present invention can greatly increase the deposition of materials into the puddle while keeping the total heat input lower than traditional tandem systems. However, some exemplary embodiments can create a weld bead WB shape which is higher than traditional tandem methods. That is, the weld bead WB tends to stand up higher above the surface of the workpiece and does not wet out to the sides of the weld bead WB as much as tandem systems. Generally, this is because the hot wire 140 will aid in quenching the puddle following the leading arc welding operation. Therefore, some exemplary embodiments of the present invention utilize systems and components to aid in widening or wetting out the puddle during a welding/coating operation.

Figure 26:
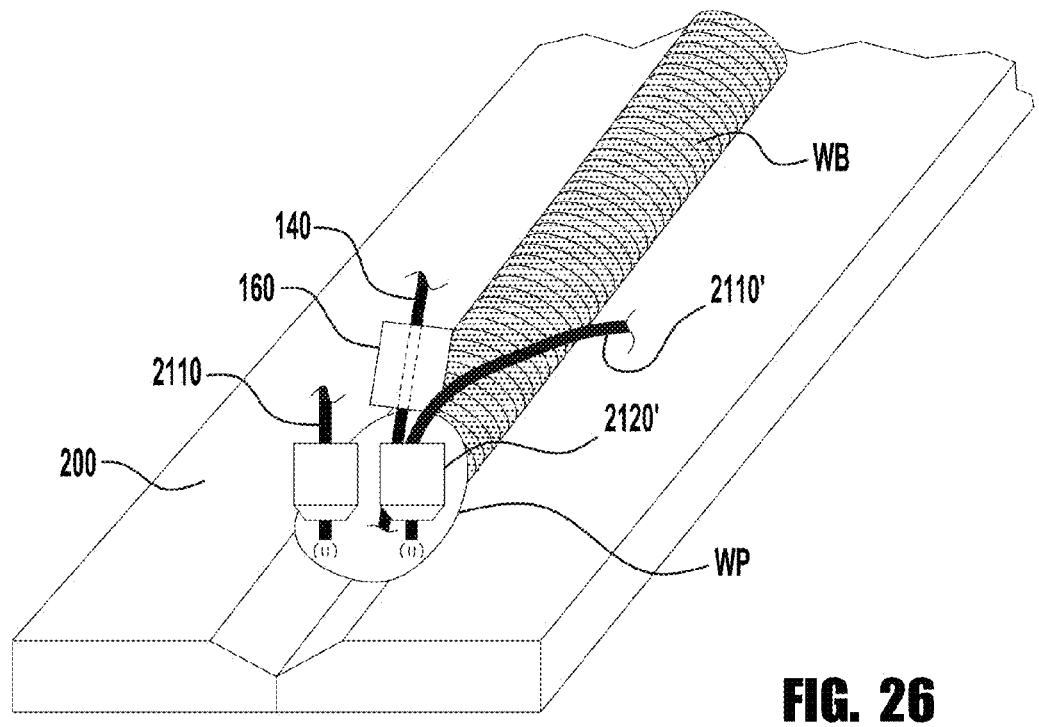
FIG. 26 illustrates an exemplary embodiment of a further welding operation using side-by-side arc welding operations.

FIG. 26 depicts an exemplary embodiment, where two GMAW torches 2120 and 2120' are not positioned in line, but are rather positioned in a side-by-side position—as shown, where the hot wire 140 is trailing behind the two torches 2120/2120'. In this embodiment, having the two GMAW arcs in a side-by-side configuration will widen the puddle WP and aid in wetting out the puddle to flatten the weld bead WB. As with the other embodiments, the hot wire 140 trails the arc welding operation and can be positioned on the center-line of the weld bead WB behind the arc welding operations. However, its is not necessary that the hot wire 140 remain in the centerline as the hot wire can be oscillated or moved relative to the puddle during the welding operation.

Figure 27:
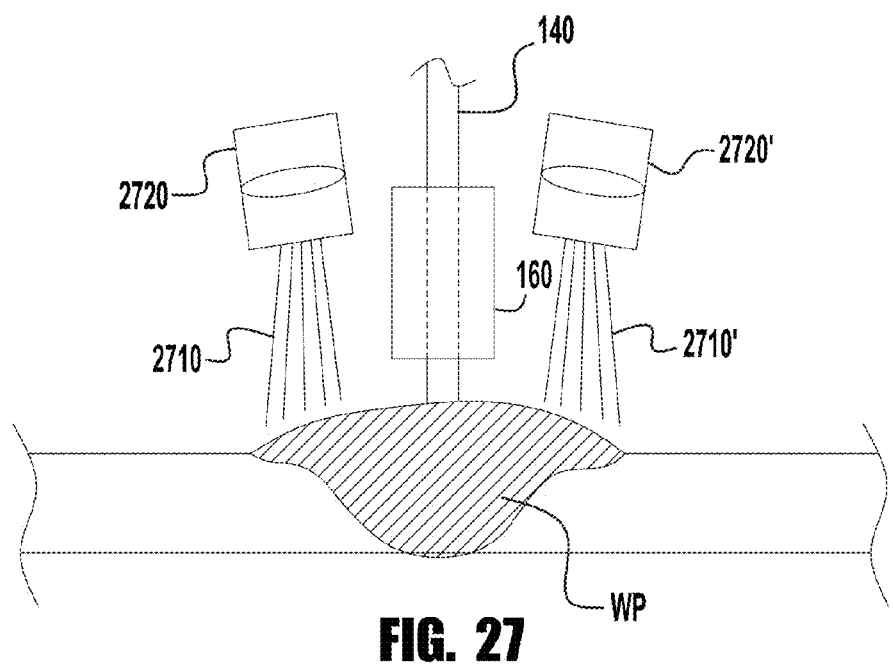
FIG. 27 illustrates an exemplary embodiment of an additional welding operation of the present invention.

FIG. 27 depicts another exemplary embodiment where lasers 2720 and 2720' are used on either side of the weld puddle WP to help flatten out the puddle or aid in the wetting of the puddle. The lasers 2720/2720' each emit beams 2710/2710', respectively, on the sides of the puddle to add heat to the puddle and aid in wetting the puddle so that the puddle shape is desirable. The lasers 2720/2720' can be of the type described herein and can be controlled as described above. That is, the lasers can be controlled by the controller 195, or a similar device, to provide the desired weld bead shape. Furthermore, rather than using two lasers to achieve the desired weld bead shape a single laser can be used with a beam splitter which splits the beam 2710 and directs the split beams to the appropriate position on the weld puddle to achieve the desired weld bead shape. It is noted that the leading arc welding process is not depicted in FIG. 27 for purposes of clarity.

In a further exemplary embodiment, a single laser beam 2710 can be used that is directed to the puddle just downstream of the arc process or downstream of the hot wire 140 (in the travel direction) where the beam 2710 is oscillated from side to side to aid in flattening the puddle. In such embodiments a single laser 2720 can be used and directed to areas of the puddle where it is desired to aid in wetting out the puddle during welding. The control and operation of the laser 2720 is similar to the control and operation of the laser 120 described above in relation to FIG. 1, etc.

Figure 28:
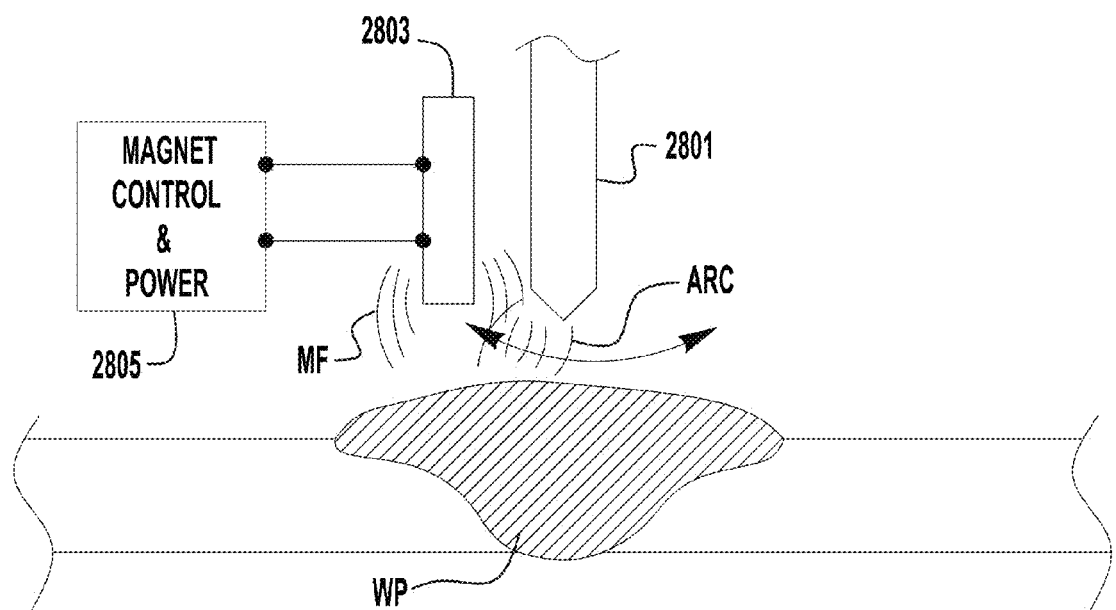
FIG. 28 illustrates an additional exemplary embodiment of a welding operation of the present invention utilizing magnetic steering.

FIG. 28 depicts another exemplary embodiment of the present invention. In this exemplary embodiment, a GTAW (or GMAW, FCAW, MCAW) electrode 2801 is utilized for the arc welding process and a magnetic probe 2803 is positioned adjacent to the electrode 2801 to control the movement of the arc during welding. The probe 2803 receives a current from the magnetic control and power supply 2805, which may or may not be coupled to the controller 195, and the current causes a magnetic field MF to be generated by the probe 2803. The magnetic field interacts with the magnetic field generated by the arc and can thus be used to move the arc during welding. That is, the arc can be moved from side to side during welding. This side to side movement is used to widen the puddle and aid in wetting out the puddle to achieve the desired weld bead shape. Although not shown for clarity, following the arc is a hot-wire consumable as discussed herein to provide additional filling for the weld bead. The use and implementation of a magnetic steering system is generally known by those in the welding industry and need not be described in detail herein.

It is, of course, understood that the embodiments in either of FIGS. 26 and 28 (as well as the other shown embodiments described herein) can use the laser 2720 to aid in the shape of the weld puddle as described herein.

Figure 29:
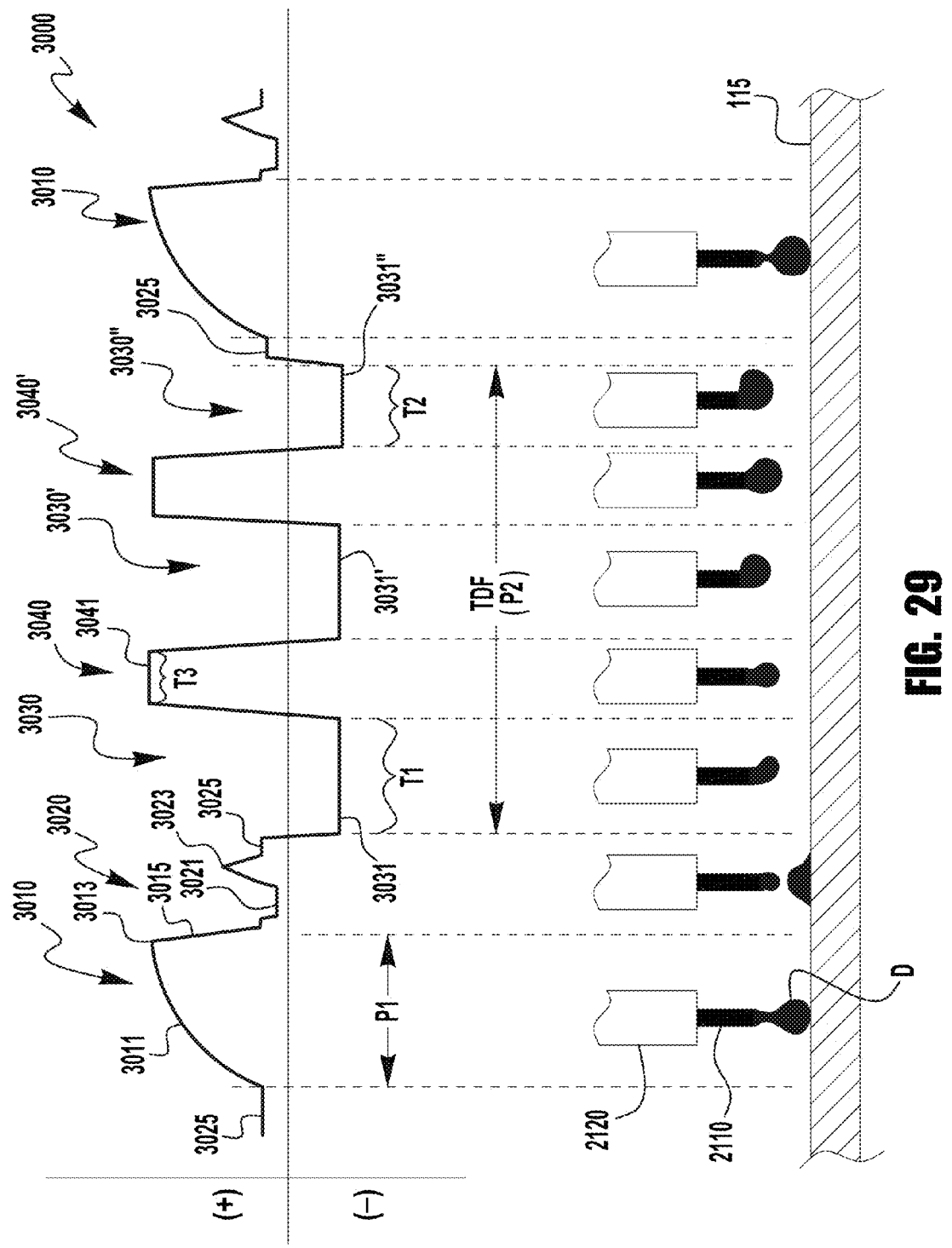
FIG. 29 illustrates an additional exemplary embodiment of an arc generation current waveform that can be used with exemplary embodiments of the present invention.

FIG. 29 depicts another exemplary current waveform that can be used with exemplary embodiments of the present invention as described herein. As explained previously, when welding coated materials (e.g., galvanized materials) with traditional welding methods issues can arise due to porosity and spatter. Further, as additionally explained herein embodiments of the present invention can address the issues of porosity and spatter and achieve significantly improved performance over traditional welding and overlaying systems. For example, a method and system of using both arc welding and hot-wire can provide improved performance, as discussed herein relative to FIGS. 20 to 28 herein. FIG. 29 represents a further exemplary embodiment of a current waveform that can be used for the arc welding operation generally depicted in FIG. 20. That is, the current waveform in FIG. 29 can be generated by the power supply 2130 and provided to the electrode 2110. The current waveform in FIG. 29 will now be discussed.

As shown in FIG. 29, the exemplary current waveform 3000 is an AC type waveform having both positive and negative portions. When using exemplary embodiments of the present invention, use of the waveform 3000 can provide the porosity and spatter performance discussed previously at high travel speeds and deposition rates. In fact, the advantages of the waveform 3000 can be achieved with or without the use of a hot-wire 140 in the same weld puddle—this will be discussed in more detail below. The waveform 3000 shown in FIG. 29 is intended to be exemplary and embodiments of the present invention are not limited thereto.

As shown, the waveform 3000 has a number of phases. Specifically, the waveform 3000 has at least a droplet transfer phase P1 and droplet build phase P2. The droplet transfer phase P1 contains at least one droplet transfer pulse 3010 which is used to transfer the droplet D from the electrode 2110 to the workpiece 115. Typically, the droplet transfer pulse 3010 is a positive current pulse and has a profile which allows for the smooth transfer of the droplet D to the workpiece, for example with limited spatter. In the embodiment shown, the pulse 3010 has an exponential current ramp rate 3011 to a peak current level 3013. In exemplary embodiments, the peak current level 3013 is in the range of 300 to 500 amps. Of course, other peak current levels 3013 can be used without departing from the spirit or scope of the present invention. Further, the pulse 3010 can have a current ramp down profile 3015 which allows for the electrode 2110 to neck down between the droplet D and the electrode 2110 so that when the droplet D breaks off the spatter is limited. Further, although an exponential slope 3011 is shown, other embodiments are not limited to this profile. Other current ramp rate profiles can be used without departing from the scope of the present invention so long as the current ramp rate allows for the smooth transition of the droplet D to the workpiece 115. That is, in some exemplary embodiments, known droplet transfer pulse profiles can be used. At the end of the droplet transfer pulse 3010 the droplet D makes contact with the puddle on the workpiece 115 and is transferred to the workpiece 115. In exemplary embodiments of the present invention, at the end of the droplet transfer pulse 3010 the electrode 2110 is in a shorted condition, in that the droplet D is contacting both the puddle and the electrode 2110. In such exemplary embodiments, a short clearing portion 3020 is present in the waveform 3000. The short clearing portion 3020 can be any known short clearing function which is capable of clearing a short condition with minimal or no spatter. For example, the short clearing function can be similar to that used in the known STT (surface tension transfer) technology. In the embodiment shown, during the short clearing portion 3020, the current is dropped to a level 3021 which is less than the background level 3025 until the droplet D breaks away from the electrode 2110. Following the break, the current is increased to a plasma boost level 3023 to allow for burn back of the electrode 2110 away from the puddle, after which the current returns to the background level 3025 before the droplet build phase P2 begins. It is noted that in some exemplary embodiments, a short circuit transfer method may not be used to transfer the droplet, and as such no short clearing portion 3020 need be present in the waveform 3000. Of course, even in such embodiments it is likely that shorting events may still occur. Therefore, in such embodiments, the power supply 2130 uses a short clearing function to clear the short. Accordingly, in some exemplary embodiments there is no intentional short condition created at the conclusion of the droplet transfer pulse 3010, but if it does occur a short clearing function is initiated and can be similar to the portion 3020 shown in FIG. 29.

After the droplet transfer phase P1, and any short clearing portion 3020 (if present), the droplet build phase P2 begins. As shown in FIG. 29 the droplet build phase P2 begins after the short clearing portion 3020 and after the current returns to the background level 3025. However, in other exemplary embodiments, the droplet build phase P2 can begin directly after the short clear portion 3020 such that the current does not return to and remain at the background current level 3025. For example, the current can drop from the plasma boost 3023 directly into the droplet build phase P2. The droplet D, which is to be transferred, is primarily formed during the droplet build phase P2. As shown, the droplet build phase P2 utilizes an AC waveform profile to create the droplet D. This AC waveform profile is used to create a droplet of the desired size and stability, while at the same time minimizing heat input. During the droplet build phase P2, as shown, there is no intentional transfer of a droplet D during this phase of the waveform. Instead, this portion of the waveform is used to construct the droplet D for transfer in the transfer phase P1. Of course, it is recognized that in the reality of welding there can be inadvertent droplet transfer or short circuit from time to time. However, there is no intentional droplet transfer during the build phase P2.

As shown, at the beginning of the droplet build phase P2, the current enters a first negative polarity droplet build pulse 3030. That is, the current changes from a positive polarity to a negative polarity at a negative background level 3031 and is maintained at that level for a period of time T1. In exemplary embodiments, the current level 3031 is in the range of 30 to 300 amps. In other exemplary embodiments, the current level 3031 is in the range of 35 to 125 amps. Further, in exemplary embodiments, the time T1 is in the range of 400 μs to 3 ms. In further exemplary embodiments, the time T1 is in the range of 700 μs to 2 ms. This can be referred to as a negative polarity pulse. As shown, during this build pulse 3030, a new droplet D begins to form at the end of the electrode 2110, and because the current is negative the heat input is relatively low (compared to a positive current flow). However, as is generally understood, during a negative current flow the cathode spot can tend to move up the electrode 2110, which tends to cause the droplet D to turn upward and destabilize. Thus, after the first droplet build pulse 3030 a first droplet stabilizing pulse 3040 is used, where the first droplet stabilizing pulse 3040 has a positive peak current level 3041. This peak level 3041 is maintained for a time T3, and in exemplary embodiments can be in the range of 300 to 500 amps. In other exemplary embodiments, the current 3041 is in the range of 350 to 400 amps. In exemplary embodiments, the time T3 is in the range of 300 μs to 2.5 ms. In further exemplary embodiments, the time T3 is in the range of 500 μs to 1.5 ms. As shown, in addition to continuing to build the droplet D the stabilizing pulse 3040 returns the droplet D to a more stable position directed towards the workpiece 115. This allows the droplet to grow in a more stable fashion. In the exemplary embodiment shown the current level 3041 of the stabilizing pulse 3040 is higher (in magnitude) than the current level 3031 of the pulse 3030, and is shorter in duration (i.e., T3 is shorter than T1). In exemplary embodiments, the current level 3041 is in the range of 1.5 to 3 times the magnitude of the negative current level 3031. Further, in exemplary embodiments, the duration T1 is 1.25 to 3 times the duration T3 of the positive peak current 3041.

However, in other exemplary embodiments, the positive peak current level 3041 could be less (in magnitude), and/or longer in duration than the negative peak current 3031. For example, in some exemplary embodiments, the stabilizing peak level 3041 is in the range of 50 to 125 amps lower (in magnitude) than the peak level 3031 of the droplet build pulse 3030. This can be affected by the type of electrode E being used, and the relative durations and peak levels of the pulses 3030/3040 should be selected to provide the desired droplet build and stability characteristics.

As shown, after the first droplet stabilizing pulse 3040 a second droplet build pulse 3030' and stabilization pulse 3041' is used. In the embodiment shown, each of the second droplet build pulse 3030' and stabilization pulse 3041' have the same current levels 3031/3041 and durations T1/T3 as the first pulse 3030/3040. However, in other exemplary embodiments, either, or both, of the durations of and the peak current levels 3031'/3041' can be less than that of the first pulses 3030/3040. That is, the first build and stabilization pulses can be used to provide the largest amount of droplet building energy, while the following pulse(s) provide less droplet build energy. Further, in other embodiments, either, or both, of the durations of and the peak current levels 3031'/3041' can be greater than that of the first pulses 3030/3040. In such embodiments, the droplet build energy can increase with subsequent pulses.

As shown in FIG. 29, following the second stabilization pulse 3040' is a third droplet build pulse 3030". This pulse 3030" either completes the formation of the droplet D or brings the droplet D to near completion in its formation and is followed by another droplet transfer pulse 3010 to deposit the droplet D on the work piece. In the embodiment shown, the pulse 3030" has a current level 3031" which is the same as the current levels 3031/3031' of the previous pulses 3030/3030'. However, in other exemplary embodiments, the current level 3031" can be higher or lower than that of the previous pulses depending on the desired energy input. Also, in the embodiment shown, the current returns to the background level 3025 for a brief moment before the droplet transfer pulse 3010 begins. However, in other exemplary embodiments, the current can proceed directly into the droplet transfer pulse 3010. Also, as shown, the final droplet build pulse 3030" has a peak current level 3031" for a duration T2 which is less than the duration (e.g., T1) than the previous pulses 3030/3030'. This is to ensure that the droplet reaches the proper size and does not destabilize prior to transferring the droplet D. However, in other exemplary embodiments, the duration T2 can be the same as, or longer than, the duration T1 of previous pulses 3030/3030'. This can depend on the desired droplet size prior to transfer.

It should be noted that the waveform 3000 depicted in FIG. 29 is intended to be exemplary, and other similarly functioning waveforms can be used without departing from the spirit or scope of the present invention. For example, unlike the embodiment shown in FIG. 29, the transition to the droplet transfer phase P1 can come from a droplet stabilizing pulse, instead of a droplet build pulse, as shown. Further, in other exemplary embodiments, the droplet build phase P2 can transition to a droplet stabilization and advancement stage, where the current is changed to a positive current level (after either of the pulses 3030/3040) which is lower than the peak level 3040' (for example, lower by more than 50%). This will aid in stabilizing the droplet and slow the build of the droplet such that the droplet can be pushed closer to the puddle by the wire feeding, prior to the transition phase P1. In further exemplary embodiments, the droplet can be cause to make contact with the puddle and transferred via the short circuit (for example, using surface tension transfer—STT). In other exemplary embodiments, the droplet can be advanced to the puddle (after the build phase P2) via the wire feeder to make contact with the puddle, and then the current is controlled such that the electrode is necked down and the wire is reversed from the puddle, leaving the droplet in the puddle. In further exemplary embodiments, the low current positive pulse (the stabilizing pulse discussed above) can be an intermediate pulse/phase between the build phase P2 and the transition phase P1. That is, from the build phase P2, the current will enter a low positive current pulse stabilization phase, and then to the pulse transfer phase P1. In the pulse stabilization phase, the current pulse is to have a current peak and duration to stabilize the droplet and prepare the droplet for transfer. In exemplary embodiments, the positive stabilization pulse in this stabilization phase, has a peak current which is in the range of 35 to 60% of the peak current level 3041' immediately preceding this stabilization phase. The duration of this stabilization peak current can be fixed (by a controller) or can be variable. For example, a controller can monitor the amount of energy created during the droplet build phase P2 and then adjust the peak and/or duration of the positive stabilization pulse to ensure that a proper amount of energy is generated before the droplet transfer phase P1. That is, a system controller (e.g., 195) can determine an desired energy input X (e.g., in joules) that is to be achieved prior to droplet transfer, and if the amount of energy input during the phase P2 is below X, the controller 195 can use the positive current stabilization phase (between phases P1 and P2) to add the determined additional energy. In further exemplary embodiments, it may be desirable or necessary to transfer the droplet D prior to the transfer phase P1, and thus the current pulse in the above described stabilization phase can be used to transfer the droplet. For example, during the build phase the droplet D may build faster than desired or anticipated such that at or near the end of the build phase P2 the droplet is ready to be transferred, or about to make contact with the puddle. This can be detected by the controller 195 by monitoring the current, voltage, power and/or dv/dt of the welding signal. If this is detected, the controller can use an either a pulse 3040, or a smaller positive pulse (like that discussed above during the stabilization phase) to transfer the droplet D—prior to initiating the pulse 3010. Once the transfer is complete, the controller 195 causes the transfer pulse 3010 to be skipped and then begins the build phase P2 for the next droplet.

It should be noted that while the waveform 3000 in FIG. 29 is shown with three build pulses 3030/3030'/3030" and two stabilization pulses 3040/3040', other exemplary embodiments are not limited in this way. That is, in some embodiments, there can be more pulses 3030/3040, or less pulses. In fact, in some exemplary embodiments, there can be only a single droplet build pulse 3030 and droplet stabilization pulse 3040. Of course, the number of pulses should be used to achieve the desired droplet size and stability to ensure appropriate transfer.

In exemplary embodiments of the present invention, the droplet transfer pulses 3010 has a cycle duration in the range of 2 to 50 ms. In some exemplary embodiments, subsequent droplet transfer pulses 3010 have a frequency in the range of 20 to 300 Hz, and the droplet build and stabilization pulses have a frequency in the range of 300 to 1000 Hz. Of course, other frequencies can be used to achieve the desired performance. However, in exemplary embodiments of the present invention, to the extent that there are multiple combinations of build and stabilization pulses (as in FIG. 29) the frequency of these pulses will be higher than that of the transfer pulses 3010. In exemplary embodiments, the frequency of the build/stabilization pulses will be in the range of 1.5 to 3 times that of the transfer pulses 3010.

As previously discussed with respect to other embodiments, the waveform 3000 is generated by the power supply 2130, the output of which can be controlled by either the power supply 2130 or the controller 195, or both. With respect to the length of the droplet build phase P2, the duration TDF is controlled by the controller 195 and/or the power supply 2130. For example, in some exemplary embodiments a timer is used in either the controller 195 or the power supply 2130 and the duration TDF is predetermined prior to the welding operation beginning. During operation, the length of the droplet build phase P2 is controlled to coincide with the predetermined duration TDF, such that at the conclusion of the duration TDF a following transfer pulse 3010 is initiated. The duration TDF can be determined via algorithms, look up tables, etc. based on user input information related to the welding operation. Further, in exemplary embodiments, the frequency and/or duration of the pulses in the droplet build phase P2 is determined (e.g., by the controller 195) so that the droplet build phase P2 ends at a point which is desirable for transition to the droplet transfer portion P1. For example, as shown in FIG. 29, the droplet build phase P2 is ended at the end of a droplet build pulse 3031″. In further exemplary embodiments, the controller 195 (or power supply 2130) uses a counter type circuit to count the number of pulses during the droplet build phase P2 such that the duration TDF is of a duration that allows the determined number of pulses N to occur. Stated differently, the controller 195 determines a number N of pulses that are to be used during the droplet build phase P2 and the frequency of the pulses, and controls the operation of the system such that the duration TDF allows the determined number N of pulses to be implemented before the following droplet transfer phase P1. In other exemplary embodiments, the controller 195 can control the duration TDF of the build phase P2 based on the output energy into the welding operation. That is, the controller 195 can determine a desired amount of energy to be input to the process during the build phase P2, and controls the waveform output to ensure that the predetermined amount of energy is output during the phase P2 with the pulses, and then trigger the following transfer pulse 3010 when the predetermined amount of energy (e.g., joules) has been reached for the given phase P2. In other exemplary embodiments, other control methodologies can be used to ensure a desired droplet size and stability is achieved before transfer.

In exemplary embodiments of the present invention, the duration of the build phase TDF is in the range of 1.5 to 5 times longer than the duration of the transfer phase P1.

As acknowledged above, during some welding operations it is possible that a short circuit condition can exist during the droplet build phase P2, which may result in the transfer of a droplet prematurely (during the build phase P2). In such a situation embodiments of the present invention will initiate a short clearing function to break the short condition, and restart the droplet build phase P2 to ensure a proper droplet is formed before transfer.

Figure 30:
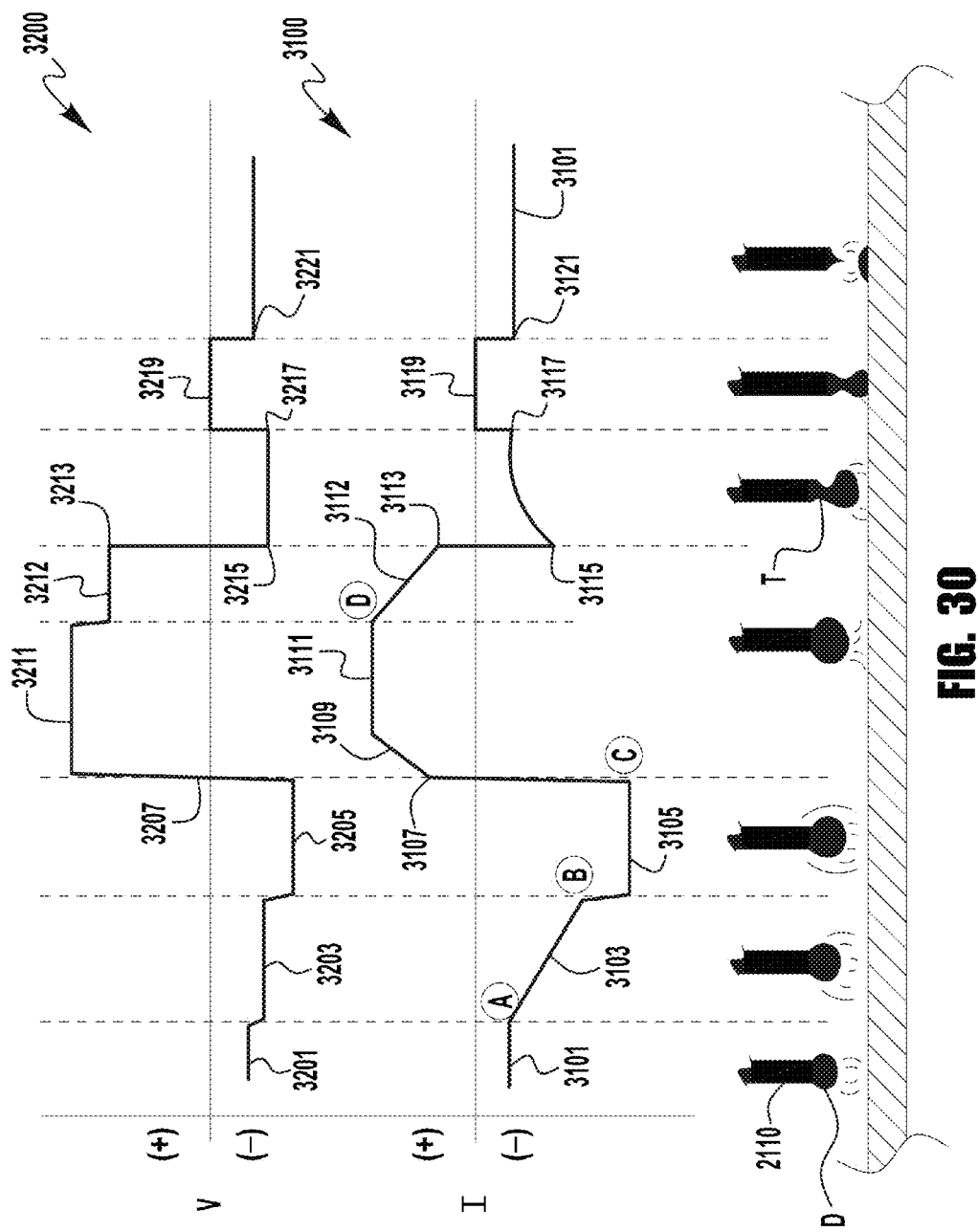
FIG. 30 illustrates a further exemplary embodiment of an arc generation current and voltage waveform that can be used with exemplary embodiments of the present invention

FIG. 30 depicts another exemplary waveform/welding process that can be used with embodiments of the present invention to weld coated materials. Like the waveform shown in FIG. 29, the embodiment in FIG. 30 can be used with or without an additional hot-wire consumable as described herein, and can provide the desired porosity and spatter performance, as discussed further herein. Like FIG. 29, the waveforms shown in FIG. 30 are intended to be exemplary. It should be noted that in the following discussion the voltage 3200 and current 3100 waveforms will be generally discussed together as the phases of the droplet build and transfer are discussed, and will only be discussed separately as needed. The portions of the respective waveforms 3100/3200 that correspond with each other will have similar numbers (e.g., 3101 and 3201, etc.) so as to allow for easy correlation.

FIG. 30 depicts both a current waveform 3100 and a voltage waveform 3200 for an exemplary embodiment of the present invention, as well as depicted the phases of the transfer of the droplet D from the consumable 2110. Like the waveform 3000 in FIG. 29, the waveforms in FIG. 30 are also AC waveforms. Like the waveform 3000, the waveform 3100 aids in controlling the interaction of any coating (such as zinc) of a workpiece during a welding operation. As shown, the waveform 3100 begins a negative low current level 3101/3201. This current level can be in the range of 15 to 100 amps and can be based on the wire feed speed being used for the operation. In exemplary embodiments, the current level is selected to keep the temperature below the vaporization temperature of the workpiece coating—for example zinc. This is aided because the current is in a negative polarity state. Specifically, by having the cathode spot on the electrode 2110 instead of the workpiece, the anode spot is stationary (on the workpiece) and the temperature can be kept low enough so that a coating is not vaporized. At point A the current is increased during a controlled ramp phase 3103/3203 to cause the tip of the electrode 2110 to melt quicker and create the droplet D. However, the current is increased at a controlled rate so as to ensure that the cathode spot of the arc climbs the electrode 2110 in a controlled manner. If the ramp rate is too high the cathode spot can become unstable. In exemplary embodiments the current ramp rate during the controlled ramp phase 3103 is in the range of 25 to 100 amps/ms. During this phase the cathode spot moves in a controlled manner, thus keeping the current density of the arc controlled. In exemplary embodiments, the ramp rate can be determined by a controller of the power supply based upon user input information, such as wire feed speed and electrode type (which can include, electrode material, diameter, etc., either in combination or separately), etc.

Once the arc envelopes the droplet D (at point B) then current can be ramped up more quickly to a negative peak current level 3105/3205. The transition from the controlled ramp rate portion 3103 to a higher current ramp rate (at point B) can be determined in different ways. In exemplary embodiments, the power supply can maintain the controlled ramp rate for a predetermined period of time, which would be set by the controlled based on user input data such as WFS, electrode information, etc. Thus, at the expiration of the duration the current ramp rate is changed from the ramp rate during the phase 3103 to a higher ramp rate (which could be the fastest capable ramp rate of the power supply). In other exemplary embodiments, the power supply can use a predetermined voltage level, such that when this voltage level is reached the power supply changes from the ramp rate during phase 3103 to a higher ramp rate. Again, this predetermined voltage threshold is determined by the power supply based on user input data, such as WFS, electrode type, etc. In exemplary embodiments, the voltage threshold is determined to be a voltage level at which it is understood that the arc is fully enveloping the formed droplet D on the 2110 electrode—that is, at least some of the arc is contacting the electrode 2110 above the droplet D. The peak current level 3105 is a current level which provides the desired droplet size, and in exemplary embodiments can be in the range of 150 to 400 amps. In exemplary embodiments, the peak current level 3105 can be determined by the controller of the power supply based upon user input information, such as wire feed speed and electrode type, etc.

It is noted that during the first three phases of the waveform 3100, the current is kept negative so that the anode spot (on the workpiece) is relatively stable and focused in the puddle on the workpiece. Because of this, the arc does not tend to vaporize any new coating (e.g., zinc) which is outside of the puddle, for example in the heat affected zone. Thus, no (or limited amounts) of newly vaporized coating is created to minimize the absorption of that vaporized material into the puddle.

During the negative peak current phase 3105 the cathode spot of the arc continues to climb above the droplet D. However, if the cathode spot climbs too high above the droplet D the arc can become unstable. To prevent this from occurring, at point C the current is rapidly changed from negative to positive until it reaches a first positive current level 3107. Like the duration of the ramp portion 3103, the duration of the negative peak portion 3105 can be determined by either a predetermined time duration, or a predetermined voltage threshold, which are set based on user input information. In either case, the duration of the peak 3105 should be selected such that the cathode spot does not climb appreciably higher than the droplet D on the electrode 2110. If the spot gets too high, the arc will become unstable and will begin to vaporize any coating near the puddle edge. By switching to a sufficient positive current level 3107, the current density of the arc is kept focused within the puddle. That is, with a positive current the current density now goes through the electrode 2110 and causes the electrode 2110 to begin to neck down, thus maximizing the arc pinch force. The transition from the negative peak 3105 to the first positive current level should occur quickly to ensure that the cathode spot (now moved to the workpiece) remains in the puddle. In exemplary embodiments of the present invention, the first positive current level 3107 is a current level in the range of 50 to 200 amps, and in some embodiments is in the range of 75 to 150 amps. The first current level can be predetermined by the power supply controller based on user input information related to the welding process, such as WFS and electrode type (including material and/or diameter, etc).

Once the current reaches the first positive current level 3107, the current then enters a positive current ramp phase 3109 in which the current is ramped to a positive peak current level 3111. Again, like the negative ramp phase 3103, the positive ramp phase is also controlled in exemplary embodiments to provide controlled increase of the arc and controlled melting of the electrode 2110. As with other exemplary embodiments described herein, the electrode 2110 can be either a solid or cored electrode type. When using a cored electrode type (whether solid or flux cored) a controlled current ramp rate (in both sections 3103 and 3109) aids in preventing the elements in the core from overheating, which can compromise the weld quality. In exemplary embodiments of the present invention the ramp rate of the positive controlled portion 3109 is faster than the ramp rate of the negative portion 3103, and can be in the range of 300 to 600 amps/ms. In further exemplary embodiments, the ramp rate is in the range of 400 to 500 amps/ms. The ramp rate can be selected based on input data regarding the welding operation, including WFS and electrode. When the current reaches the peak level 3111 its increase is stopped. The peak level 3111 is a current level is a current level which ensures that the droplet D will reach a size sufficient for transfer to the puddle, and create a sufficient pinch force to allow for droplet separation. In exemplary embodiments, the peak current level 3111 has a peak level which is higher than the peak level 3105. In exemplary embodiments, the peak current level 3111 is in the range of 300 to 600 amps, and is selected based on user input welding data, such as WFS, electrode information, etc. During this phase of the waveform, the electrode 2110 necks significantly and the waveform the droplet D begins to separate from the electrode 2110. The peak current 3111 is maintained at the peak level for a duration until point D, as shown in FIG. 30. In exemplary embodiments, the duration of the peak current 3111 is maintained until the droplet tether (or neck) is sufficiently small that transfer of the droplet D will likely occur. This duration can be determined using a predetermined time duration (based on user input information) or by monitoring dv/dt of the arc and when the voltage rate of change reaches a predetermined threshold it is determined that the droplet is sufficiently formed and that the current can begin ramping down from the peak. In each of the embodiments, either the time duration or the voltage change rate (dv/dt) can be set by the power supply controller based upon user input information, including WFS, electrode, etc. As shown, once the predetermined threshold (whether duration or dv/dt) is reached, at point D, the current enters a controlled ramp down phase 3112 until the current reaches a polarity switching current level 3113. It is noted that in each embodiment, the predetermined duration or predetermined dv/dt level is set at a threshold such that the transfer of the droplet D is likely to occur. In exemplary embodiments, this threshold is set such that the tether T of the droplet D to the electrode 2110 is no more than 75% the diameter of the electrode 2110. In other exemplary embodiments, the tether T of the droplet is no more than 50% the diameter of the electrode 2110.

During the ramp down 3112 of the current the ramp down rate is controlled such that the arc remains stable and the cathode spot on the puddle does not move significantly relative to the puddle. In some exemplary embodiments, this ramp down rate is the same as the ramp up rate of the phase 3109. However, in other exemplary embodiments the ramp down rate can be either slower or faster. The ramp down rate can be determined based on user input data, including WFS, electrode type, etc. In exemplary embodiments, the ramp down rate is in the range of 300 to 1000 amps/ms. In other exemplary embodiments, the ramp down rate is in the range of 400 to 750 amps/ms.

As shown, the current is ramped down to a polarity switching current level 3113, which can be in the range of 100 to 200 amps, and in other embodiments can be in the range of 75 to 150 amps. In some exemplary embodiments, the polarity switching current level 3113 is the same current level as the point 3107, while in other embodiments it can be different. In exemplary embodiments, the current level 3113 is a predetermined current level set point based on user inputs regarding the process, such as WFS, electrode type, etc. Once this current level is reached the current is switched, as quickly as possible to a negative polarity tail out level 3115. This switch is to be made quickly because if the current level stays too low for too long the cathode spot on the puddle will begin to wander and can approach the edge of the puddle. This will cause additional coating to be vaporized, which is undesirable. By switching quickly to a negative polarity the cathode spot is moved back to the electrode 2110 as the droplet D nears the separation point from the electrode 2110. However, at this time the current is still going through the droplet D and not around the droplet D. This allows for a stable transfer of the droplet D. In exemplary embodiments, the negative polarity tail out level 3115 has a current which is higher (in magnitude) than the negative low current level 3101 (which can also be called a background level). The current is then ramped down to aid in the droplet D transferring without a spatter event. In the embodiment shown in FIG. 30, the droplet D is transferred via a short circuit transfer where the droplet D is in contact with the puddle while still being connected to the electrode 2110. This method of transfer can provide a very fast transfer method. However, in other exemplary embodiments the droplet D can be transferred via "free flight" transfer where no short (physical connection) is created. It is noted that the use of a short circuit transfer methodology utilizes the shortest arc length, and at point 3117 the current can be reduced or shut off so as to prevent a spatter event from occurring as the droplet breaks off. In exemplary embodiments of the present invention using a short circuit transfer method, the surface tension of the puddle should be sufficient to pull the droplet D from the electrode 2110. In such embodiments, the current need only be reduced to a low level or the background level (3101) and need not be shut off. However, in other exemplary embodiments a short clear routine can be used to ensure that the droplet D is sufficiently separated from the electrode 2110. Such short clearing routines are known and need not be described in detail herein. In some exemplary embodiments, the duration that the electrode 2110 is in a shorted state (during time 3119) can be measured. If the duration of the short exceeds a predetermined duration then it is determined that surface tension is not sufficient to pull the droplet off and thus a short clear routine is initiated (for example, the current can be controlled to pinch off the droplet), but if the short is cleared within the predetermined duration then no short clearing function is needed. In exemplary embodiments, the short duration threshold is set in the range of 0.5 to 1 ms. The short duration threshold can be set based on user input parameters such as WFS, electrode type, etc. In exemplary embodiments, if no short clear routine is needed (droplet transfer occurs easily) then the current can return to the background level 3101 at point 3121. If needed, a short clear or pinch routine can be initiated at point 3121 to ensure proper droplet transfer. It is noted that the voltage and current waveforms in FIG. 30 depict only a single droplet transfer.

Through the use of exemplary embodiments described above, travel speeds similar to that have a purely DC+waveform, but with much lower wire feed speeds than traditional processes. This performance improvement is achieved along with reduced spatter and joint porosity as described. Embodiments of the present invention allow for any coating (e.g., zinc) to be burned off in a controlled manner and minimizes the absorption of the burned off zinc into the puddle. For example, embodiments of the present invention can achieve travels speeds in the range of 40 to 60 in/min, while using wire feed speed in the range of 380 to 630 in/min. Further, as stated previously, exemplary embodiments can be used with both solid and cored wires (metal or flux).

As explained previously, embodiments of the present invention allow for a weld to be created on coated materials (for example, galvanized steel) which has low porosity and spatter, but can be accomplished at high speed with acceptable heat input. That is, exemplary systems similar to that shown in FIG. 20 can be used with any of the exemplary waveforms discussed above to achieve greatly improved performance over known systems. For example, embodiments of the present invention can achieve the previously discussed porosity and spatter while welding at speeds in the range of 10 to 150 in/min. In further exemplary embodiments, the welding speeds are in the range of 30 to 80 ipm.

Further, in some exemplary embodiments of the present invention, the system of FIG. 20 can be used, but without the hot wire consumable 140 and hot wire power supply 170. That is, exemplary embodiments of the waveform shown in FIG. 29 or 30 can be used with generally traditional welding systems and provide improved welding performance of coated materials over traditional systems. This is because embodiments of the present invention, allow for the escape of any vaporized coatings (e.g., zinc) prior to puddle solidification.

In further exemplary embodiments of the present invention, at least one of the wire 140 and electrode 2110 is enhanced to change the melting temperature characteristics of the weld puddle to further allow for the escape of any vaporized coating material. Specifically, either one, or both, of the consumables 140/2110 is enhanced with an additional amount of at least one of Al, C and Si, or any combination thereof. For example, in some embodiments only the hot-wire 140 is the enhanced consumable, while in other embodiments only the arc electrode 2110 is enhanced, and in even other embodiments both can be enhanced. By enhancing the chemical composition of at least one of the consumables with Al, C, and/or Si the melting point of the weld puddle is reduced and the melting range of the puddle is increased. Thus, the use of exemplary embodiments of the enhanced consumables will extend the time that its takes for the weld puddle to solidify on the workpiece 115. By extending the solidification time, embodiments of the present invention provide further time for any vaporized coatings to escape from the weld puddle. In fact, exemplary embodiments of the enhanced consumables discussed herein can be used with any exemplary systems discussed herein. For example, the enhanced consumables can be used with any exemplary system similar to that discussed in FIGS. 1, 14, 17, and 20, and any other systems contemplated herein, or where it is desired to delay the solidification of a weld puddle. For example, exemplary embodiments of the present invention can reduce the melting temperature of the weld puddle such that the weld puddle reaches 95% solidification at a temperature in the range of 1400 to 1480° C., where the weld puddle is made in a workpiece that is coated mild steel. In embodiments, the coating can be zinc. This is appreciably lower than traditional consumables which allow a puddle to reach 95% solidification at a temperature in a range of 1520 to 1550° C. Thus, embodiments of the present invention allow more time for any vaporized coating materials to escape—reducing porosity.

The enhanced consumables 140/2110 can be constructed, physically, similar to known consumables. That is, they can have a solid or cored (either flux or metal) construction. In some exemplary embodiments, the added Al, C and/or Si is added to the composition of the consumables integrally. That is, the added Al, C and/or Si can be integral to the solid wire composition, a metallic sheath composition or any flux or metal core. In other exemplary embodiments, the additional Al, C and/or Si can be added to the consumables as an external layer on the consumable. That is, an external coating or layer can be applied to the consumable 140/2110 which contains any one, or a combination of, Al, C and Si which will deposit this added material in the puddle to achieve the desired melting properties for the puddle. For example, a coating of graphite can be applied to a consumable via a vapor deposition process (or similar) to provide an added amount of carbon (C). This carbon will affect the puddle reduce the puddle melting temp and widen the melting range as described above. Further, both Al and Si can be added via a vapor deposition process (or similar) to provide a coating on the consumables. It is noted, however, that if a coated consumable is used it is desirable to use the consumable as a hot-wire consumable (e.g. 140—FIG. 20) to ensure that the added material is sufficiently deposited into the puddle. If the enhanced consumable is coated, and used as the arc electrode (2110), the arc could vaporize the coating before it enters the puddle.

As stated above, exemplary enhanced consumables have at least one or, or a combination of, Si, Al and C to improve the melting characteristics of the puddle. Specifically, exemplary embodiments can have an aluminum (Al) content in the range of 0 to 5% by weight of the consumable, a carbon (C) content in the range of 0 to 0.5% by weight of the consumable, and/or a silicon (Si) content in the range of 0 to 2% by weight of the consumable. In further exemplary embodiments, the consumable can have an aluminum (Al) content in the range of 1 to 5% by weight of the consumable, a carbon (C) content in the range of 0.001 to 0.5% by weight of the consumable, and/or a silicon (Si) content in the range of 0.1 to 2% by weight of the consumable. It should be noted that many exemplary embodiments can have at least two of the above stated elements, which are combined in desired amounts, to achieve the desired melting profile of the puddle. Of course, these consumables would have other elements to provide the desired weld composition and properties. Such elements and compositions are generally known and need not be discussed in detail. That is, the enhancement of consumables discussed herein can be applied to many different types of consumables which are used to join coated steels, such as galvanized steel products. For example, one example of such a consumable can have C in the range of 0.05 to 0.4% by weight of the consumable, Si in the range of 0.6 to 2.1% by weight of the consumable, and cerium (Ce) in the range of 0.35 to 1.5% by weight of the consumable, where the combination of C, Si and Ce is in the range of 1.0 to 4% by weight of the consumable. Cerium is a deoxidizer that indirectly allows the silicon and carbon to stay in solution with the iron, and thus decreases the melting point of the puddle. Other examples and combinations are contemplated herein, and the above example is intended to be exemplary. For example, exemplary consumables constructed similar to that discussed in pending U.S. application Ser. No. 13/798,398, entitled CONSUMABLE FOR SPECIALTY COATED METALS, can be used with embodiments of the present invention to achieve a desired puddle melt profile. This application is incorporated herein by reference in its entirety, and in particular for consumables that can be used to join coated materials.

As explained previously, the exemplary enhanced consumables discussed herein provide a weld puddle composition which delivers an improved weld puddle melt profile to allow for improved welding performance of coated materials. The following discussion is directed to characteristics of undiluted weld metal composition created by exemplary enhanced consumables contemplated herein.

In first exemplary embodiments of enhanced consumables which use a combination of C and Si (in the consumable) to reduce the melt temp. of the puddle, the consumables provide an undiluted weld metal (which can also be called an undiluted weld deposit) that has C in the range of 0.05 to 0.3% by weight of the undiluted weld metal, and Si in the range of 0.6 to 2.0% by weight of the undiluted weld metal, where no Al is intentionally added to the consumable or the deposit (thus, to the extent Al is present it would only be in trace amounts). Thus, the consumable composition (that is, the amount of C and Si) is selected to provide the above stated ranges for each of C and Si. Of course, the undiluted weld metal will have other elements and compounds, which are generally known and need not be discussed herein. With these ranges, the undiluted weld metal will have improved melting characteristics without sacrificing weld strength or desirable weld properties. In further exemplary embodiments, the C is in the range of 0.1 to 0.3% and the Si is in the range of 1.0 to 2.0%, by weight of the undiluted weld metal. Such exemplary embodiments, may also include cerium (Ce). As stated previously, Ce is a deoxidizer which indirectly allows the silicon and carbon to stay in solution, and thus aid in lower the melting temp of the weld puddle. In such embodiments, Ce is in the range of 0.35 to 1.5% by weight of the undiluted weld metal.

In further exemplary embodiments, which use a combination of Al and Si (in the consumable) to reduce the melt temp. of the puddle, the consumables provide an undiluted weld metal that has Al in the range of 2 to 5% by weight of the undiluted weld metal, and Si in the range of 1.0 to 2.0% by weight of the undiluted weld metal. In these embodiments, the consumables can be such that little or no C is added to the undiluted weld metal from the consumable. That is, in such embodiments the C in the undiluted weld metal can be in the range of 0 to 0.06%, by weight of the undiluted weld metal, while in other embodiments C is in the range of 0 to 0.03% by weight. Again, in embodiments where C is not added by the consumable, it can be present in trace amounts. Again, the consumable composition (that is, the amount of Al and Si) is selected to provide the above stated ranges for each of Al and Si. Of course, the undiluted weld metal will have other elements and compounds, which are generally known and need not be discussed herein. With these ranges, the undiluted weld metal will have improved melting characteristics without sacrificing weld strength or desirable weld properties. In further exemplary embodiments, the Al is in the range of 3 to 5% and the Si is in the range of 1.5 to 2.0%, by weight of the undiluted weld metal.

In additional exemplary embodiments, which use a combination of Al and C (in the consumable) to reduce the melt temp. of the puddle, the consumables provide an undiluted weld metal that has Al in the range of 1 to 5% by weight of the undiluted weld metal, and C in the range of 0.1 to 0.3% by weight of the undiluted weld metal. In these embodiments, the consumables can be such that little or no Si is added to the undiluted weld metal from the consumable. That is, in such embodiments the Si in the undiluted weld metal can be in the range of 0.01 to 0.25%, by weight of the undiluted weld metal. Thus, some Si can be present/added in the consumable. Again, in embodiments where Si is not added by the consumable, it can be present in trace amounts. Again, the consumable composition (that is, the amount of Al and C) is selected to provide the above stated ranges for each of Al and C. Of course, the undiluted weld metal will have other elements and compounds, which are generally known and need not be discussed herein. With these ranges, the undiluted weld metal will have improved melting characteristics without sacrificing weld strength or desirable weld properties. In further exemplary embodiments, the Al is in the range of 1.5 to 4% and the C is in the range of 0.2 to 0.3%, by weight of the undiluted weld metal.

As stated above, the embodiments of systems and/or consumables discussed herein can provide improved spatter and porosity performance on coated workpieces, for example galvanized workpieces. This improved performance can be attained on workpieces having galvanized coatings which are at least 20 microns thick, on the welding surface of the workpieces. Of course, embodiments of the present invention can be used on workpieces which much thicker coatings than 20 microns. That is, embodiments of the present invention can provide an undiluted weld deposit with an improved porosity metric over known welding systems, methods and consumables, when welding coated materials. For example, exemplary consumables (discussed above), either alone or coupled with systems and methods described herein, can achieve the porosity and spatter performance discussed previously in the present application. Additionally, a porosity metric in the range of 0.5 to 3 can be achieved when exemplary systems have a travel speed at a rate of 50 in/min and a consumable deposition rate in the range of 4 to 6.5 lb/hr. The same exemplary consumables can provide a porosity metric in the range of 0 to 1 when at a travel speed of 40 in/min and a deposition rate of 4 to 6.5 lb/hr. As used herein, the porosity metric is the number of pores present in the undiluted weld metal which have an effective diameter larger than 0.5 mm over a unit length (inches). That is, a porosity metric of 2 means that there is an average of 2 pores—having an effective diameter larger than 0.5 mm—per inch, along the undiluted weld metal. This is a porosity metric that cannot be attained by traditional systems, methods and/or consumables. Further exemplary consumables discussed herein can provide a porosity metric of 0.5 to 3 when at a travel speed of 50 in/min with a heat input in the range of 4 to 8 kJ/in, and provide a porosity metric of 0 to 1 when at a travel speed of 40 in/min with a heat input in the range of 4 to 8 kJ/in. Thus, embodiments of the present invention can provide appreciably improved porosity performance on coated workpieces, without sacrificing weld integrity or properties, at low heat input levels and high speed welding. Thus, embodiments of the present invention provide welding systems, methods and consumables which allow for welding coated materials at high travel speeds over a wide range of heat input, with little or no porosity or spatter. In known systems, to achieve low porosity, the process had to proceed slowly with high heat input (to slow the puddle cooling), which resulted in excessive heat input. This excessive heat input can damage workpieces (especially thin workpieces) and can vaporize excessive amounts of coatings (near the weld), which promotes corrosion. These issues are avoided with embodiments of the present invention.

The consumables discussed herein can be used with traditional welding applications (e.g., GMAW) and provide greatly improved performance, as well as with exemplary systems and methods discussed herein to provide additional performance improvements over traditional methods to weld coated materials.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope discussed herein.

The invention claimed is:

1. A welding system, comprising:
    a welding power supply that is configured to create and deliver a welding current waveform to a consumable for deposition onto a workpiece; wherein said welding current waveform comprises a plurality of waveform cycles, and where each waveform cycle of said plurality of waveform cycles includes a droplet build phase and a droplet transfer phase,
    wherein said droplet build phase comprises at least one negative polarity droplet build pulse having a first peak current level and a first duration, and at least one positive polarity droplet stabilizing pulse having a second peak current level and a second duration, where said at least one negative polarity droplet build pulse precedes said at least one positive polarity droplet stabilizing pulse;
    wherein said droplet transfer phase follows said droplet build phase, and said droplet transfer phase uses a droplet transfer pulse that has a positive polarity, and where the welding current waveform is such that a single droplet is transferred from said consumable to said workpiece for each waveform cycle of said plurality of waveform cycles; and
    wherein during said droplet build phase no droplet is transferred from said consumable to said workpiece; and wherein said first peak current level is in the range of 30 to 300 amps and maintained for a duration in the range of 400µ to 3 ms.

2. The welding system of claim 1, wherein said second peak current level is in the range of 300 to 500 amps and maintained for a duration 300 µs to 2.5 ms.

3. The welding system of claim 1, wherein said second peak current level is in the range of 1.5 to 3 times the magnitude of said first peak current level.

4. The welding system of claim 1, wherein said second peak current level is higher in magnitude than said first peak current level.

5. The welding system of claim 1, wherein said droplet build phase comprises a plurality of said negative polarity droplet build pulses and a plurality of said negative polarity droplet build pulses and a plurality of said at least one positive droplet stabilizing pulses, where each one of said at least one positive polarity droplet stabilizing pulses follows a respective negative polarity build pulses.

6. The welding system of claim 5, wherein at least one of a peak current level and a duration of a second of said at least one plurality of negative polarity droplet build pulses is different from said first peak current level and said first duration.

7. The welding system of claim 5, wherein at least one of a peak current level and a duration of a second of said plurality of said at least one positive polarity droplet stabilizing pulses is different from said second peak current and said second duration, respectively.

8. The welding system of claim 1, wherein said welding current waveform includes a short circuit clearing portion after said droplet transfer phase.

9. The welding system of claim 5, wherein each of said at least one plurality of said negative polarity droplet build pulses and said at least one plurality of said positive polarity droplet stabilizing pulses have a frequency in the range of 300 to 1000 Hz.

10. The welding system of claim 1, wherein said welding power supply includes a controller which determines a duration of said droplet build phase and controls said welding current waveform such that said droplet build phase in each waveform cycle of said plurality of waveform cycles is maintained at said determined duration of said droplet build phase.

11. The welding system of claim 1, wherein said welding power supply monitors an energy output of said welding current waveform and determines a duration of said droplet build phase based on said monitored energy output of said welding current waveform.

* * * * *